US005691783A

United States Patent [19]

Numao et al.

[11] Patent Number: 5,691,783

[45] Date of Patent: Nov. 25, 1997

[54] LIQUID CRYSTAL DISPLAY DEVICE AND METHOD FOR DRIVING THE SAME

[75] Inventors: Takaji Numao, Nara, Japan; Akira Tagawa, Oxford, United Kingdom; Kazuhiko Tamai, Tenri, Japan; Mitsuhiro Koden; Tokihiko Shinomiya, both of Nara, Japan

[73] Assignee: Sharp Kabushiki Kaisha, Osaka, Japan

[21] Appl. No.: 269,450

[22] Filed: Jun. 30, 1994

[30] Foreign Application Priority Data

| | | | |
|---|---|---|---|
| Jun. 30, 1993 | [JP] | Japan | 5-161616 |
| Aug. 31, 1993 | [JP] | Japan | 5-216211 |
| Jun. 7, 1994 | [JP] | Japan | 6-125602 |

[51] Int. Cl.[6] .......... G02F 1/136; G02F 1/141; G09G 3/36

[52] U.S. Cl. .......... 349/48; 349/37; 349/38; 349/172; 349/158; 345/92

[58] Field of Search .......... 359/54, 63, 56, 359/58, 59, 82, 100; 345/92, 206, 97, 93, 208; 349/37, 38, 48, 100, 96, 143, 172

[56] References Cited

U.S. PATENT DOCUMENTS

| | | | |
|---|---|---|---|
| 4,367,924 | 1/1983 | Lagerwall | 350/334 |
| 4,621,260 | 11/1986 | Suzuki et al. | 345/92 |
| 5,005,953 | 4/1991 | Kawagishi | 350/341 |
| 5,194,974 | 3/1993 | Sharp et al. | 359/59 |
| 5,323,172 | 6/1994 | Sharp | 345/97 |
| 5,420,709 | 5/1995 | Kato et al. | 359/72 |
| 5,426,526 | 6/1995 | Yamamoto et al. | 359/59 |
| 5,436,037 | 7/1995 | Okabe et al. | 359/75 |

FOREIGN PATENT DOCUMENTS

| | | |
|---|---|---|
| 0 414 478 A1 | 2/1991 | European Pat. Off. . |
| 0 528 685 A2 | 2/1993 | European Pat. Off. . |
| 56-107216 | 8/1981 | Japan . |
| 3-242624 | 10/1991 | Japan . |
| 3-243915 | 10/1991 | Japan . |
| 4-212126 | 8/1992 | Japan . |
| 4-218023 | 8/1992 | Japan . |

OTHER PUBLICATIONS

T. Mori, et al., "Gray–Scaling Property of Ferroelectric Liquid Crystal," *Preprints of the 16th Symposium on Liquid Crystals*, Japan 3K111, Oct. 1990.

Y. Toyoda, et al., "Gray–Scaling Property of Ferroelectric Liquid Crystal," *Preprints of the 16th Symposium on Liquid Crystals*, Japan 3K112, Oct. 1990.

Noel Clark et al., "Submicrosecond bistable electro–optic switching in liquid crystals," in *Appl. Physics Letters*, vol. 36, No. 11, pp. 899–901, Am. Inst. of Physics, 1 Jun. 1980.

E. Matsui et al., "Electro–Optic properties of new FLC mixtures containing fluorinated chiral compounds," *Preprints of the 17th Symposium on Liquid Crystals*, Japan, 3F301, Sep. 1991.

K. Nito et al., "A Novel Surface–Stabilized Monostable Ferro–electric LCD," *Proc IDRC*, 179, 1991.

*Primary Examiner*—William L. Sikes
*Assistant Examiner*—Tai V. Duong
*Attorney, Agent, or Firm*—David G. Conlin; Milton Oliver

[57] ABSTRACT

A ferroelectric liquid crystal display device includes a plurality of pixels, and each of the plurality of pixels includes ferroelectric liquid crystal material having ferroelectric liquid crystal molecules therein capable of being aligned in a first stable alignment state, whereby a principal axis of each of the molecules is aligned at an angle $\omega$ with respect to a central line, and of being aligned in a second stable alignment state, whereby the principal axis of each of the molecules is aligned at an angle $-\omega$ with respect to the central line, and a pair of polarizers on opposite sides of the ferroelectric liquid crystal material, a polarizing axis of one of the polarizers being substantially aligned with the central line.

4 Claims, 30 Drawing Sheets

PRIOR ART

*PRIOR ART*

PRIOR ART

1st frame
2nd frame

Gate 1
0

Gate 2
0

Gate 3
0

Data 1
0

PW1
0

PW2
0

PW3
0

L1
0

L2
0

L3
0

V1/1 0

V2/1 0

V3/1 0

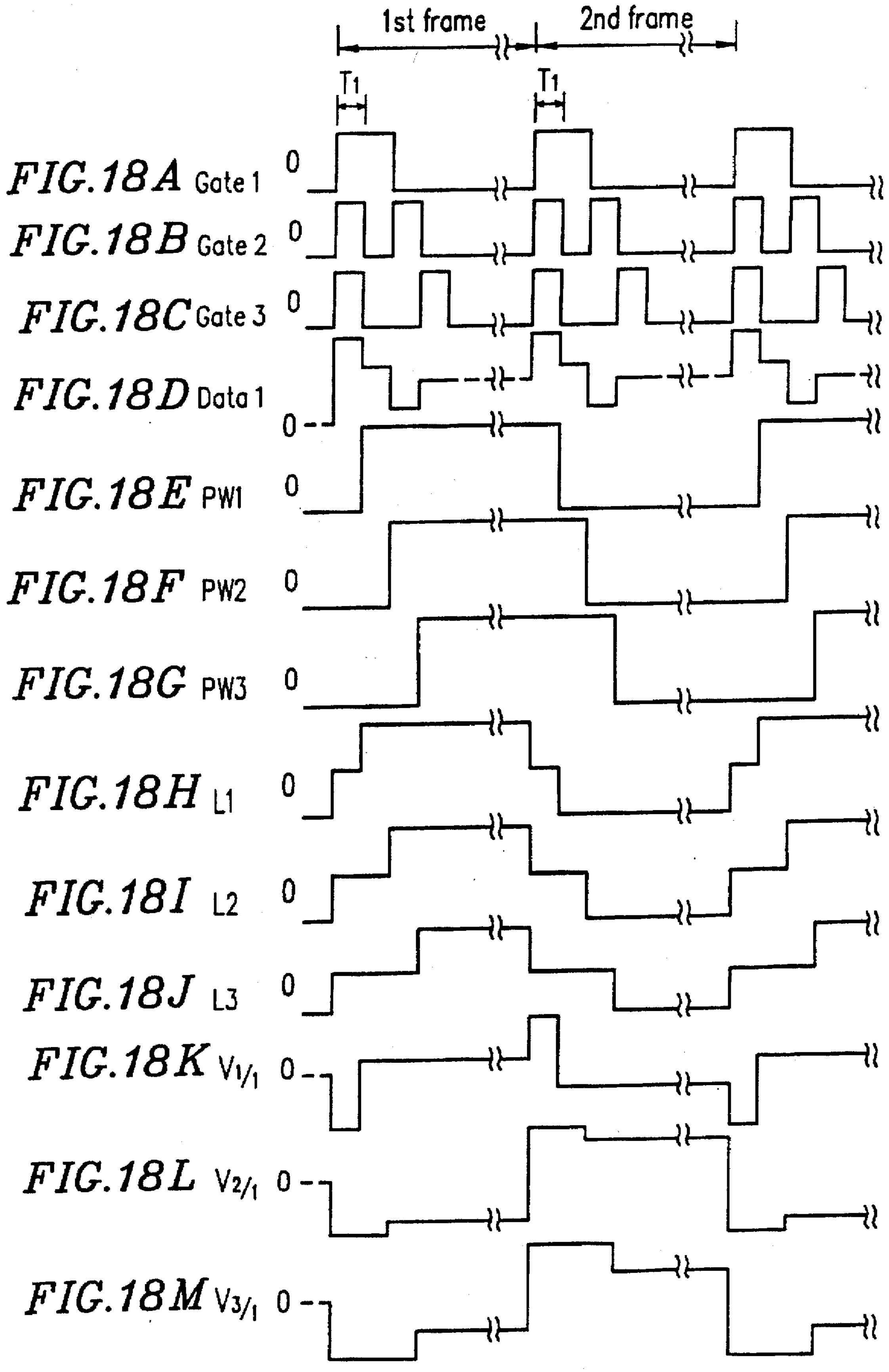
1st frame
2nd frame
T1
T1
FIG.18A Gate 1
FIG.18B Gate 2
FIG.18C Gate 3
FIG.18D Data 1
FIG.18E PW1
FIG.18F PW2
FIG.18G PW3
FIG.18H L1
FIG.18I L2
FIG.18J L3
FIG.18K V1/1
FIG.18L V2/1
FIG.18M V3/1
0

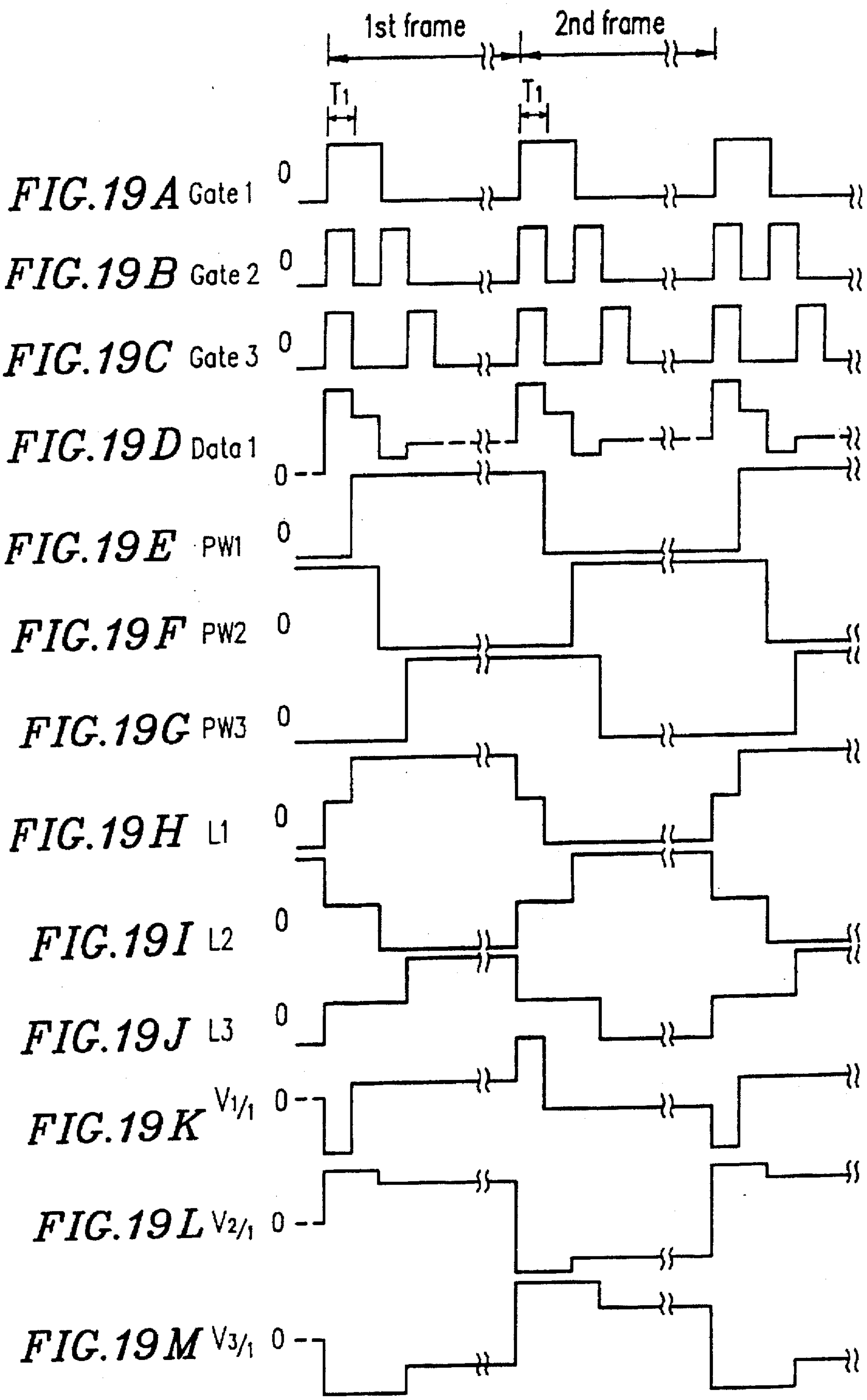
1st frame
2nd frame
T1
T1
FIG.19A Gate 1
FIG.19B Gate 2
FIG.19C Gate 3
FIG.19D Data 1
FIG.19E PW1
FIG.19F PW2
FIG.19G PW3
FIG.19H L1
FIG.19I L2
FIG.19J L3
FIG.19K V1/1
FIG.19L V2/1
FIG.19M V3/1
0

*PRIOR ART*

PRIOR ART

V
G0
t

V
G1
t

V
S0
Vb
Vb
-Vb
-Vb
t

V
F gate
t

V
L
Vo
Vo
-Vo
t

V
A00
Vb+Vo
Vb
-Vb
-Vb-Vo
-Vb
-Vb-Vo
t

V
A10
Vb+Vo
Vb
-Vb
-Vb-Vo
-Vb
-Vb-Vo
t
To-to To+to
2To
-to0 to
-2to
To
To-2to
To+2to
2To-2to
2To-to

LIQUID CRYSTAL DISPLAY DEVICE AND METHOD FOR DRIVING THE SAME

BACKGROUND OF THE INVENTION

1. Field of the Invention

The present invention relates to a liquid crystal display device and a method for driving the same.

2. Description of the Related Art

Liquid crystal display devices (hereinafter, referred to as "LCD devices") are widely used for applications in, for example, desk-top calculators and portable televisions. Although there are some problems with LCD devices in relation to response speed, visibility of images and the like, LCD devices will likely replace CARTS (cathode ray tubes) in the near future. In order to solve these problems, various technological proposals and changes are being made.

Currently, LCD devices using a nematic liquid crystal material are in wide use. Examples of LCD devices using a nematic liquid crystal material are twisted nematic (hereinafter, referred to as "TN") LCD devices and super twisted birefringence effect (hereinafter, referred to as "SBE") LCD devices.

In the TN LCD devices, as the number of the scanning lines is increased, the time period during which application of a voltage to each scanning line is permitted for putting the liquid crystal molecules into an "ON" state or an "OFF" state becomes shorter, resulting in an insufficient contrast. For this reason, the TN LCD devices are not suitable for large capacity display devices. In order to overcome the problem, SBE LCD devices or double layer SBE LCD devices have been developed. However, in such LCD devices, as the number of the scanning lines is increased, the contrast of displayed images and the response speed are still low. Currently, the maximum possible display capacity is approximately 800×1024 lines.

Further, display devices using a nematic liquid crystal material have a serious problem in that the viewing angle is narrow. In either the SBE LCD devices or the double layer SBE LCD devices, satisfactory values have not been obtained with regard to the contrast of displayed images or the response speed.

Active matrix LCD devices having thin film transistors (hereinafter, referred to as the "TFTs") on a substrate have also been developed. In such LCD devices, a large display capacity of, for example, 1000×1000 lines and a high contrast are obtained. However, since the active matrix LCD devices generally use a TN liquid crystal material, the above-mentioned problems in the viewing angle and the response speed still remain.

In the past, N. A. Clark and S. T. Lagerwall proposed an LCD device using a choral smectic C liquid crystal material, namely, a ferroelectric liquid crystal material (hereinafter, referred to as the "FLC material") in order to solve these problems (see, e.g., Appl. Phys. Lett., 36, 899 (1980); the U.S. Pat. No. 4,367,924; and Japanese Laid-Open Patent Publication No. 56-107216). While the LCD devices described above use a field effect caused by the dielectric anisotropy of the liquid crystal molecules, the LCD device proposed by Clark and Lagerwall uses a rotational force for aligning the orientation of the FLC molecules obtained by the spontaneous polarization thereof and the polarity of the electric field.

FIGS. 3A through 3E schematically illustrate the spontaneous polarization of the FLC molecule and the electrooptic effect. As is shown in FIG. 3A, the FLC molecules initially have a helical structure. When the FLC molecules are provided in a cell having a cell thickness smaller than the helical pitch, thereby forming a liquid crystal layer, the helix is loosened as is shown FIG. 3B. As a result, the FLC molecules show histability; that is, the liquid crystal layer includes a stable area where the FLC molecules are stable while tilted by an angle of $+\theta$ with respect the normal line 900 relative to a surface of the liquid crystal layer and a stable area where the FLC molecules are stable while tilted by an angle of $-\theta$ with respect to the normal line 900.

When a voltage is applied to the FLC molecules, the orientations of the FLC molecules obtained by the spontaneous polarization thereof can be uniformly aligned as is shown in FIG. 3C. When a voltage having an opposite polarity from that of voltage applied first is applied, the FLC molecules are aligned in the opposite direction as is shown FIG. 3D. By driving the FLC molecules in such a switching manner, the index of the cell with respect to the birefringence light incident on the cell is changed.

As is shown in FIG. 3E, the alignment orientation of the FLC molecules obtained by the voltage application is maintained by the alignment restricting force of the interface between the liquid crystal layer and the substrate even after the voltage application is stopped. Thus, a memory function can be obtained. Since the spontaneous polarization and the electric field directly effect the driving of the FLC molecules, the time required for driving the FLC molecules in a switching manner is 1/1000 or shorter that is, the response speed is quite high. Due to such a high response speed, high speed display is possible. However, there are still problems in that it is difficult to obtain a uniform alignment of the FLC molecules for realizing a high contrast and to display an image having various tones.

In the past, FLC molecules have been considered to have only two stable alignment states. Recently, an intermediate state between these two states is considered obtainable by applying an electric field in a certain manner. This is disclosed in, for example, Japanese Laid-Open Patent Publication No. 3-242624; Japanese Laid-Open Patent Publication No. 3-243915; Mori et al., Preprints of the 16th Symposium on Liquid Crystal, Japan, 3K111 (1990); Toyota et al., Preprints of the 16th Symposium on Liquid Crystal, Japan, 3K112 (1990); Japanese Laid-Open Patent Publication No. 4212126; Japanese Laid-Open Patent Publication No. 4-218023; Matsui et al., Preprints of the 17th Symposium on Liquid Crystal, Japan, 3F301 (1991); and K. Nito et al., Proc. IDRC, 179 (1991).

The intermediate stable alignment state is obtained in the following manner.

As is represented in FIG. 4A, Clark-Lagerwall type FLC molecules 101 usually have two stable alignment states 104 and 105. In FIG. 4A, reference numeral 103 denotes a central line which bisects an angle defined by the principal axes of the FLC molecules 101 in the stable alignment states 104 and 105. The designation $\omega$ indicates an angle between the principal axis of the FLC molecule 101 in the stable alignment state 104 and the central line 103. The designation $-\omega$ indicates an angle between the principal axis of the FLC molecule 101 in the stable alignment state 105 and the central line 103. Reference numerals 106 and 107 denote tilting axes, respectively. In order to obtain the intermediate state, such FLC molecules 101 are aligned to have only one stable alignment state as is shown in FIG. 21. In FIG. 21, the stable alignment state is indicated by reference numeral 214, and this state corresponds to one of either state 104 or 105 in FIG. 4A. A central line 213 corresponds to the central line 103, und tilting axes 216 and 217 correspond to the tilting axes 106 and 107 in FIG. 4A.

By changing the level and the polarity of the voltage applied to the FLC molecule 101, the principal axis of the FLC molecule 101 is moved to be oriented in any direction between the tilting angles 216 and 217. In this manner, an intermediate stable alignment state is realized.

In order to maintain the level of the voltage applied to the FLC molecule 101 for one frame, an FLCD (ferroelectric liquid crystal display) device 200 including TFTs as is shown in FIG. 20 is used.

With reference to FIG. 20, a structure of the FLCD device 200 will be described. The FLCD device 200 includes two glass substrates **201*a* and 201*b* located opposite each other. On a surface of the glass substrate 201*a*, a transparent counter electrode L formed of indium tin oxide (hereinafter, referred to as "ITO") is provided. The counter electrode L is coated with a transparent insulation layer 203*a* formed of $Ta_2O_5$ or the like. On a surface of the glass substrate 201*b*, active elements, in this case TFTs B each including a gate electrode G, a source electrode S, a drain electrode D, a semiconductor layer 205 and an insulation layer 202, are provided. The active elements are used as switching devices. On the insulation layer 202, transparent pixel electrodes 209 formed of ITO and each connected to a corresponding drain electrode D are provided. The TFTs B and the pixel electrodes 209 are covered with a transparent insulation layer 203*b* formed of $Ta_2O_5$. The insulation layers 203*a* and 203*b* are respectively covered with transparent alignment layers 204*a* and 204*b* which are formed of polyvinyl alcohol (hereinafter, referred to as "PVA") or the like. The two glass substrates 201*a* and 201*b* having the above-mentioned laminate thereon are assembled together with spacers 206 (only one of which is shown in FIG. 20) therebetween. A space interposed between the alignment layers 204*a* and 204*b* is filled with an FLC layer 207. The outer surface of the glass substrate 201*a* is covered with a polarizing plate 208*a*; and the outer surface of the glass substrate 201*b* is covered with a polarizing plate 208*b*. The respective polarizing axes of the polarizing plates 208*a* and 208*b* are perpendicular to each other. Each pixel electrode 209, an area of the FLC layer 207 in correspondence with the pixel electrode 209, and an area of the counter electrode L in correspondence with the pixel electrode 209 form a pixel in the FLCD device 200**.

Japanese Laid-Open Patent Publication Nos. 3-242624 and 3-243915 each disclose a sequential tone display method using the FLCD device 200. In the FLCD device 200 disclosed in these publications, only one of the two alignment layers **204*a* and 204*b* is treated for alignment by, for example, rubbing. As a result, as is shown in FIG. 21, the FLC molecules 101 in the FLC layer 207 are stable in only one stable alignment state 214**.

The operating principal of the FLCD devices 200 disclosed in Japanese Laid-Open Patent Publication Nos. 3-242624 and 3-243915 will be described with reference to FIGS. 20 and 21.

When a positive electric field is applied to the FLC molecules 101 having only one stable alignment state 214, the FLC molecules 101 are subjected to a force directed toward the tilting axis 217 and also to a force directed back toward the stable alignment state 214. As a result, the FLC molecules 101 stop at a position where the two oppositely directed forces are balanced. When the level of the voltage applied to the FLC molecules 101 is continuously changed, the FLC molecules 101 stop at a position corresponding to each level of the changing voltage, thereby realizing sequential tone display.

In order to properly realize the sequential tone display, it is necessary to counteract DC components of the voltage applied to the FLC molecules 101 by applying a positive voltage +Va and a negative voltage −Va alternately as is illustrated in FIG. 22 (part (A)). The FLC molecules 101 can move to the tilting axis 217 (FIG. 21) in response to the positive voltage +Va but only to the tilting axis 216 in response to the negative voltage −Va. As a result, as is shown in FIG. 23, the voltage V applied to the FLC molecules 101 and the intensity I of light transmitted through the FLC layer 207 has the relationship which is asymmetric relative to 0 V.

As is shown in FIG. 22, the intensity I of light transmitted through the FLC layer 207 changes every frame $T_0$. There is a possibility that flicker is recognized unless the frame rate $1/T_0$ is 120 Hz or more. However, a visual signal outputted from a personal computer or the like used as a signal source usually has a frame rate $1/T_0$ of 60 Hz. Therefore, e circuit for converting the frequency is required between the FLCD device 200 and the personal computer or the like, resulting in higher production cost.

Japanese Laid-Open Patent Publication No. 4-218023 discloses another sequential tone display method. In the FLCD device 200 disclosed in this publication, the two alignment layers **204*a* and 204*b* are both treated for alignment by, for example, rubbing in the same direction. As a result, as is shown in FIG. 4A, the FLC molecules 101 in the FLC layer 207 are stable in the stable alignment states 104 and 105. The polarizing axis of the polarizing plate 208*a* or 208*b* is aligned with the principal axis of the FLC molecules 101 in the stable alignment state 104 or 105**, with the polarizing axis of the other polarizing plate being perpendicular thereto.

The operating principal of the FLCD device 200 disclosed in the Japanese Laid-Open Patent Publication No. 4-218023 will be described with reference to FIGS. 4A and 20. All the FLC molecules 101 included in a pixel are put into the stable alignment state 105, and then an arbitrary level of the voltage is applied across the corresponding pixel electrode and counter electrode. Since the FLC molecules 101 have spontaneous polarization as is shown by Ps In FIG. 4B, the FLC molecules 101 in a sufficient amount to counteract the charge stored in the pixel across the FLC molecules 101 are inverted to the stable alignment state 104. By continuously changing the level of the charge, the FLC molecules 101 are liveried in an amount corresponding to each level of the changing charge, thereby realizing sequential tone display.

In other words, the driving method disclosed in the Japanese Laid-Open Patent Publication No. 4-218023 is of a domain inversion type, by which tone display is realized based on a ratio of the amount of the FLC molecules 101 in a pixel in one stable alignment state 104 and the amount of the FLC molecules 101 in the other stable alignment state 105 in the same pixel.

As further described in the Japanese Laid-Open Patent Publication No. 4-218023, in the situation where the polarizing axis of a polarizing microscope is aligned with the central line 103 at a certain temperature and the temperature of the FLCD device 200 is changed, the angles ω and −ω shown in FIG. 30 are obtained. The black circles indicate the angle ω, and the white squares indicate the angle −ω. In this measurement, SBE-8 (produced by Merck & Co., Inc.) having a composition shown in Table 1 is used for the bistable FLC material, and PSI-A-2101 (produced by Chisso Petrochemical Corp.) is used for the alignment layers **204*a* and 204*b***.

TABLE 1

Composition and phase transition temperature of SBE-8

| Compound | wt % |
|---|---|
| SCE 8 (Produced by Merck & Co., Inc.) | 90% |
| 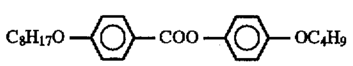 | 2% |
| 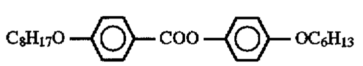 | 2% |
| 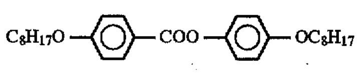 | 2% |
| 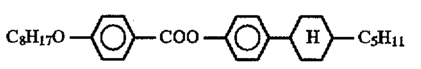 | 2% |
| 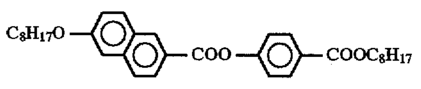 | 2% |
| Composition 1 (°C.) | K Sc Sa N I . < RT.57.80.100 |

As is shown in Table 1, the phase transition temperature from one phase to another phase is as follows:

from crystalline to smectic C: lower than room temperature;

from smectic C to smectic A: 57° C.;

from smectic A to nematic: 80° C.; and from nematic to isotropic: 100° C.

As is illustrated in FIG. 30, the absolute value of the angles ω and −ω decreases in accordance with a rise in the temperature. The central line 103 is in substantially the same direction as the rubbing direction of the alignment layers 204*a* and 204*b*. Accordingly, in the case that the principal axis of the FLC molecules 101 in one of the two stable alignment states 104 and 105 is aligned with the polarizing axis of the polarizing plate 208*a* or 208*b* at a certain temperature, the principal axis becomes offset from the polarizing axis in accordance with a change in the temperature. Since the intensity of light transmitted through the FLC layer 207 is affected by the angle ω and −ω, the brightness of an image changes in accordance with a change in the temperature. Such a problem of a change in the brightness of an image in accordance with a change in the temperature is also present in the devices disclosed by Japanese Laid-Open Patent Publication Nos. 3-242624 and 3-243915.

The references Japanese Laid-Open Patent Publication No. 4-212126; Matsui et al., Preprints of the 17th Symposium on Liquid Crystal, Japan, 3F301 (1991); and K. Nito et al., Proc. IDRC, 179 (1991) each disclose an FLCD device in which alignment layers are treated by anti-parallel rubbing to align the principal axis of FLC molecules when no voltage is applied with the rubbing direction. Accordingly, the intensity of light transmitted through an FLCD layer and the applied voltage have a symmetrical relationship relative to 0 V. However, it is generally known that anti-parallel rubbing treatment results in a non-uniform alignment of the liquid crystal molecules. In fact, it is mentioned in the above-mentioned three references that the alignment orientation is different area by area in the FLC layer so as to appear as stripes.

As described above, several structures and methods for displaying an image having a half tone have been proposed and developed in the field of FLCD devices having a high response speed. However, there are problems for practical use that satisfactory alignment is not obtained and that the intensity of light transmitted through the FLCD device is different in response to positive voltage application and to negative voltage application.

In the case of active-driving an FLCD device having a conventional circuit shown in FIG. 16, there is a problem in that a signal cannot be maintained at high precision. The circuit in FIG. 16 is provided for each of a plurality of pixels in the FLCD device and includes a TFT 703 as an active element. The gate of the TFT 703 is connected to a gate line 701, and the source of the TFT 703 is connected to a data line 702 at 705. The drain of the TFT 703 is connected to an auxiliary capacitance $C_S$ via an auxiliary electrode 706. The drain is also connected to a pixel electrode 707. The pixel electrode 707 and an area of a counter electrode 708 corresponding to the pixel electrode 707 with the FLC molecules sandwiched therebetween have a liquid crystal capacitance LC. A gate signal is sent to the gate line 701 to control the TFT 703 to be ON or OFF. While the TFT 703 is ON, image data is supplied from the data line 702 to the auxiliary capacitance $C_S$ and to the pixel electrode 707 through the TFT 703.

As is mentioned above, the FLC material has spontaneous polarization (FIG. 4B). When a voltage is applied to the FLC material, a transient current flows due to a change in the alignment orientation of the FLC molecules. Since it takes several tens to several hundreds of microseconds to change the alignment orientation of the FLC molecules, the transient current continues to flow during such a period. In a display device using the FLC material, for example, a high definition TV, a writing time period allocated for one scanning line is several tens of microseconds or less. The transient current flows for longer than the writing time period. Due to the transient current flowing after the writing time period, the voltage applied to the FLC material changes, which prevents accurate writing.

With reference to FIGS. 1 and 2, a field-by-field sequential color display system will be described. The field-by-field sequential color display system utilizes the limit of the time resolution of the human eye: namely, the phenomenon that, when colors are sequentially changed too feet for the human eye to recognize each change, two sequential colors are mixed and recognized as one color. Generally, the color of light incident on the LCD device is periodically changed, using a high speed color variable filter.

FIG. 1 is a schematic view of a field-by-field sequential color display system 32 including a light selection device 15. The light selection device 15 is used as n flat panel high speed color variable filter and is used in combination with an LCD device (not shown) including pixels for each of the RGB colors. The light selection device 15 includes a cyan filter 29C, a magenta filter 29M and a yellow filter 29Y laminated in this order. The cyan filter 29C includes two transparent substrates. 20 and 21, transparent electrodes (not shown) provided on opposed surfaces of the two transparent substrates 20 and 21, and a liquid crystal layer 22 sandwiched between the transparent electrodes. The liquid crystal layer 22 includes a cyan dichroic pigment. The magenta filter 29M includes two transparent substrates 23 and 24, transparent electrodes (not shown) provided on opposed surfaces of the two transparent substrates 23 and 24, and a liquid crystal layer 25 sandwiched between the transparent electrodes. The liquid crystal layer includes a magenta dichroic pigment. The yellow filter 29Y includes two transparent substrates 26 and transparent electrodes (not shown) provided on opposed surfaces of the two transparent substrates 26 and and a liquid crystal layer 28 sandwiched between the transparent electrodes. The liquid crystal layer 28 includes a yellow dichroic pigment.

The cyan filter 29C, the magenta filter 29M and the yellow filter 29Y are supplied with AC voltages from corresponding AC power supplies 31 through switching circuits 30C, 30M, and 30Y. The switching circuits 30C, 30M, and 30Y selectively apply voltages to the cyan filter 29C, the magenta filter 29M and the yellow filter 29Y in accordance with a switching signal from a display control circuit 16 to drive the corresponding filters. By controlling the cyan filter 29C, the magenta filter 29M and the yellow filter 29Y to be ON or OFF in this manner, a red, green, or blue component of light is generated.

Table 2 shows the relationship between the ON/OFF state of the filters 29C, 29M, and 29Y and the color of the light obtained by each ON/OFF state.

TABLE 2

| ON/OFF state | | | |
|---|---|---|---|
| 29C | 29M | 29Y | Color |
| ON | OFF | OFF | Red |
| OFF | ON | OFF | Green |
| OFF | OFF | ON | Blue |

FIG. 2 is a timing diagram showing basic operation of the light selection device 15. During time t1 to time t3, a voltage is applied to the cyan filter 29C. The alignment of liquid crystal molecules in the liquid crystal layer 22 are not changed immediately after the application of the voltage, but only after a certain period τ. The period τ corresponds the response time of the liquid crystal molecules to application of the electric field. Accordingly, in the case when the application of the voltage starts at time to, the alignment of the liquid crystal molecules in the liquid crystal layer 22 of the cyan filter 29C is stabilized at time t2. During time t2 to time namely, during time period TR, the light coming out of the light selection device 15 is red. Voltages are applied to the magenta filter 29M and the yellow filter 29Y in the same manner to obtain the green and blue light by the light selection device 15.

By using the light selection device 15, the color of the light incident on the LCD device can be changed periodically. When the incident light is red, the LCD device performs display corresponding to a red component of the data signal. When the incident light is green, the LCD device performs display corresponding to a green component of the data signal. When the incident light is blue, the LCD device performs display corresponding to a blue component of the data signal. The human eye cannot recognize the rapid changes of the colors between red, green and blue, and so recognizes the three colors as a mixture of the colors.

The above-described field-by-field sequential color display system provides high luminance, high precision, high quality, light and compact color LCD devices for the following reasons.

(1) Since various arbitrary colors are obtained at one light transmitting area of the LCD device, precision of the displayed images is high, and reproduced colors are extremely similar to the original colors. The field sequential system was used as the standard system of the first-generation color TVs.

(2) Even if the LCD device has a defective pixel, an image corresponding to the defective pixel is displayed in white or black, which is less conspicuous than the color areas. Accordingly, a slight defect the pixel does not substantially deteriorate display quality.

(3) Since an LCD including a single set of substrates realizes full- or multiple-color display, a light and compact display device can be obtained.

In the case of driving any of the above-described conventional FLCD devices by the field-by-field sequential color display system, the writing time period allocated for one scanning lane is further shortened, and thus the contrast of images is lowered.

SUMMARY OF THE INVENTION

One aspect of the present invention relates to a ferroelectric liquid crystal display device comprising a plurality of pixels, each including ferroelectric liquid crystal material having ferroelectric liquid crystal molecules therein capable of being aligned in a first stable alignment state, whereby a principal axis of each of the molecules is aligned at an angle ω with respect to a central line, and of being aligned in a second stable alignment state, whereby the principal axis of each of the molecules is aligned at an angle −ω with respect to the central line; and a pair of polarizers on opposite sides of the ferroelectric liquid crystal material, a polarizing axis of one of the polarizers being substantially aligned with the central line.

In one embodiment of the invention, the ferroelectric liquid crystal molecules in one of the two stable alignment states is put at a position between the central line and a tilting axis by application of a voltage in the range between a prescribed positive voltage and a prescribed negative voltage, and the ferroelectric liquid crystal molecules in the other stable alignment state is put at a position between the central line and another tilting axis by application of a voltage in the range between a prescribed negative voltage and a prescribed positive voltage.

In one embodiment of the invention, the plurality of pixels are arranged in a matrix, and each of the plurality of pixels is connected to a driving circuit including a first switching device for controlling an output of a driving signal; a charge retaining capacitance for receiving an output from the first switching device; and a second switching device for receiving the output received by the charge retaining capacitance from the first switching device as a switching control signal for controlling an output of a charge for display sent from a display power source and for sending the charge for display to establish an arbitrary field across the ferroelectric liquid crystal molecules in the corresponding pixel.

In one embodiment of the invention, the driving circuit comprises a third switching device, connected between the second switching device and the pixel, for controlling an output of the charge for display sent from the second switching device to the corresponding pixel, wherein the first switching devices are activated line by lane to store a prescribed charge in each of the charge retaining capacitances, and thereafter a plane-scanning switching control signal is supplied to each of the third switching devices to update the charges for display stored in the pixels substantially simultaneously.

In one embodiment of the invention, the plurality of pixels are arranged in a matrix, and each of the plurality of pixels is connected to a driving circuit including a first switching device for controlling an output of a driving signal; a first charge retaining capacitance for receiving an output from the first switching device; a second switching device for receiving the output received by the charge retaining capacitance from the first switching device as a switching control signal for controlling an output of a charge sent from a first power source; a third switching device for controlling an output of the charge sent from the second switching device; a second charge retaining capacitance, connected to the third switching device, for receiving the charge sent from the third switching device; and a fourth switching device for receiving a potential of the second charge retaining capacitance as a switching control signal for controlling an output of the charge from a second power source and sending the charge to establish an arbitrary field across the ferroelectric liquid crystal molecules in the corresponding pixel, wherein the first switching devices are activated line by line to store a prescribed charge in each of the first charge retaining capacitances, and thereafter a plane-scanning switching control signal is supplied to each of the third switching devices via the charges retained in the second charge retaining capacitances and via the fourth switching devices to update the charges for display stored in the pixels substantially simultaneously.

In one embodiment of the invention, the ferroelectric liquid crystal display device further includes two substrates sandwiching the ferroelectric liquid crystal material, and one of the two substrates is formed of single crystalline silicon and the other substrate is formed of a light-transmitting material.

Another aspect of the present invention relates to a method for driving a ferroelectric liquid crystal display device including a plurality of pixels arranged in a matrix, each including ferroelectric liquid crystal material having ferroelectric liquid crystal molecules therein capable of being aligned in a first stable alignment state, whereby a principal axis of each of the molecules is aligned at an angle ω with respect to a central line, and of being aligned in a second stable alignment state, whereby the principal axis of each of the molecules is aligned at an angle −ω with respect to the central line, and a pixel electrode and a counter electrode sandwiching the ferroelectric liquid crystal material therebetween; a switching device corresponding to each of the pixels and having a gate electrode and a source electrode, one of which corresponds to the counter electrode; and a pair of polarizers on opposite sides of the ferroelectric liquid crystal material, a polarizing axis of one of the polarizers being substantially aligned with the central line. The method includes the steps of, in a first frame, activating the switching device to supply the counter electrode with a voltage which is no lower than a positive threshold voltage higher than the potential of the pixel electrode by a prescribed level, thereby putting the ferroelectric liquid crystal molecules included An the pixel into one of the two stable alignment states, and thereafter putting the ferroelectric liquid crystal molecules at a position corresponding to a prescribed light intensity by application of a voltage across the ferroelectric liquid crystal molecules in a range between a prescribed positive voltage and a prescribed negative voltage using the potential of the counter electrode as a reference potential; and, in a second frame, activating the switching device to supply the counter electrode with a voltage which is no higher than a negative threshold voltage lower than the potential of the pixel electrode by a prescribed level, thereby putting the ferroelectric liquid crystal molecules included in the pixel into the other stable alignment state, and thereafter putting the ferroelectric liquid crystal molecules at a position corresponding to a prescribed light intensity by application of a voltage across the ferroelectric liquid crystal molecules in a range between a prescribed negative voltage and a prescribed positive voltage using the potential of the counter electrode as a reference potential.

Still another aspect of the present invention relates to a method for driving a ferroelectric liquid crystal display device including a plurally of pixels arranged in a matrix, each including ferroelectric liquid crystal material having ferroelectric liquid crystal molecules therein capable of being aligned in a first stable alignment state, whereby a principal axis of each of the molecules is aligned at an angle ω with respect to a central line, and of being aligned in a second stable alignment state, whereby the principal axis of each of the molecules is aligned at an angle −ω with respect to the central line; a pixel electrode provided for each of the pixels and a single counter electrode corresponding to all the pixel electrodes, the pixel electrodes and the counter electrode sandwiching the ferroelectric liquid crystal material therebetween; a switching device corresponding to each of the pixels; and a pair of polarizers on opposite sides of the ferroelectric liquid crystal material, a polarizing axis of one of the polarizers being substantially aligned with the central line. The method includes the steps of, in a first frame, activating the switching device to supply the pixel electrode with a voltage which is no higher than a negative threshold voltage lower than the potential of the counter electrode by a prescribed level, thereby putting the ferroelectric liquid crystal molecules included in the pixel into one of the two stable alignment states, and thereafter putting the ferroelectric liquid crystal molecules at a position corresponding to a prescribed light intensity by application of a voltage across the ferroelectric liquid crystal molecules in a range between a prescribed positive voltage and a prescribed negative voltage using the potential of the pixel electrode as a reference potential; and, in a second frame, activating the switching device to supply the pixel electrode with a voltage which is no lower than a positive threshold voltage higher then the potential of the counter electrode by a prescribed level, thereby putting the ferroelectric liquid crystal molecules included in the pixel into the other stable alignment state, and thereafter putting the ferroelectric liquid crystal molecules at a position corresponding to a prescribed light intensity by application of a voltage across the ferroelectric liquid crystal molecules in a range between a prescribed negative voltage and a prescribed positive voltage using the potential of the pixel electrode as a reference potential.

Still another aspect of the present invention relates to a method for driving a ferroelectric liquid crystal display device including a plurality of pixels arranged in a matrix, each including ferroelectric liquid crystal material having ferroelectric liquid crystal molecules therein capable of being aligned in a first stable alignment state, whereby a principal axis of each of the molecules is aligned at an angle ω with respect to a central line, and of being aligned in a second stable alignment state, whereby the principal axis of each of the molecules is aligned at an angle −ω with respect to the central line, and a pixel electrode and a counter electrode sandwiching the ferroelectric liquid crystal material; a pair of polarizers on opposite sides of the ferroelectric liquid crystal material, a polarizing axis of one of the polarizers being substantially aligned with the central line; and a driving circuit connected to each of the plurality of pixels including a first switching device for controlling an output of a driving signal, a charge retaining capacitance for receiving an output from the first switching device, and a second switching device for receiving the output received by the charge retaining capacitance from the first switching device as a switching control signal for controlling an output of a charge for display sent from a display power source and for sending the charge for display to establish an arbitrary field across the ferroelectric liquid crystal molecules in the corresponding pixel. The method includes the steps of, in a first frame, activating the first switching device; in a first half of the period in which the first switching device is ON, putting the ferroelectric liquid crystal molecules into one of the two stable alignment states by providing the counter electrode with a voltage which is no lower than a positive threshold voltage higher than the potential of the pixel electrode by a prescribed level; in a second half of the period in which the first switching device is ON, putting the ferroelectric liquid crystal molecules at a position corresponding to a prescribed light intensity by application of a voltage across the ferroelectric liquid crystal molecules in a range between a prescribed positive voltage and a prescribed negative voltage using the potential of the counter electrode as a reference potential; continuously applying a voltage to the ferroelectric liquid crystal molecules through the second switching device after the first switching device turns OFF, thereby keeping the ferroelectric liquid crystal molecules at the position; in a second frame, activating the first switching device; in a first half of the period in which the first switching device is ON, putting the ferroelectric liquid crystal molecules into the other stable alignment state by providing the counter electrode with a voltage which is no higher than a negative threshold voltage lower than the potential of the pixel electrode by a prescribed level; in a second half of the period in which the first switching device is ON, putting the ferroelectric liquid crystal molecules at a position corresponding to a prescribed light intensity by application of a voltage across the ferroelectric liquid crystal molecules in a range between a prescribed negative voltage and a prescribed positive voltage using the potential of the counter electrode as a reference potential; and continuously applying a voltage to the ferroelectric liquid crystal molecules through the second switching device after the first switching device turns OFF, thereby keeping the ferroelectric liquid crystal molecules at the position.

Still another aspect of the present invention relates to a method for driving a ferroelectric liquid crystal display device including a plurality of pixels arranged in a matrix, each including ferroelectric liquid crystal material having ferroelectric liquid crystal molecules therein capable of being aligned in a first stable alignment state, whereby a principal axis of each of the molecules is aligned at an angle ω with respect to a central line, and of being aligned in a second stable alignment state, whereby the principal axis of each of the molecules is aligned at an angle −ω with respect to the central line; a pixel electrode provided for each of the pixels and a single counter electrode corresponding to all the pixel electrodes, the pixel electrodes and the counter electrode sandwiching the ferroelectric liquid crystal material; a pair of polarizers on opposite sides of the ferroelectric liquid crystal material, a polarizing axis of one of the polarizers being substantially aligned with the central line; and a driving circuit connected to each of the plurality of pixels including a first switching device for controlling an output of a driving signal, a charge retaining capacitance for receiving an output from the first switching device, and a second switching device for receiving the output received by the charge retaining capacitance from the first switching device as a switching control signal for controlling an output of a charge for display sent from a display power source and for sending the charge output to establish an arbitrary field across the ferroelectric liquid crystal molecules in the corresponding pixel. The method includes The steps of, in a first frame, activating the first switching device; in a first half of the period in which the first switching device is ON, putting the ferroelectric liquid-crystal molecules into one of the two stable alignment states by providing the pixel electrode with a voltage which is no higher than a negative threshold voltage lower than the potential of the counter electrode by a prescribed level; in a second half of the period in which the first switching device is ON, putting the ferroelectric liquid crystal molecules at a position corresponding to a prescribed light intensity by application of a voltage in a range between a prescribed positive voltage and a prescribed negative voltage using the potential of the pixel electrode as a reference potential; continuously applying a voltage to the ferroelectric liquid crystal molecules through the second switching device after the first switching device turns OFF, thereby keeping the ferroelectric liquid crystal molecules at the position; in a second frame, activating the first switching device; in a first half of the period in which the first switching device is ON, putting the ferroelectric liquid crystal molecules into the other stable alignment state by providing the pixel electrode with a voltage which is no lower than a positive threshold voltage higher than the potential of the counter electrode by a prescribed level; in a second half of the period in which the first switching device is ON, putting the ferroelectric liquid crystal molecules at a position corresponding to a prescribed light intensity by application of a voltage across the ferroelectric liquid crystal molecules in a range between a prescribed negative voltage and a prescribed positive voltage using the potential of the pixel electrode as a reference potential; and continuously applying a voltage to the ferroelectric liquid crystal molecules through the second switching device after the first switching device turns OFF, thereby keeping the ferroelectric liquid crystal molecules at the position.

Still another aspect of the present invention relates to a method for driving a ferroelectric liquid crystal display device including a plurality of pixels arranged in a matrix, each including ferroelectric liquid crystal material having ferroelectric liquid crystal molecules therein capable of being aligned in a first stable alignment state, whereby a principal axis of each of the molecules is aligned at an angle ω with respect to a central line, and of being aligned in a second stable alignment state, whereby the principal axis of each of the molecules is aligned at an angle −ω with respect to the central line, and a pixel electrode and a counter electrode sandwiching the ferroelectric liquid crystal material; a pair of polarizers on opposite sides of the ferroelectric liquid crystal material, a polarizing axis of one of the polarizers being substantially aligned with the central line; and a driving circuit connected to each of the plurality of pixels including a first switching device for controlling an output of a driving signal, a charge retaining capacitance for receiving an output from the first switching device, a second switching device for receiving the output received by the charge retaining capacitance from the first switching device as a switching control signal for controlling an output of a charge for display sent from a display power source and for sending the charge output to establish an arbitrary field across the ferroelectric liquid crystal molecules in the corresponding pixel, and a third switching device, connected between the second switching device and the pixel for controlling an output of the charge for display sent from the second switching device the corresponding pixel. The method includes the steps of, in a first frame, activating the first switching device line by line to store a prescribed charge in each of the charge retaining capacitances; applying a plane-scanning switching control signal to each of third switching devices to update a charge for display retained in the ferroelectric liquid crystal molecules in each of the pixels substantially simultaneously; in a first half of the period in which the first switching devices are ON, supplying the counter electrode with a voltage which is no lower than a positive threshold voltage higher than the potential of the pixel electrode by a prescribed level, thereby putting the ferroelectric liquid crystal molecules included in the pixel into one of the two stable alignment states; in a second half of the period in which the first switching devices are ON, changing the voltage applied to the counter electrode to supply a voltage corresponding the charge retained in the charge retaining capacitance to the ferroelectric liquid crystal molecules; in a second frame, activating the first switching device line by line to store a prescribed charge in each the charge retaining capacitances; applying a plane-scanning switching control signal to each of the third switching devices to update a charge for display retained in the ferroelectric liquid crystal molecules in each of the pixels substantially simultaneously; in a first half of the period in which the first switching devices are ON, supplying the counter electrode with a voltage which is no higher than a negative threshold voltage lower then the potential of the pixel electrode by a prescribed level, thereby putting the ferroelectric liquid crystal molecules included in the pixel into the other stable alignment state; and in a second half of the period in which the first switching devices are ON, changing the voltage applied to the counter electrode to supply a voltage corresponding to the charge retained in the charge retaining capacitance to the ferroelectric liquid crystal molecules.

Still another aspect of the present invention relates to a method for driving a ferroelectric liquid crystal display device including a plurality of pixels arranged in a matrix, each including ferroelectric liquid crystal material having ferroelectric liquid crystal molecules therein capable of being aligned in a first stable alignment state, whereby a principal axis of each of the molecules is aligned at an angle ω with respect to a central line, and of being aligned in a second stable alignment state, whereby the principal axis of each of the molecules is aligned at an angle −ω with respect to the central line; a pixel electrode provided for each of the pixels and a single counter electrode corresponding to all the pixel electrodes, the pixel electrodes and the counter electrode sandwiching the ferroelectric liquid crystal material; a pair of polarizers on opposite sides of the ferroelectric liquid crystal material, a polarizing axis of one of the polarizers being substantially aligned with the central line; and a driving circuit connected to each of the plurality of pixels including a first switching device for controlling an output of a driving signal, a charge retaining capacitance for receiving an output from the first switching device, a second switching device for receiving the output received by the charge retaining capacitance from the first switching device as a switching control signal for controlling an output of a charge for display sent from a display power source and for sending the charge output to establish an arbitrary field across the ferroelectric liquid crystal molecules in the corresponding pixel, and a third switching device, connected between the second switching device and the pixel for controlling an output of the charge for display sent from the second switching device to the corresponding pixel. The method includes the steps of, in a first frame, activating the first switching device line by line to store a prescribed charge in each of the charge retaining capacitances; applying a plane-scanning switching control signal to each of the third switching devices to update a charge for display retained in the ferroelectric liquid crystal molecules in each of the pixels simultaneously; in a first half of the period in which the first switching devices are ON, supplying the pixel electrode with a voltage which is no higher than a negative threshold voltage lower than the potential of the counter electrode by a prescribed level, thereby putting the ferroelectric liquid crystal molecules included in the pixel into one of the two stable alignment states; in a second half of the period in which the first switching devices are ON, changing the voltage applied to the pixel electrode to supply a voltage corresponding to the charge retained in the charge retaining capacitance to the ferroelectric liquid crystal molecules; in a second frame, activating the first switching device line by line to store a prescribed charge in each of the charge retaining capacitances; applying a plane-scanning switching control signal to each of the third switching devices to update a charge for display retained in the ferroelectric liquid crystal molecules in each of the pixels substantially simultaneously; in a first half of the period in which the first switching devices are ON, supplying the pixel electrode with a voltage which is no lower than a positive threshold voltage higher than the potential of the counter electrode by a prescribed level, thereby putting the ferroelectric liquid crystal molecules included in the pixel into the other stable alignment state; and in a second half of the period in which the first switching devices are ON, changing the voltage applied to the pixel electrode to supply a voltage corresponding to the charge retained in the charge retaining capacitance to the ferroelectric liquid crystal molecules.

In one embodiment of the invention, the ferroelectric liquid crystal molecules in areas included in pixels included in adjacent groups of rows in the matrix are supplied with voltages having opposite polarities to each other.

In one embodiment of the invention, the ferroelectric liquid crystal molecules in areas included in pixels included in adjacent groups of columns in the matrix are supplied with voltages having opposite polarities to each other.

In one embodiment of the invention, the ferroelectric liquid crystal molecules in areas included in pixels included in adjacent groups of rows and columns in the matrix are supplied with voltages having opposite polarities to each other.

In one embodiment of the invention, the ferroelectric liquid crystal molecules in areas included in adjacent pixels in the matrix are supplied with voltages having opposite polarities to each other.

Still another aspect of the present invention relates to a method for driving a ferroelectric liquid crystal display device including a plurality of pixels, each including ferroelectric liquid crystal material having ferroelectric liquid crystal molecules therein capable of being aligned in a first stable alignment state whereby a principal axis of each of the molecules is aligned at an angle ω with respect to a central line, and capable of being aligned in a second stable alignment state whereby the principal axis of each of the molecules is aligned at an angle −ω with respect to the central line, and a pair of polarizers on opposite sides of the ferroelectric liquid crystal material included in the plurality of pixels, a polarizing axis of one of the polarizers being substantially aligned with the central line. The method includes the steps of supplying a positive voltage across the ferroelectric liquid crystal material of at least one of the plurality of pixels which is equal to or greater than a positive threshold voltage to position the ferroelectric liquid crystal molecules in the at least one pixel in the first stable alignment state, and thereafter positioning the ferroelectric liquid crystal molecules in the at least one pixel at a first position for providing a prescribed optical transmission by applying a first voltage across the ferroelectric liquid crystal material in the at least one pixel which is less than the positive threshold voltage and greater than a negative threshold voltage; and supplying a negative voltage across the ferroelectric liquid crystal material in the at least one pixel which is equal to or less than a negative threshold voltage to position the ferroelectric liquid crystal molecules in the at least one pixel in the second stable alignment state, and thereafter positioning the ferroelectric liquid crystal molecules as a second position for providing the prescribed optical transmission by applying a second voltage across the ferroelectric liquid crystal material in the at least one pixel which is greater than the negative threshold voltage end less than the positive threshold voltage. The second voltage has substantially the same magnitude as the first voltage and a different polarity.

Thus, the invention described herein makes possible the advantages of providing an FLCD device which performs accurate display regardless of temperature changes, allows the same amount of light to be transmitted therethrough with respect to two voltages having the same magnitude and opposite polarities, thus to realize better display, has a high response speed and uniform alignment of the FLCD molecules, end realizes accurate display by preventing voltage fluctuation occurring due to a transient current; and provides a method for driving such an FLCD device.

These and other advantages of the present invention will become apparent to those skilled in the art upon reading and understanding the following detailed description with reference to the accompanying figures.

BRIEF DESCRIPTION OF THE DRAWINGS

FIG. 18 is a waveform diagram illustrating voltage waveforms for driving the FLCD device in a method in accordance with a seventh example of the present invention;

FIG. 19 is a waveform diagram illustrating voltage waveforms for driving the FLCD device in a method in accordance with an eighth example of the present invention;

FIG. 34 is a cross sectional view of an FLCD device in the first through fourth examples according to the present invention.

DESCRIPTION OF THE PREFERRED EMBODIMENTS

Figure 1:
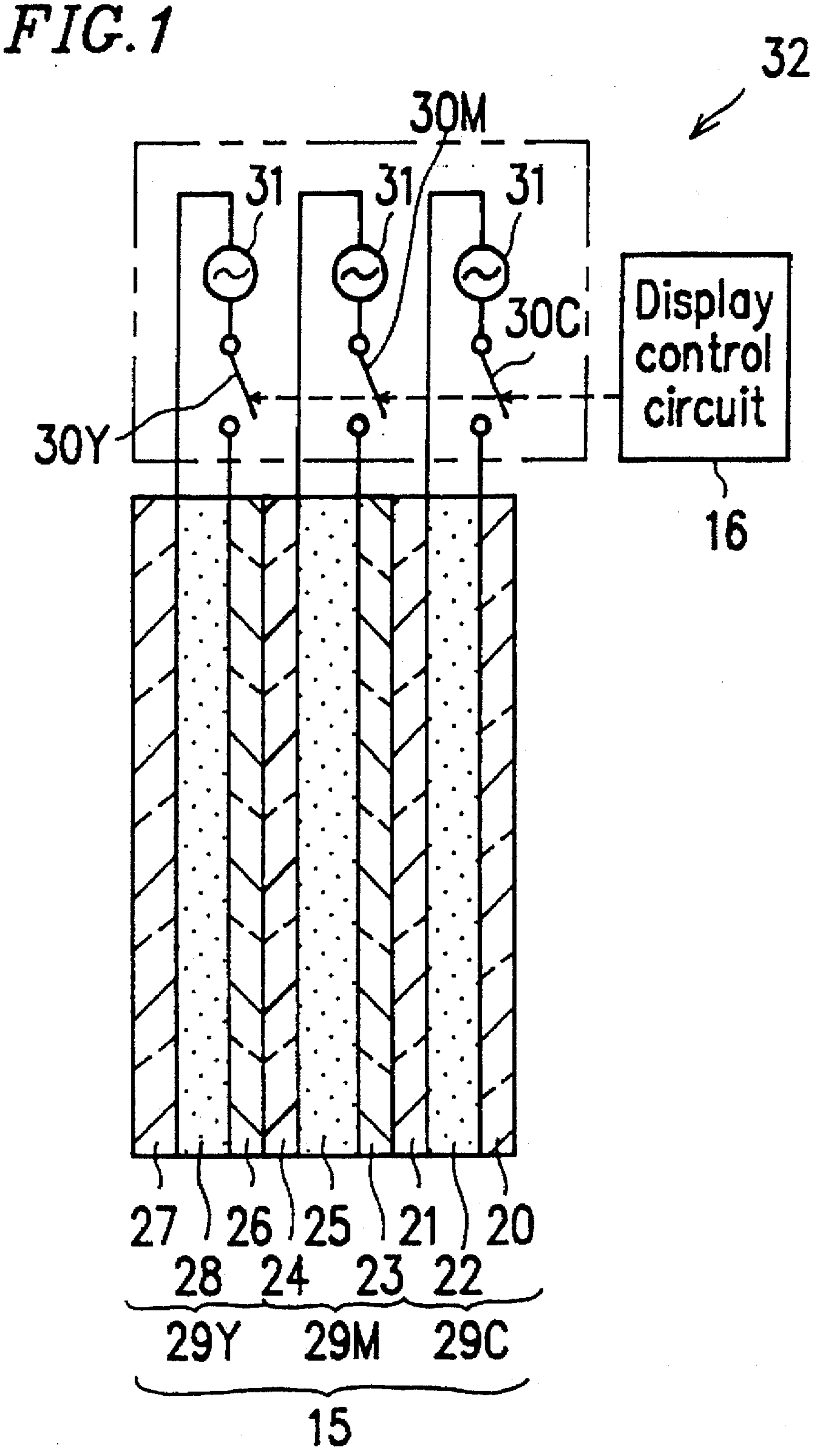
FIG. 1 is a schematic view of a conventional field-by-field sequential color display system.

Hereinafter, the present invention will be described by way of illustrative examples with reference to the accompanying drawings wherein like reference numerals refer to like elements throughout.

Example 1

Figure 24:
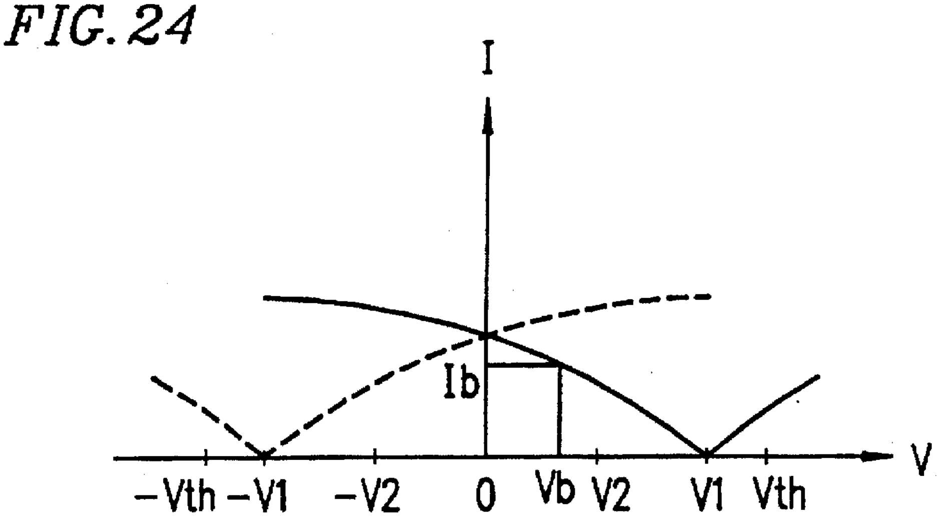
FIG. 24 is a graph illustrating the relationship between the voltage applied to an FLCD device according to the present invention and the intensity of light transmitted therethrough.
Figure 25:
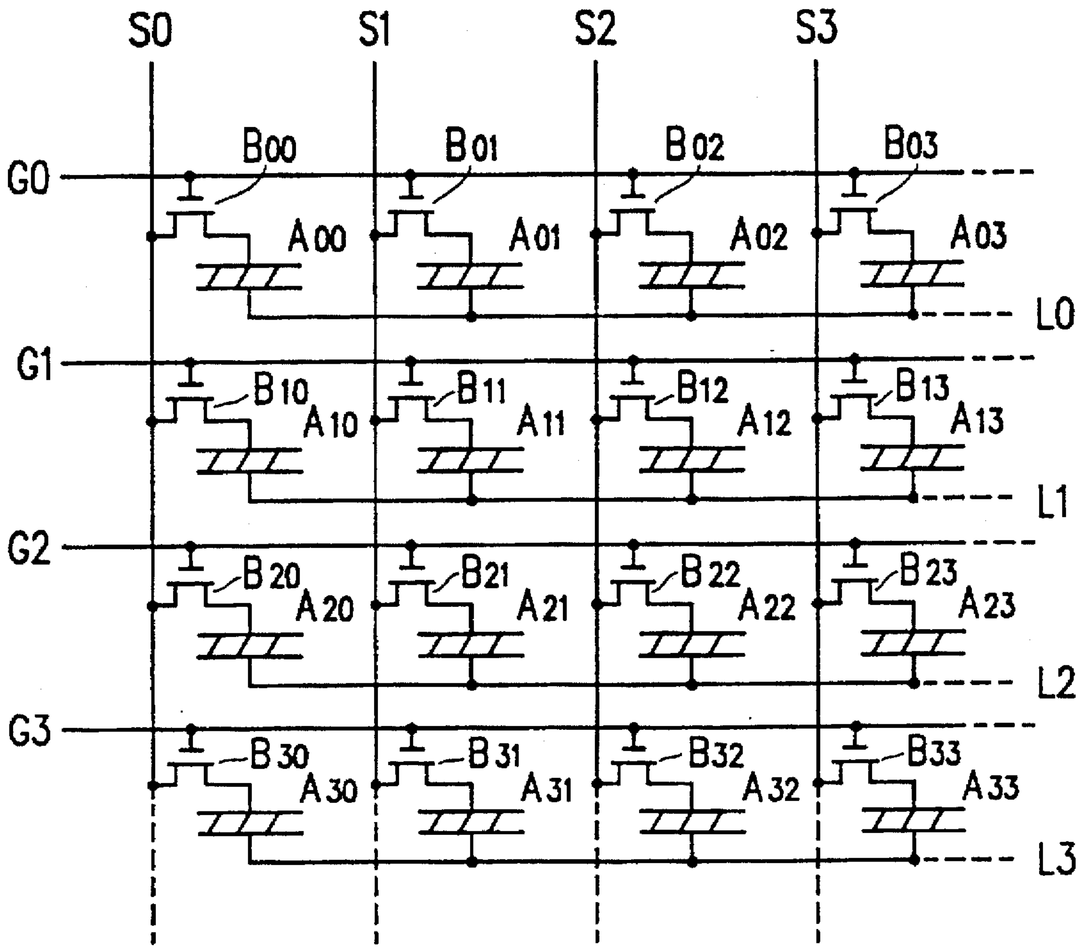
FIG. 25 is a schematic diagram of an FLCD device in a first example according to the present invention.
Figure 26A:
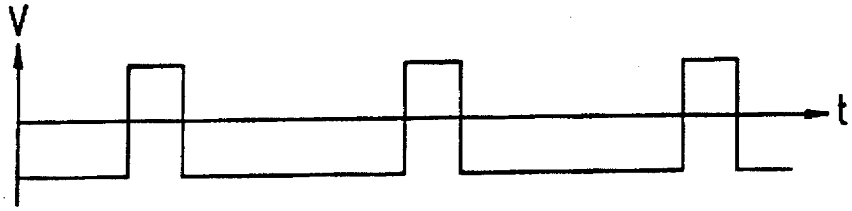
FIG. 26 is a waveform diagram illustrating voltage waveforms for driving the FLCD device in a method in accordance with the first example.
Figure 26B:
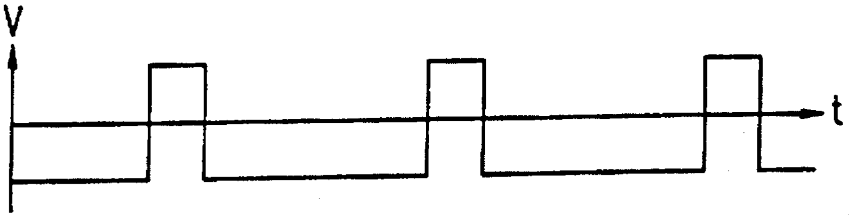
Figure 26C:
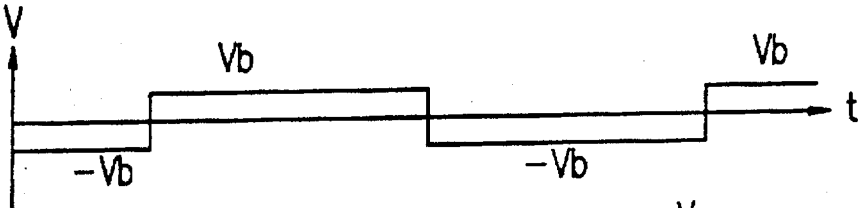
Figure 26D:
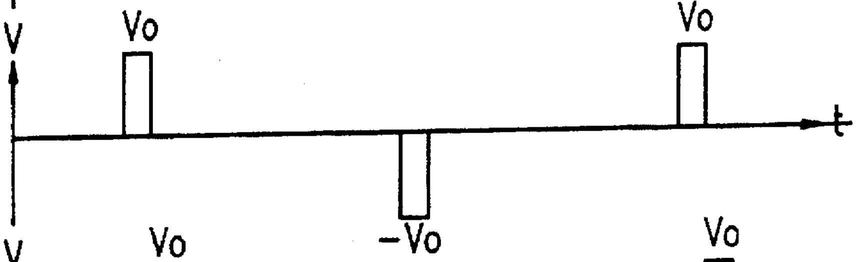
Figure 26E:
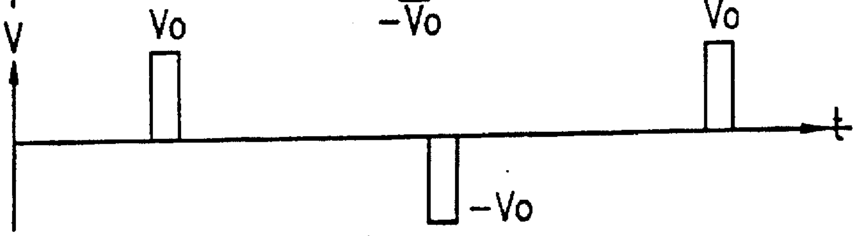
Figure 26F:
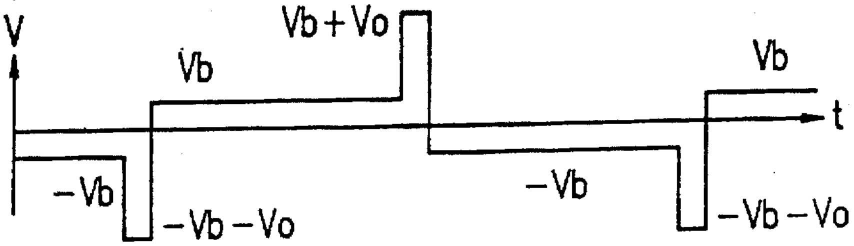
Figure 26G:
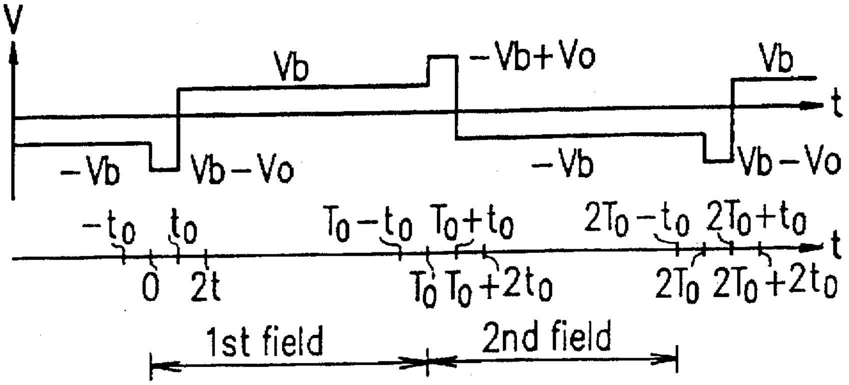
Figure 27A:
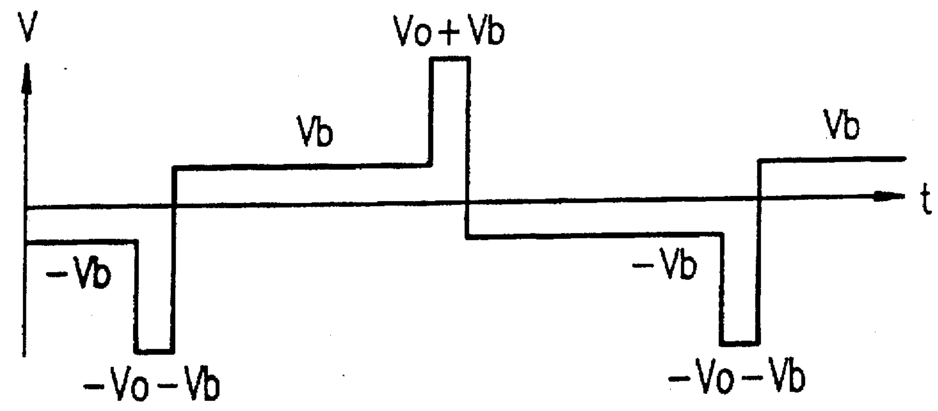
FIG. 27 is a graph illustrating the relationship between the voltage applied to an FLCD device according to the present invention and the intensity of light transmitted therethrough.
Figure 27B:
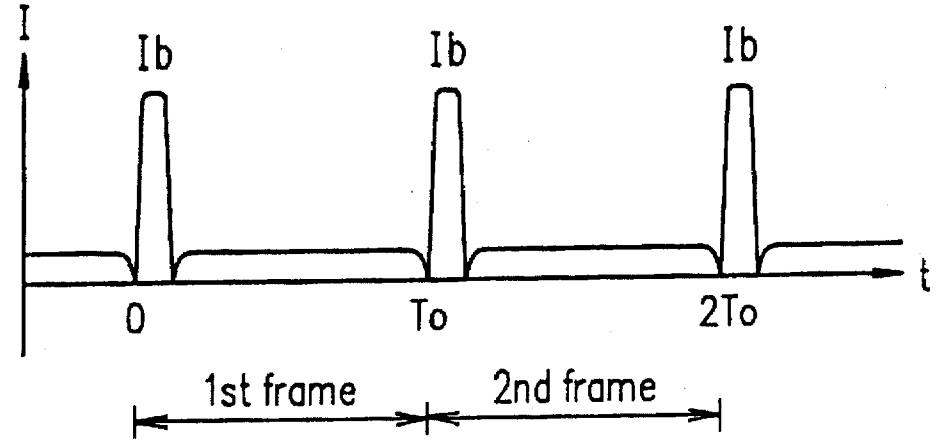

A first example according to the present invention will be described with reference to FIGS. 4A, 24 through 27, and 34. As is described above, FIG. 4A is a view illustrating two stable alignment states in an FLCD device seen from one of the two substrates. FIG. 34 is a cross sectional view of an FLCD device 300 in accordance with the first example. FIG. 24 is a graph illustrating the intensity I of light transmitted through an FLC layer 207 of the FLCD device 300 relative to the voltage V applied thereto. FIG. 25 is a schematic diagram of the FLCD device 300. FIG. 26 is a waveform diagram of voltages of electrode lines and pixels in the FLCD device 300. FIG. 27 is a waveform diagram illustrating the relationship between the voltage V applied to the FLCD device 300 and the intensity I of light transmitted through the FLCD device 300.

Figure 20:
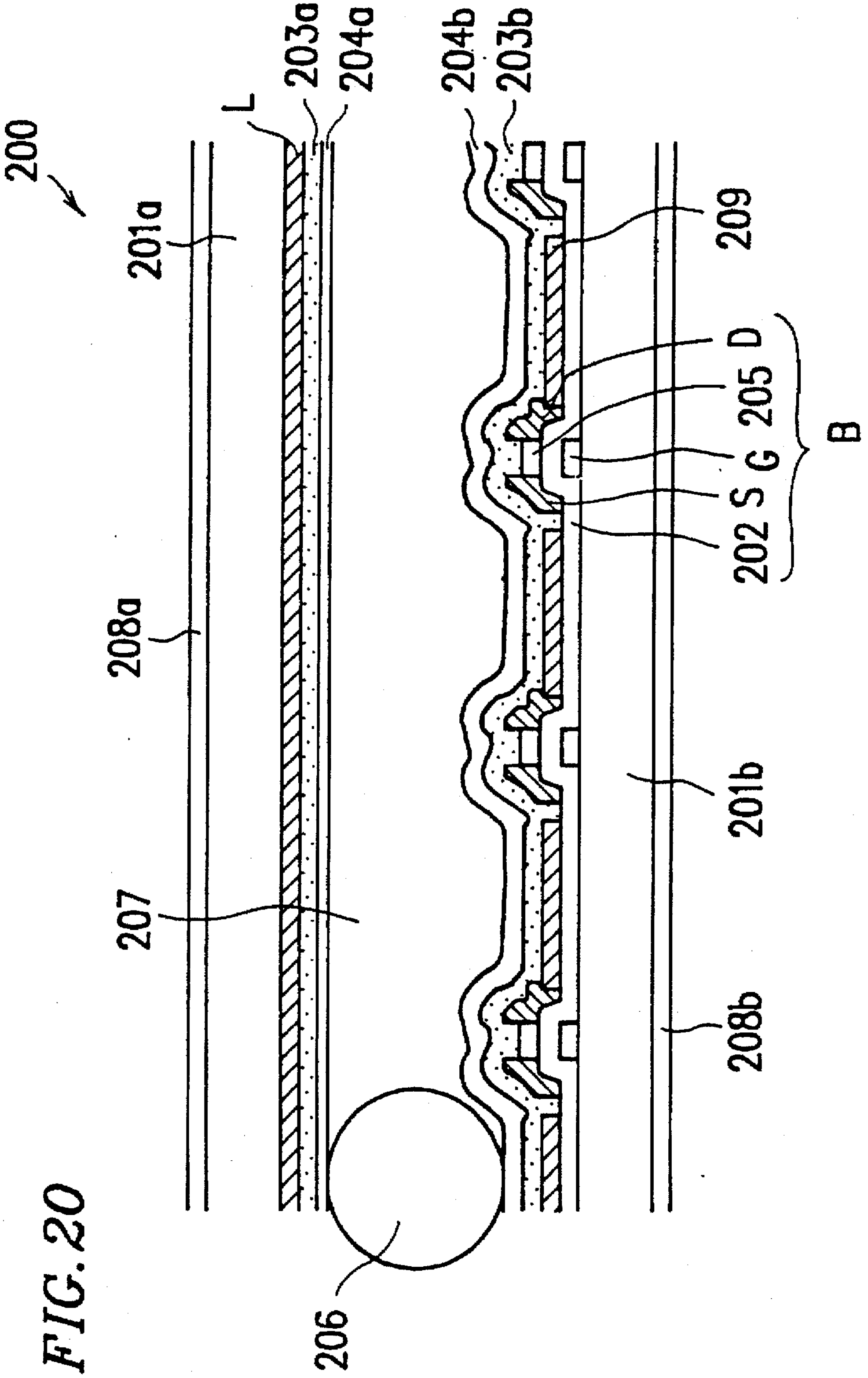
FIG. 20 is a cross sectional view of a conventional FLCD device.
Figure 21:
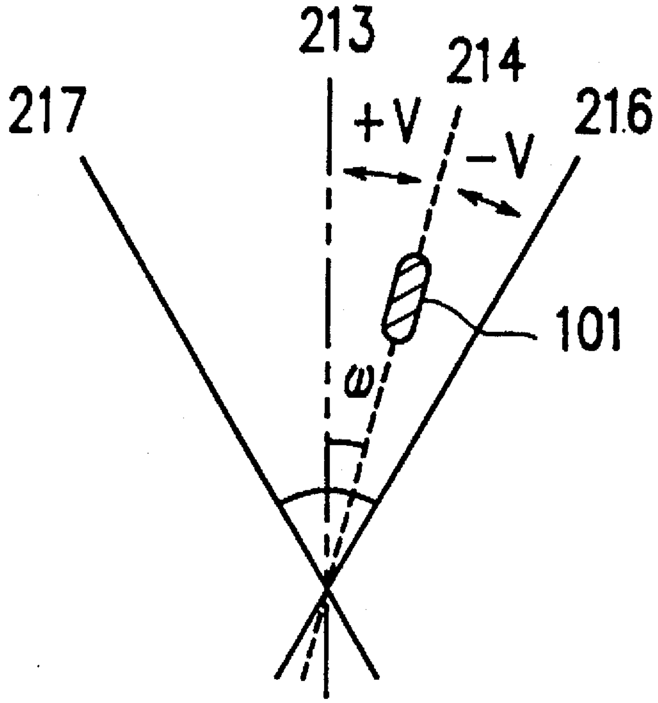
FIG. 21 is a diagrammatic view illustrating a single stable alignment state of the FLC molecules.
Figure 22A:
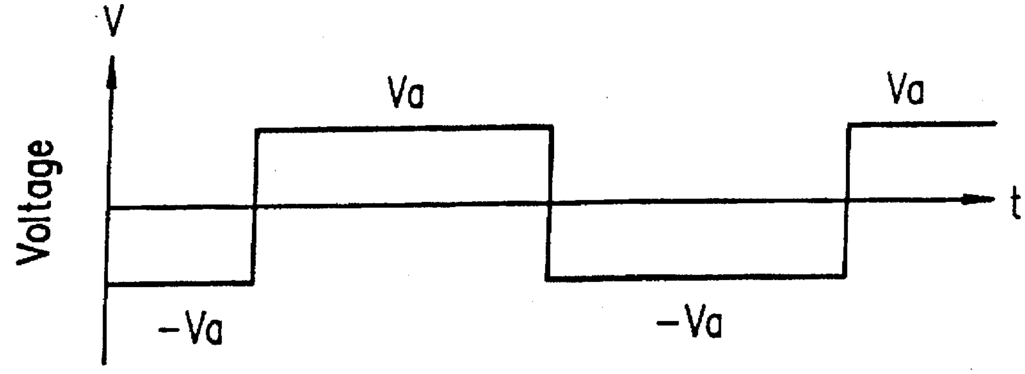
FIG. 22A PRIOR ART
FIG. 22 is a diagram illustrating the relationship between the voltage applied to a conventional FLCD device and the intensity of light transmitted therethrough.
Figure 22B:
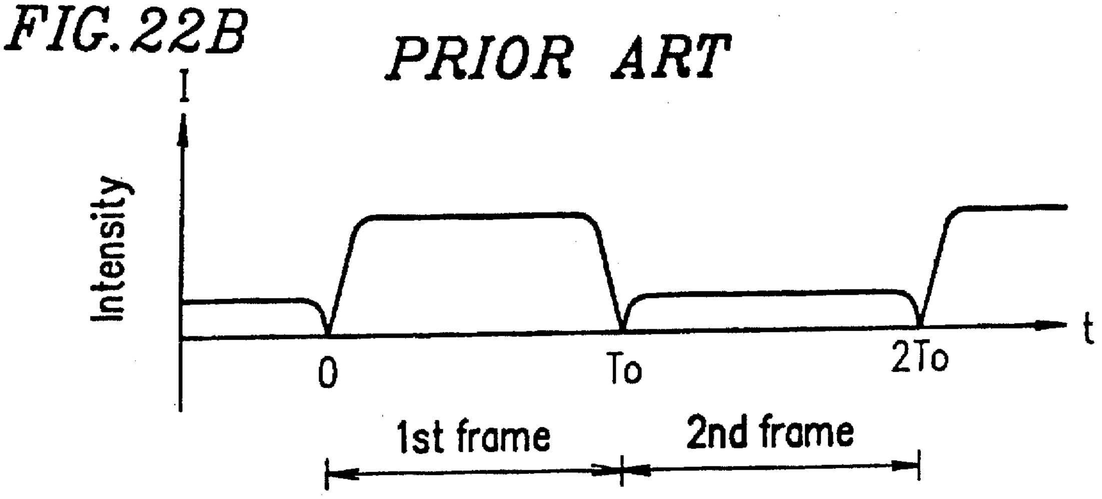
FIG. 22B PRIOR ART
Figure 23:
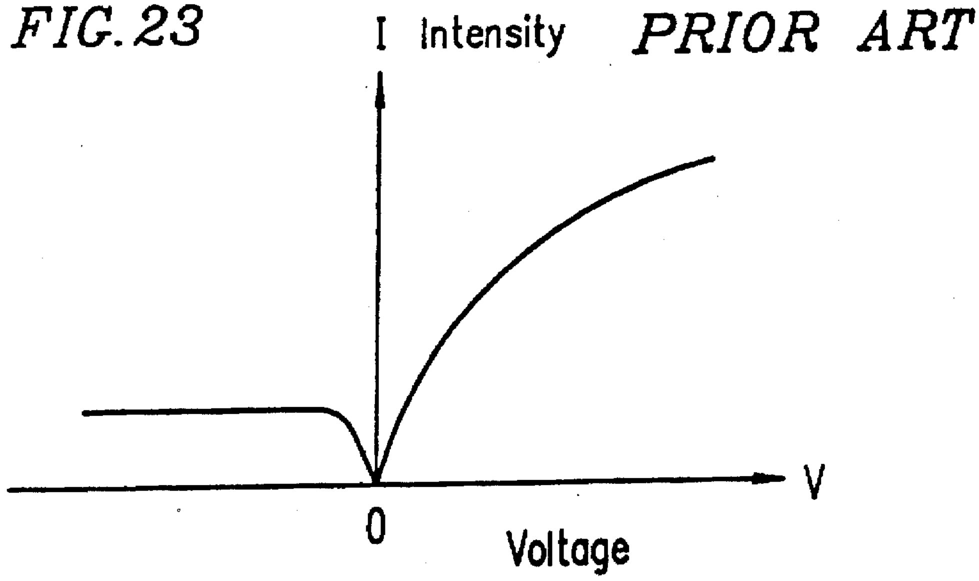
FIG. 23 PRIOR ART
FIG. 23 is a graph illustrating the relationship between the voltage applied to a conventional FLCD device and the intensity of light transmitted therethrough.

As is illustrated in FIG. 34, the FLCD device 300 in accordance with the first example has a similar structure as that of the FLCD device 200 shown in FIG. 20. In the FLCD device 300, alignment layers 204*a*' and 204*b*' are treated by rubbing in the same direction (parallel rubbing) to put the FLC molecules 101 in the FLC layer 207 into one of either stable alignment state 104 or 105 as is shown An FIG. 4A, and the polarizing axis of the polarizing plates 208*a*' or 208*b*' is aligned with the central line 103 with the polarizing axis of the other polarizing plate being perpendicular thereto. Each pixel electrode 209, an area of the FLC layer 207 corresponding to the pixel electrode 209, and an area of the counter electrode L also in correspondence with the pixel electrode 209 are included in a pixel.

The FLCD device 300 is driven in the following field-by-field operation.

Figure 4A:
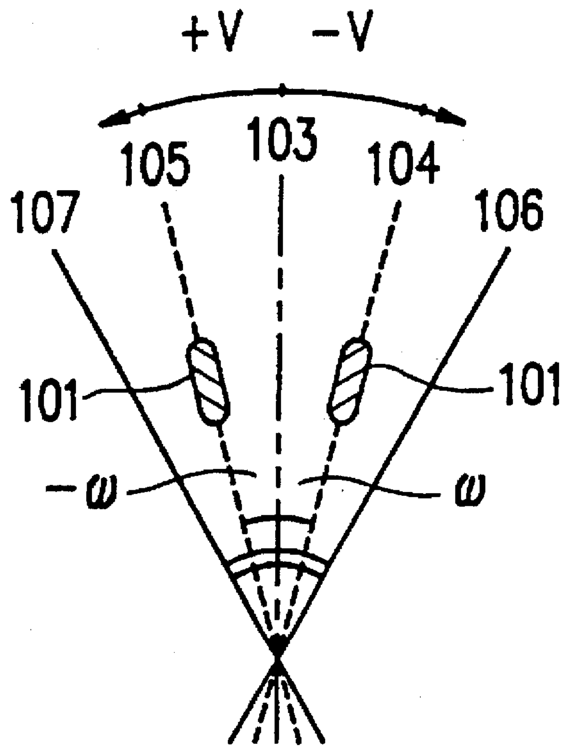
FIG. 4A is a view illustrating two stable alignment states of the FLC molecules.
Figure 4B:
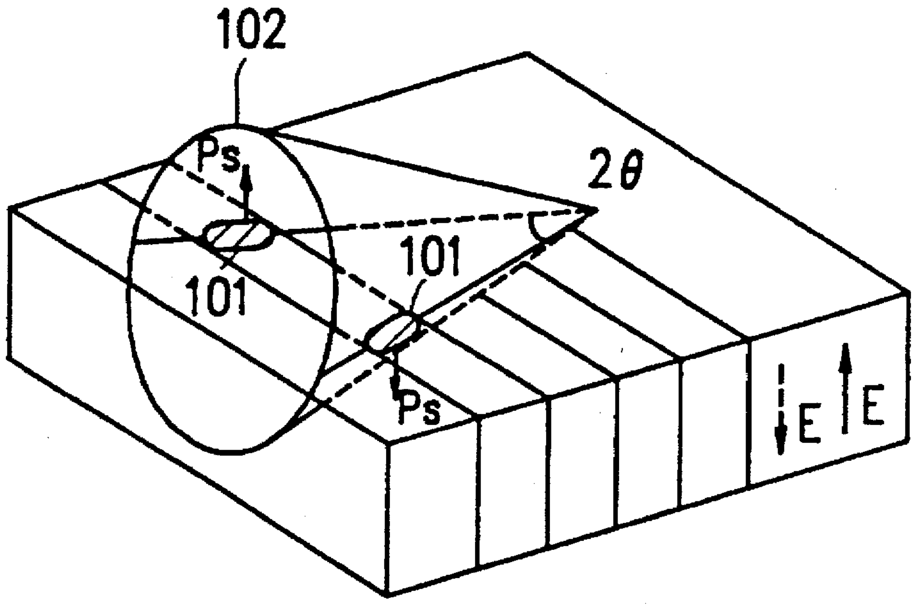
FIG. 4B is a view illustrating the spontaneous polarization of the FLC molecules.

In a first field, a negative voltage which is equal to or lower than a negative threshold voltage −Vth is applied via the pixel electrode 209 and the counter electrode L to the FLC molecules 101 in an area of the FLC layer 207 included in a pixel to put the FLC molecules 101 into one stable alignment state 104 (FIG. 4A). Then, an arbitrary voltage in the range between a positive voltage $V_1$ equal to or lower than a positive threshold voltage Vth and a negative voltage $-V_2$ is applied to the FLC molecules 101 included in the same pixel to put the FLC molecules 101 at an arbitrary position between the central line 103 and the tilting axis 106. As a result, the effective applied voltage V and the intensity I of light transmitted through the area of the FLC layer 207 included in the pixel have the relationship as is indicated by the solid line in FIG. 24. The threshold voltage is a minimum voltage which is necessary to move the FLC molecules 101 from one stable alignment state to the other stable alignment state.

In a second field, a positive voltage which is equal to or higher than a positive threshold voltage Vth is applied to the FLC molecules 101 included in the pixel to put the FLC molecules 101 into the other stable alignment state 105 (FIG. 4A). Then, an arbitrary voltage in the range between a negative voltage $-V_1$ equal to or higher than a negative threshold voltage −Vth and a positive voltage $V_2$ is applied to the FLC molecules 101 to put the FLC molecules 101 at an arbitrary position between the central line 103 and the tilting axis 107. As a result, the effective applied voltage V and the intensity I of transmitted light have the relationship as is indicated by the dashed line in FIG. 24.

As is apparent from FIG. 24, the intensity I of transmitted light is identical with respect to two voltages having an identical absolute value and opposite polarities. Accordingly, even when the frame rate used for driving the FLCD device 300 is as low as 60 Hz, flicker is not recognized.

Figure 30:
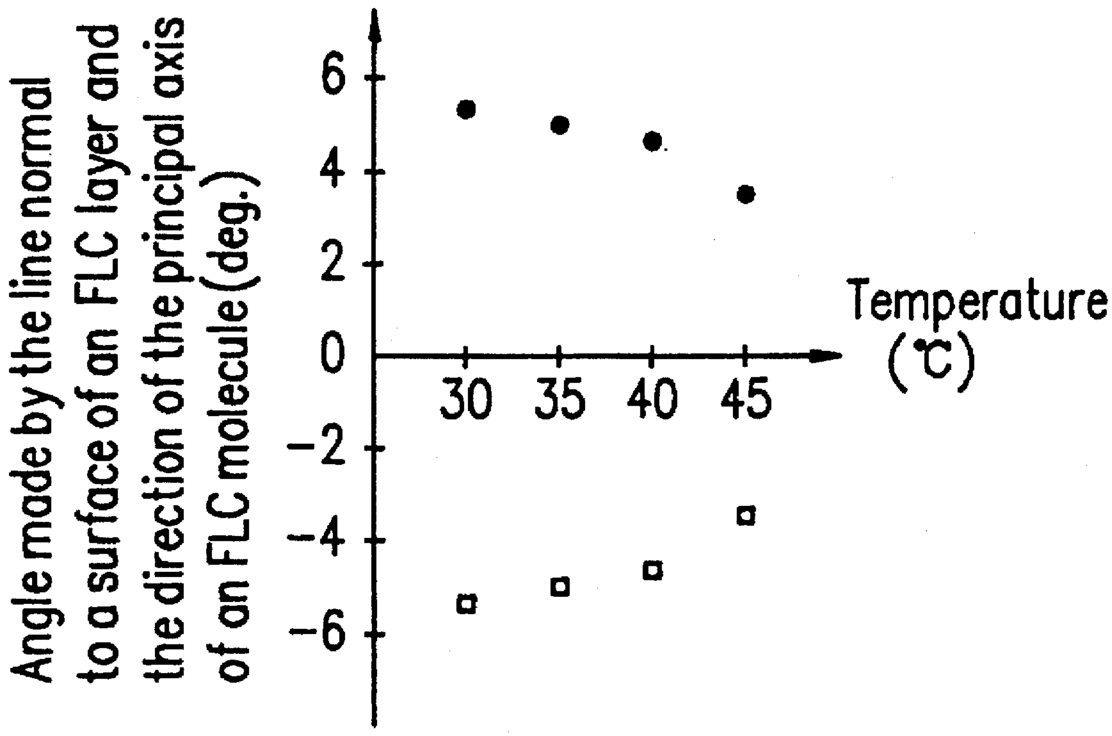
FIG. 30 is a graph illustrating the relationship between the temperature of the cell and the angle made by the line normal to a surface of an FLC layer and the direction of the principal axis of an FLC molecule.

Although the respective angles ω and −ω change in accordance with the temperature of the cell as is described above with reference to FIG. 30, the direction of the central line 103 remains substantially aligned with the rubbing direction of the polarizing plates 208*a*' or 208*b*' regardless of the temperature. According to the present invention, the polarizing axis of either one of the polarizing plate 208*a*' or 208*b*' is aligned with the central line 103, and the FLC molecules 101 are moved from the stable alignment state 104 or 105 to the central line 103 by changing the level of the voltage applied to the FLC molecules 101. Accordingly, even though the angles ω and −ω change in correspondence with the temperature, the FLC molecules 101 can be moved back to the stable alignment state 104 or 105 by adjusting the level of the voltage. Thus, the principal axis of the FLC molecules 101 when no voltage is applied is constantly oriented in the same direction regardless of the temperature.

The FLCD device 300 utilizes bistability of the FLC material, and thus it is not necessary to realize the single stability. Further, singe the darkest state is realized when a voltage equal to or greater than the threshold voltage is applied to align the principal axis of the FLC molecules 101 with the central line 103, a uniformly aligned, satisfactory black state can be obtained. In addition, since the bistability is realized by general parallel rubbing, further satisfactory alignment and thus a higher contrast of displayed images are obtained. Moreover, as is mentioned above, the intensity of light transmitted through the FLCD device 300 is identical with respect to two voltages having an identical absolute value and opposite polarities.

Figure 5:
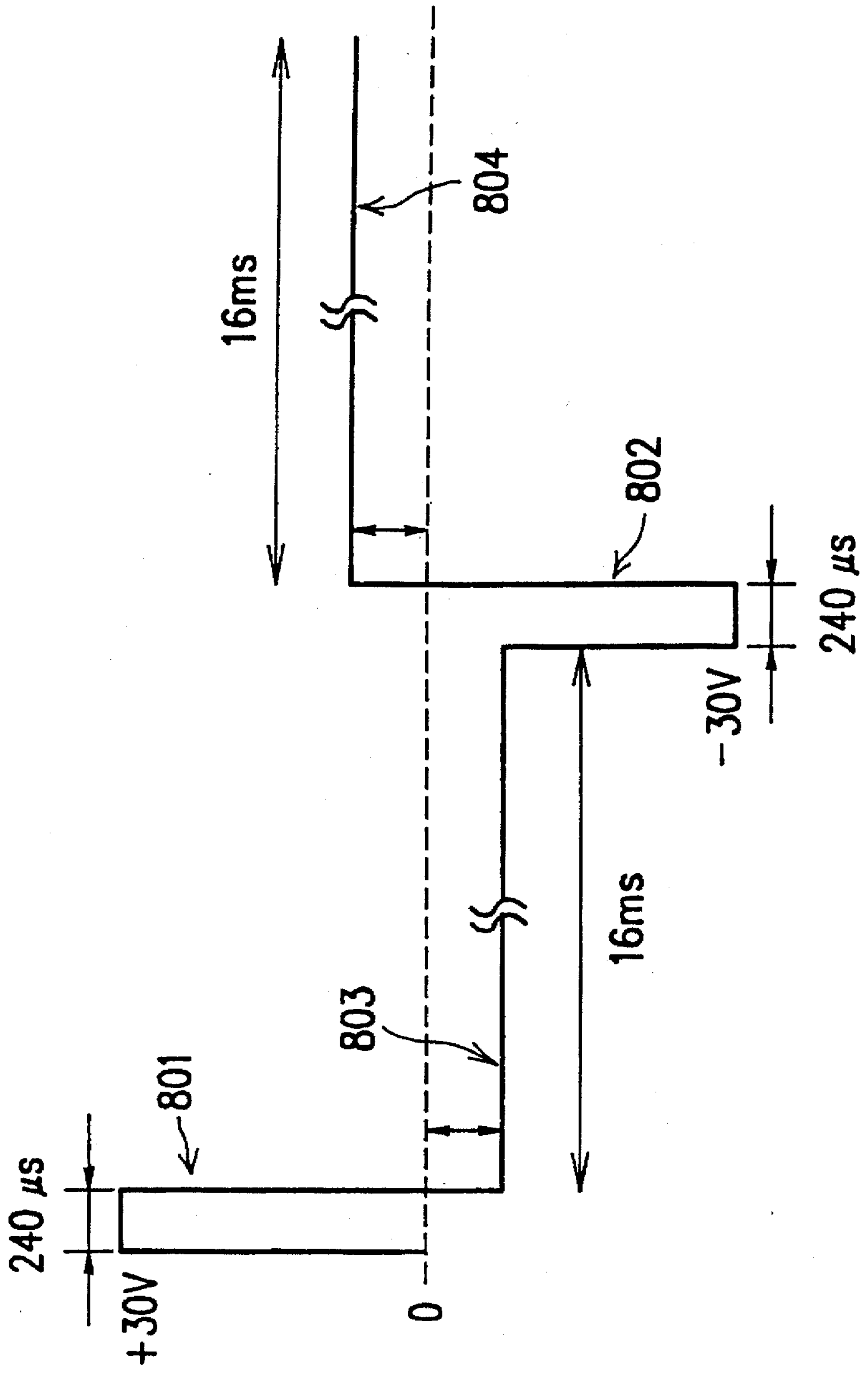
FIG. 5 is a waveform diagram of a voltage applied to an FLCD device in accordance with the present invention.
Figure 6:
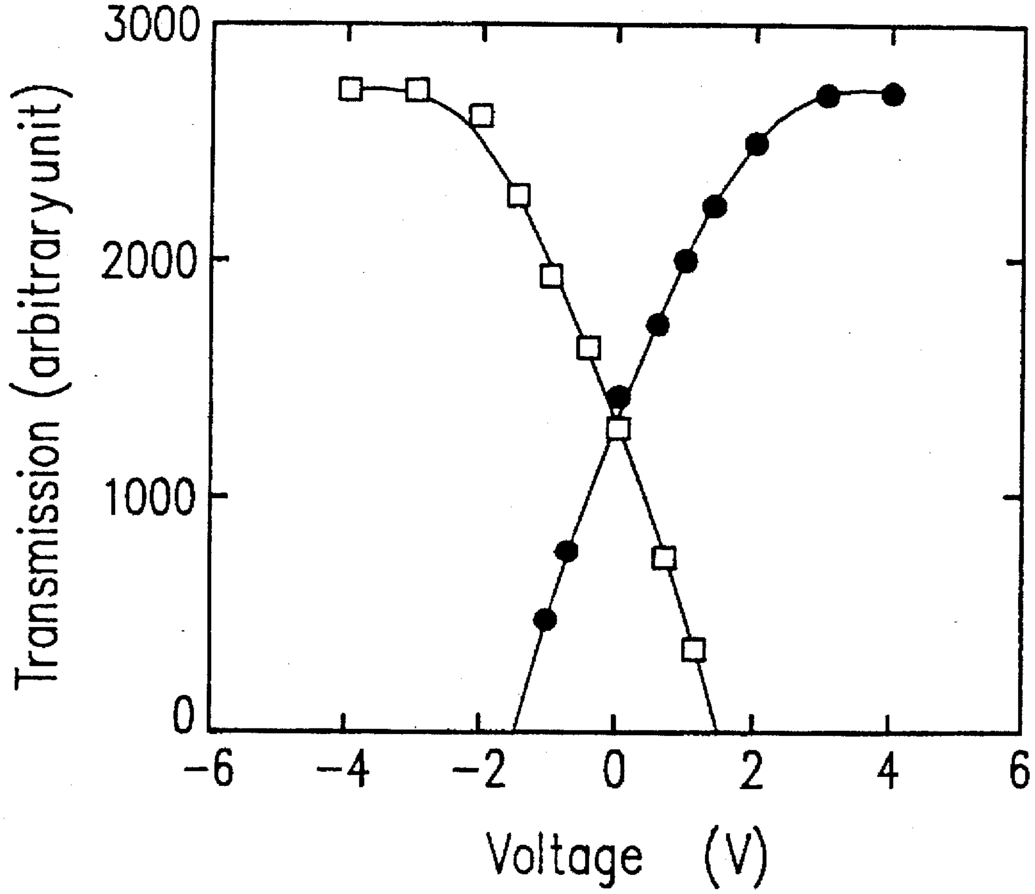
FIG. 6 is a graph illustrating the light transmission of the FLCD device according to the present invention with respect to the voltage applied thereto.
Figure 7:
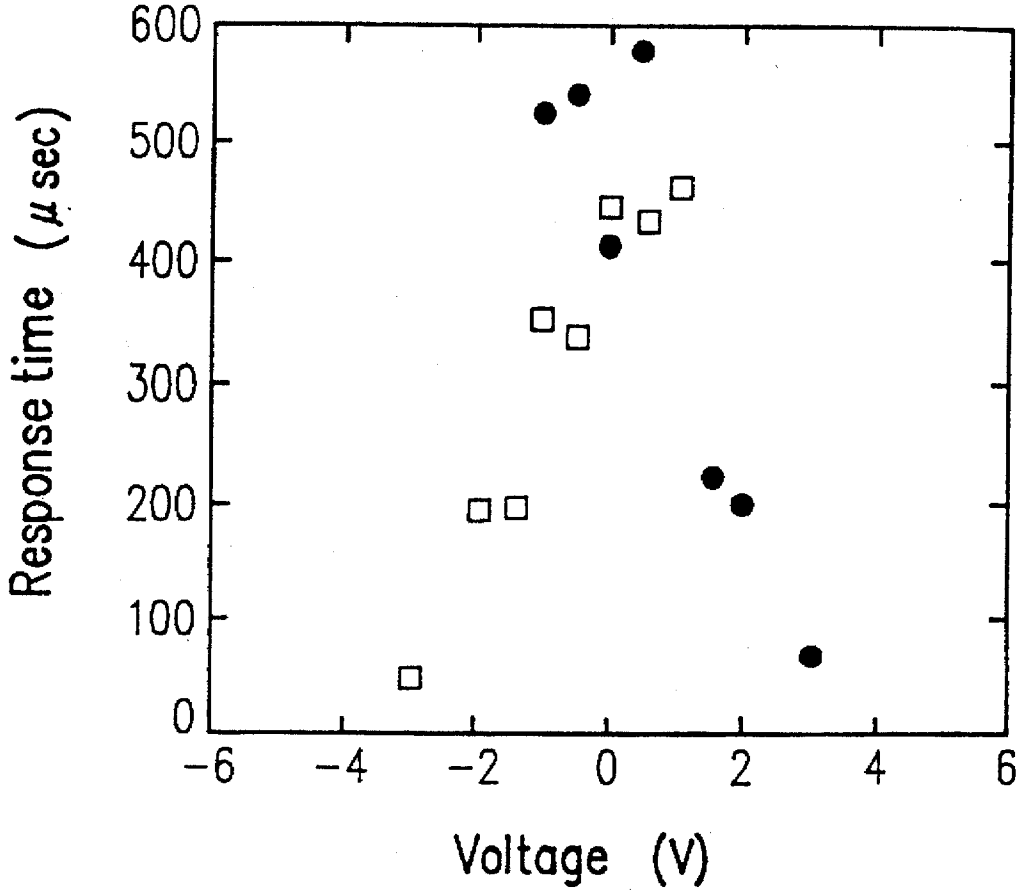
FIG. 7 is a graph illustrating the response time of the FLCD device according to the present invention with respect to the voltage applied thereto.

In the case when the FLCD device 300 has a cell thickness of 1.2 μm and a C2 alignment, and uses SBE-8 (produced by Merck & Co., Inc.) having a composition shown in Table 1 for the ferroelectric material and PSI-A-2101 (produced by Chisso Petrochemical Corp.) for the alignment layers 204*a*' and 204*b*', the characteristics of the FLCD device 300 are as illustrated FIGS. 5 through 10. FIG. 5 illustrates a waveform of a voltage applied to the FLCD device 300 via the respective pixel electrodes 209 and the counter electrode L. FIG. 6 is a graph illustrating the light transmission of the FLCD device 300 with respect to the voltage. FIG. 7 is a graph illustrating the response time with respect to the voltage.

In FIG. 5, reference numerals 801 and 802 denote pulse voltages (hereinafter, referred to as the "reset pulse voltages") for putting the FLC molecules into two stable alignment states, respectively. After put into one of the two stable alignment states by the reset pulse voltage 801, the FLC molecules 101 are put into a position corresponding to a desirable intensity of transmitted light by application of a voltage 803. In FIG. 6, black circles indicate the transmission after the FLC molecules 101 are reset to one of the stable alignment states by a positive voltage 801, and white squares indicate the transmission after the FLC molecules 101 are reset to the other stable alignment state by a negative voltage 802. As is apparent from FIG. 6, an image having various tones can be displayed. In FIG. 7, the response time is represented as the time from 10% of the total change of the intensity is obtained until 90% of the total change of the intensity is obtained or vice versa after the reset pulse voltages 801 and 802 are applied. Again, black circles indicate the response time after the FLC molecules 101 are reset to one of the two stable alignment states by a positive voltage 801, and white squares indicate the response time after the FLC molecules 101 are reset to the other stable alignment state by a negative voltage 802. As is apparent from FIG. 7, the response speed of the FLCD device 300 is significantly higher than that of a nematic LCD device as will be appreciated.

Figure 8:
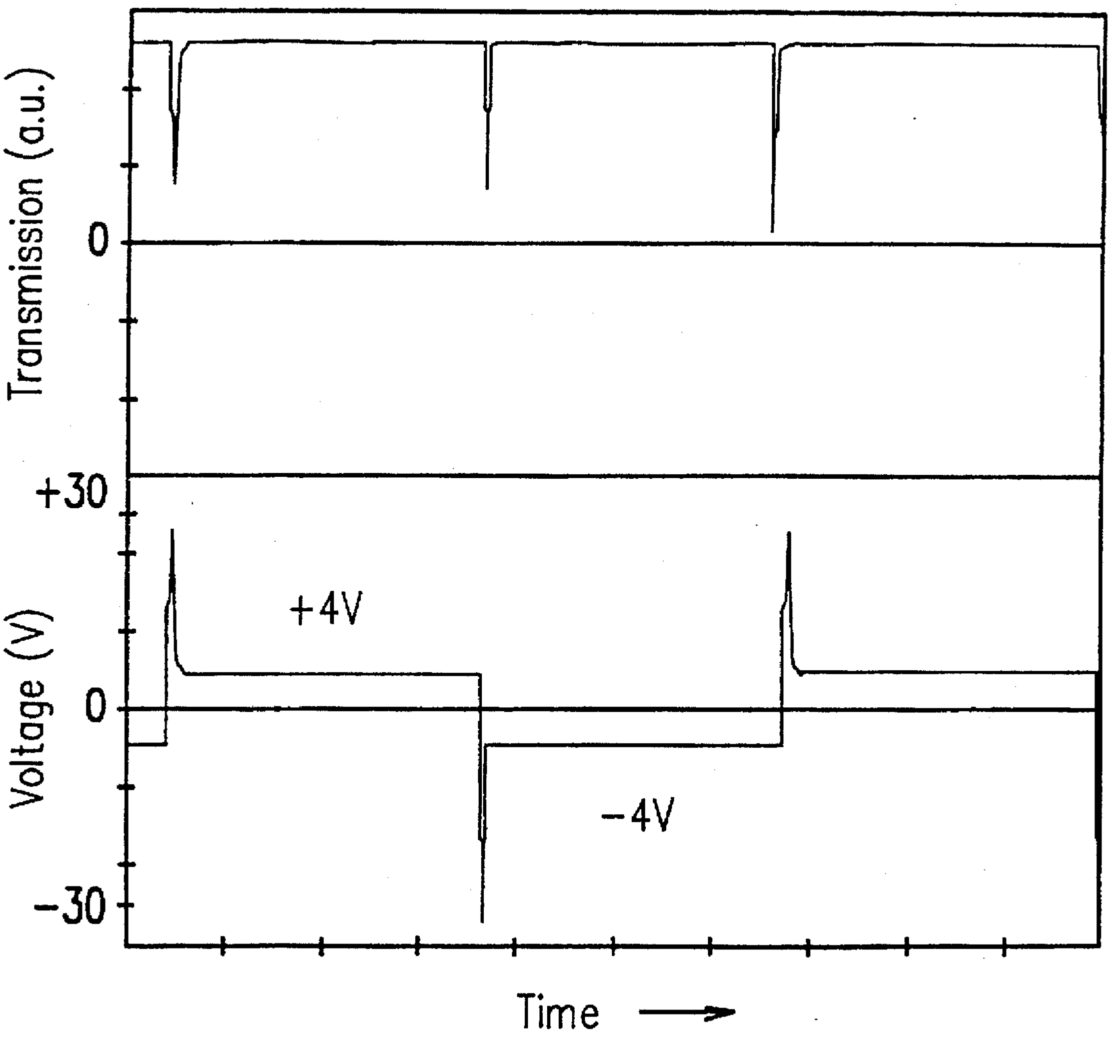
FIG. 8 is a graph illustrating the relationship between the light transmission of the FLCD device in a white state according to the present invention and the voltage applied thereto.
Figure 9:
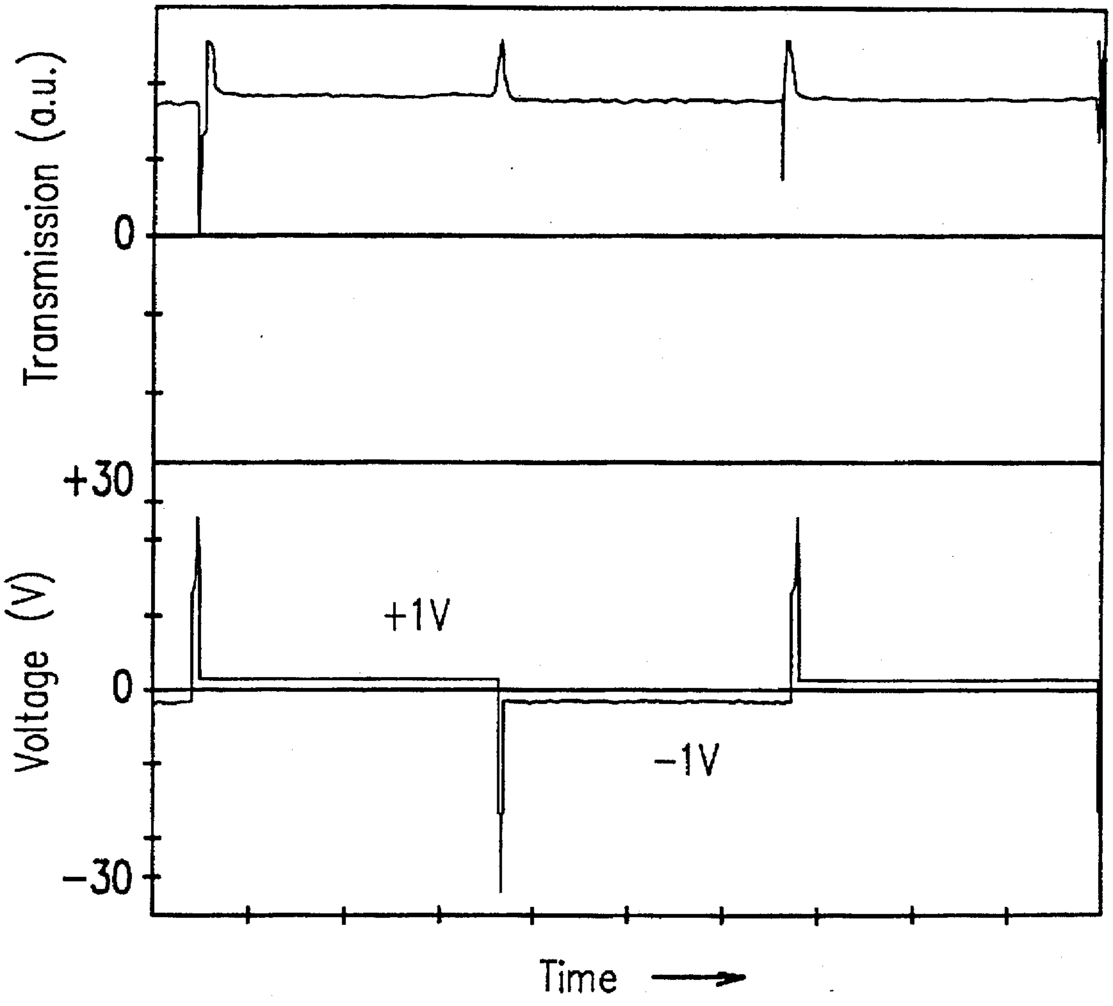
FIG. 9 is a graph illustrating the relationship between the light transmission of the FLCD device in an intermediate state according to the present invention and the voltage applied thereto.
Figure 10:
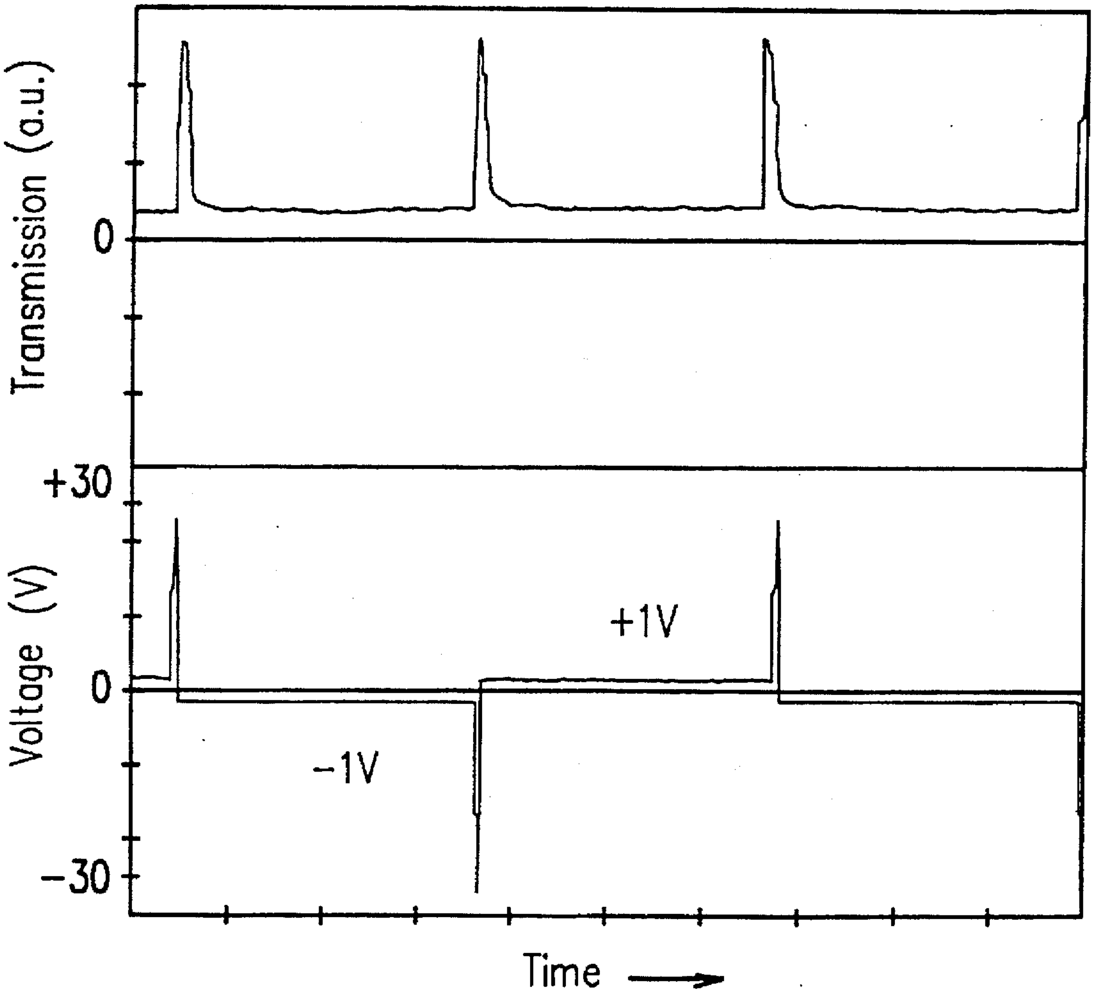
FIG. 10 is a graph illustrating the relationship between the light transmission of the FLCD device in a black state according to the present invention and the voltage applied thereto.

FIGS. 8, 9 and 10 are graphs illustrating the relationship between the light transmission of the FLCD device 300 and the voltage applied thereto in a white state, an intermediate state, and a black state, respectively. Since the intensity of light is equal with respect to two voltages having an identical absolute value or magnitude and opposite polarities, flicker is not readily apparent. Only when a reset pulse voltage is applied, the intensity of light changes only briefly like a pulse. In the case when this FLCD device 300 is driven using, for example, a TFT, such changes cannot be visually recognized. The reason is that since the frame rate is 60 Hz; the frequency for applying reset pulse voltages is also 60 Hz, and thus the change like a pulse in the intensity of light is also generated at a frequent of 60 Hz.

With reference to FIG. 25, a circuit configuration of the FLCD device 300 will be described.

Gate electrode lines $G_i$ (i=0, 1, 2, . . . ) running parallel to each other and source electrode lines $S_j$ (j=0, 1, 2, . . . ) running parallel to each other cross each other. At each of a plurality of intersections of the gate electrode lines $G_i$ and the source electrode lines $S_j$, a switching device, for example, a TFT $B_{ij}$ is provided. The drain D (FIG. 34) of the TFT $B_{ij}$ is connected to a pixel $A_{ij}$. Counter electrodes $L_i$ (i=0, 1, 2, . . . ) are provided in correspondence with the gate electrode lines $G_i$, respectively. However, the counter electrodes $L_i$ can be formed by a single common electrode L as shown in FIG. 34 and as is discussed further below. A pixel electrode 209 (FIG. 34) of the pixel $A_{ij}$ and a corresponding counter electrode $L_i$ generate an electric field. The orientation of the principal axis of the FLC molecules 101 is controlled by the electric field as is described above with respect to FIG. 4A to obtain a desirable intensity of transmitted light. In the example of FIG. 25, a single counter electrode $L_i$ acts as the counter electrode for each pixel controlled by a corresponding gate electrode line $G_i$. As a result, the voltage of the counter electrode for each gate electrode line can be controlled independently.

Referring to FIG. 26 in addition to FIG. 25, the FLCD device 300 is driven in the following manner. FIG. 26 is a waveform diagram of voltages applied to the electrode lines $G_0$, $G_1$, $L_0$ and $L_1$, and the pixels $A_{00}$ and $A_{10}$ of the FLCD device 300. As the FLC material, SCE-8 produced by Merck & Co., Inc. is used; and as the alignment layers 204*a*' and 204*b*', PSI-A-2101 produced by Chisso Petrochemical Corp. is used. The FLC material and the alignment layers 204*a*' and 204*b*' may be formed of any other material which realizes bistability of the FLC molecules.

First, the intensity of light transmitted through an area of the FLC layer 207 included in a pixel $A_{00}$ connected to the gate electrode line $G_0$ is controlled in the following manner.

In the first field, in a period from time $-t_0$ to time $t_0$, as is shown in waveform (a), an appropriate voltage is applied to the gate electrode line $G_0$ which is connected to the gate of a TFT $B_{00}$, thereby activating the TFT $B_{00}$. As is shown in waveform (D), in a period from time $-t_0$ to time 0, a positive voltage $V_0$is applied to the counter electrode $L_0$. Until time 0, a voltage $-V_b$ is applied to the source electrode line $S_0$ (waveform (C)). As a result, as is shown in waveform (F), the pixel $A_{00}$ is supplied with a voltage $-V_b-V_0$, which is presented to be equal to or lower than the negative threshold voltage −Vth, from time 31 $t_0$ to time 0. Accordingly, the FLC molecules 101 in an area of the FLC layer 207 included in the pixel $A_{00}$ are put into one stable alignment state 104 shown in FIG. 4A.

In a period from time 0 to time $t_0$, a voltage $V_b$ is sent from the source electrode line $S_0$ to the pixel $A_{00}$, and then the TFT $B_{00}$ is turned off via the voltage provided to the gate thereof. The voltage $V_b$ corresponds to a desired intensity $I_b$ of light transmitted through the area of the FLC layer 207 included in the pixel $A_{00}$ on the solid line in FIG. 24. Although the voltage $V_b$ is preferably in the range between the voltages $-V_2$ and $V_1$, a voltage higher than $V_1$ or lower than $-V_2$ may also be used as the voltage The potential of the pixel $A_{00}$ is maintained until time $T_0-t_0$, during which time the FLC molecules 101 included in the pixel $A_{00}$ are stable at a position between the central line 103 and the tilting axis 106, The position corresponding To The voltage $V_b$. The intensity Ib of light corresponding to the voltage $V_b$ on the solid line in FIG. 24 is transmitted through the area of the FLC layer 207 included in the pixel $A_{00}$.

In the second field, in a period from time $T_0-t_0$ to time $T_0+t_0$, as is shown in waveform (A), an appropriate voltage is applied to the gate electrode line $G_0$ to activate the TFT $B_{00}$. As is shown in waveform (D), in a period from time $T_0-t_0$ to time $T_0$, a negative voltage $-V_0$ is applied to the counter electrode $L_0$. During time 0 to time $T_0$, a voltage $V_b$ is applied to the source $S_0$ (waveform (C)). As a result, as is shown in waveform (F), the pixel electrode $A_{00}$ is supplied with a voltage $V_b+V_0$, which is equal to or higher than the positive threshold voltage Vth, from time $T_0-t_0$ to time $T_0$. Accordingly, the FLC molecules 101 included in the pixel $A_{00}$ are put into the other stable alignment state 105 shown in FIG. 4A.

In a period from time $T_0$ to time $T_0+t_0$, a voltage $-V_b$ is sent from the source electrode $S_0$ to the pixel $A_{00}$, and then the TFT $B_{00}$ is turned off via the voltage provided to the gate thereof. The voltage $-V_b$ corresponds to a desired intensity of light transmitted through the area of the FLC layer 207 included in the pixel $A_{00}$ on the dashed line in FIG. 24. Although the voltage $-V_b$ is preferably in the range between the voltages $-V_1$ and $V_2$, a voltage higher than $V_2$ or lower than $-V_1$ may also be used as the voltage $-V_b$.

The potential of the pixel $A_{00}$ is maintained until $2T_0-t_0$, during which time the FLC molecules 101 included in the pixel $A_{00}$ are stable at a position between the central line 103 and the tilting axis 107, the position corresponding to the voltage $-V_b$. The intensity of light corresponding to the voltage $-V_b$ on the dashed line in FIG. 24 is transmitted through the area of the FLC layer 207 included in the pixel $A_{00}$.

As a result, as is shown in part (B) of FIG. 27, an identical intensity of light is transmitted through the area of the FLC layer 207 included in the pixel $A_{00}$ in the first field and the second field in accordance with the voltage application shown in part (A) of FIG. 27. The waveform of the intensity of the light transmitted through the pixel $A_{00}$ is repeated frame by frame. Accordingly, by setting frame rate for driving the FLCD device 300 at 60 Hz or more, images without flicker are realized.

Continuing to refer to FIGS. 25 and 26, the intensity of light transmitted through an area of the FLC layer 207 in correspondence with a pixel $A_{10}$ connected to a gate electrode line $G_1$ is controlled in the following manner.

In the first field, in a period from time 0 to time $2t_0$, as is shown in waveform (B), an appropriate voltage is applied to the gate electrode line $G_1$ to activate a TFT $B_{10}$ connected to the gate electrode line $G_1$. As is shown in waveform (E), in a period from time 0 to time $t_0$, a positive voltage $V_0$ is applied to the counter electrode $L_1$. Beginning at time 0, a voltage $V_b$ is applied to the source electrode $S_0$ (waveform (C)). As a result, as is shown in waveform (G), the pixel $A_{10}$ is supplied with a voltage $V_b-V_0$, which is equal to or less than the negative threshold voltage $-V$th, from time 0 to time $t_0$. Accordingly, the FLC molecules 101 included in the pixel $A_{10}$ are put into one stable alignment state 104.

In a period from time $t_0$ to time $2t_0$, a voltage $V_b$ is sent from the source electrode $S_O$ to the pixel $A_{10}$, and then the TFT $B_{10}$ is turned off. The voltage $V_b$ corresponds to a desired intensity of light transmitted through an area of the FLC layer 207 included in the pixel $A_{10}$ on the solid line in FIG. 24. Although the voltage $V_b$ is preferably in the range between the voltages $-V_2$ and $V_1$, a voltage higher than $V_1$ or lower than $-V_2$ may also be used as the voltage $V_b$.

The potential of the pixel $A_{10}$ is maintained until $T_0$, during which time the FLC molecules 101 included in the pixel $A_{10}$ are stable at a position between the central line 103 and the tilting axis 106, the position corresponding to the voltage $V_b$. The intensity $I_b$ of light corresponding to the voltage $V_b$ on the solid line in FIG. 24 is transmitted through the area of the FLC layer 207 included in the pixel $A_{10}$.

In the second field, in a period from time $T_0$ to time $T_0+2t_0$, as is shown in waveform (B), an appropriate voltage is applied to the gate electrode line $G_1$ to activate the TFT $B_{10}$. As is shown in waveform (E), in a period from time $T_0$ to time $T_0+t_0$, a negative voltage $-V_0$ is applied to the counter electrode $L_1$. Beginning at time $T_0$, a voltage $-V_b$ is applied to the source electrode $S_0$ (waveform (C)). As a result, as is shown in waveform (G), the pixel $A_{10}$ is supplied with a voltage $-V_b+V_0$, which is equal to or higher than the positive threshold voltage Vth from time $T_0$ to time $T_0+t_0$. Accordingly, the FLC molecules 101 included in the pixel $A_{10}$ are put into the other stable alignment state 105.

In a period from time $T_0+t_0$ to time $T_0+2t_0$, a voltage $-V_b$ is sent from the source electrode line. $S_0$ to the pixel $A_{10}$, and then the TFT $B_{10}$ is turned off via the voltage provided to the gate thereof. The voltage $-V_b$ corresponds to a desired intensity of light transmitted through the area of the FLC layer 207 included in the pixel $A_{10}$ on the dashed line in FIG. 24. Although the voltage $-V_b$ is preferably in the range between the voltages $-V_1$ and $V_2$, a voltage higher than $V_2$ or lower than $-V_1$ may also be used as the voltage $-V_b$.

The potential of the pixel $A_{10}$ is maintained until $2T_0$, during which time the FLC molecules 101 included in the pixel $A_{10}$ are stable at a position between the central line 103 and the tilting axis 107, the position corresponding to the voltage $-V_b$. The intensity of light corresponding to the voltage $-V_b$ on the dashed line in FIG. 24 is transmitted through the area of the FLC layer 207 included in the pixel $A_{10}$.

As a result, as is shown in part (B) of FIG. 27, an identical intensity of light is transmitted through the area of the FLC layer 207 included in the pixel $A_{10}$ in the first field and the second field in accordance with the voltage application shown in part (A) of FIG. 27. The waveform of the intensity of the light transmitted through the pixel $A_{10}$ is repeated frame by frame. Accordingly, by setting the frame rate for driving the FLCD device 300 at 60 Hz or more, images without flicker are realized. The driving is performed in the same manner at the other pixels $A_{ij}$. The voltage shown in part (A) of FIG. 27 is the same as the voltage shown in part (F) of FIG.

Although a positive voltage $V_0$ is applied in a period from time $-t_0$ to time 0 (waveform (D)) in the above-described example, a voltage $V_b-V_0$ may be applied directly to the source electrode line $S_0$ while maintaining the potential of the counter electrode L at 0, i.e., while using the potential of the counter electrode L as a reference potential. Alternatively, a voltage $V_b-V_0$ may be applied directly to the counter electrode L while maintaining the potential of the pixel electrode $A_{ij}$ at 0, namely, while using the potential of the pixel electrode $a_{ij}$ as a reference potential.

Example 2

Figures 28A, 28B, 28C, 28D, 28E, 28F, 28G:
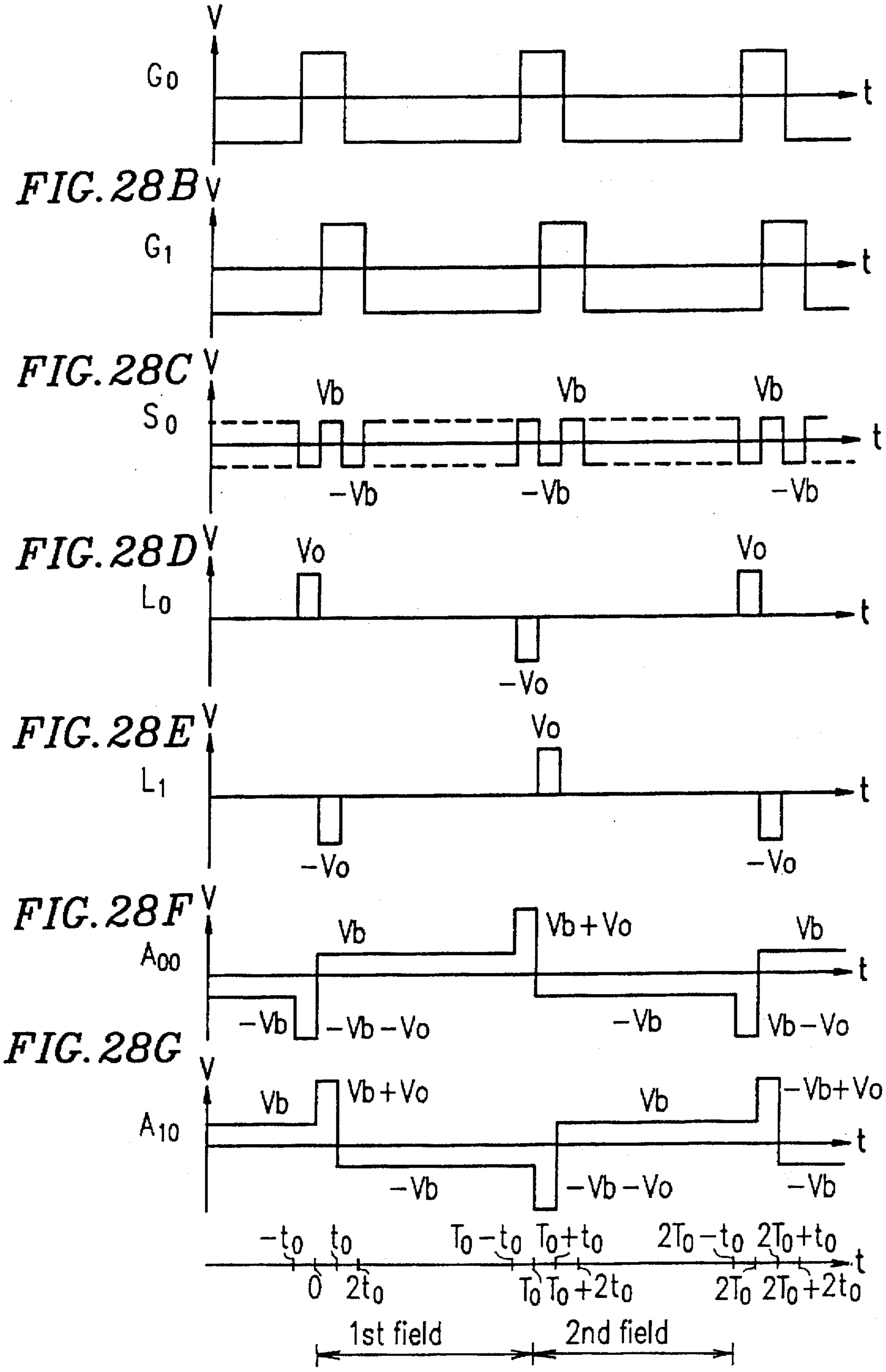
FIG. 28 is a waveform diagram illustrating voltage waveforms for driving an FLCD device in a method in accordance with a second example of the present invention.

A second example according to the present invention will be described with reference to FIG. 28. FIG. 28 is a waveform diagram of voltages applied to the electrode lines $G_0$, $G_1$, $L_0$ and $L_1$, and the pixels $A_{00}$ and $A_{10}$ of the FLCD device 300. In the second example, the pixels, for example $A_{0j}$ and $A_{2j}$ connected to the even numbered gate electrode lines, for example, $G_0$ and $G_2$, and the pixels, for example, $A_{ij}$ and $A_{3j}$ connected to the odd numbered gate electrodes, for example, $G_{ij}$ and $G_{3j}$ are supplied with voltages having opposite polarities to each other. As is shown in waveform (C) of FIG. 28, the polarity of the voltage applied to the source electrode line $S_0$ is inverted alternately line by line, e.g., the voltage has one polarity with respect to even numbered gate electrode lines and an opposite polarity with respect to odd numbered gate electrode lines. As is shown in waveforms (D) and (E), the counter electrodes corresponding to the even numbered gate electrode lines, for example, $L_0$, and the counter electrode lines corresponding to the odd numbered gate electrode lines, for example, $L_1$, are supplied with voltages having opposite polarities to each other. As a result, as is shown in waveform (F) and (G), the pixel $A_{00}$ connected to the even numbered gate electrode line $G_0$ and the pixel connected to the odd numbered gate electrode line $G_1$ are supplied with voltages having opposite polarities to each other.

By such a driving system also, the intensity of light transmitted through an area of the FLC layer 207 included in each pixel changes frame by frame.

Alternatively, after the FLC molecules 101 included in the pixel $A_{ij}$ are put into one stable alignment state 104, the voltage applied to the source electrode line $S_j$ and the counter electrode $L_i$ is shifted by $-V_1$ (or a level close to $-V_1$) to put the FLC molecules 101 into the other stable alignment state 105. Then, the voltage applied to the source electrode line $S_j$ and the counter electrode $L_i$ is shifted by $V_1$ (or a level close to $V_1$). The voltage applied to the pixel $A_{ij}$ is identical with the voltage applied by the above-described system.

Example 3

In the third example, the FLCD device 300 does not have a counter electrode lines $L_i$ for each gate electrode line $G_i$, but has only a single counter electrode L for all the gate electrode lines. The voltage $V_{ij}$ retained in the pixel $A_{ij}$ is determined by Equation (1) based on the charge $Q_{ij}$ retained in the pixel $A_{ij}$ and the capacitance $C_{ij}$ of the pixel $A_{ij}$.

$$V_{ij}=Q_{ij}/C_{ij} \qquad (1)$$

Figures 29A, 29B, 29C, 29D, 29E, 29F:
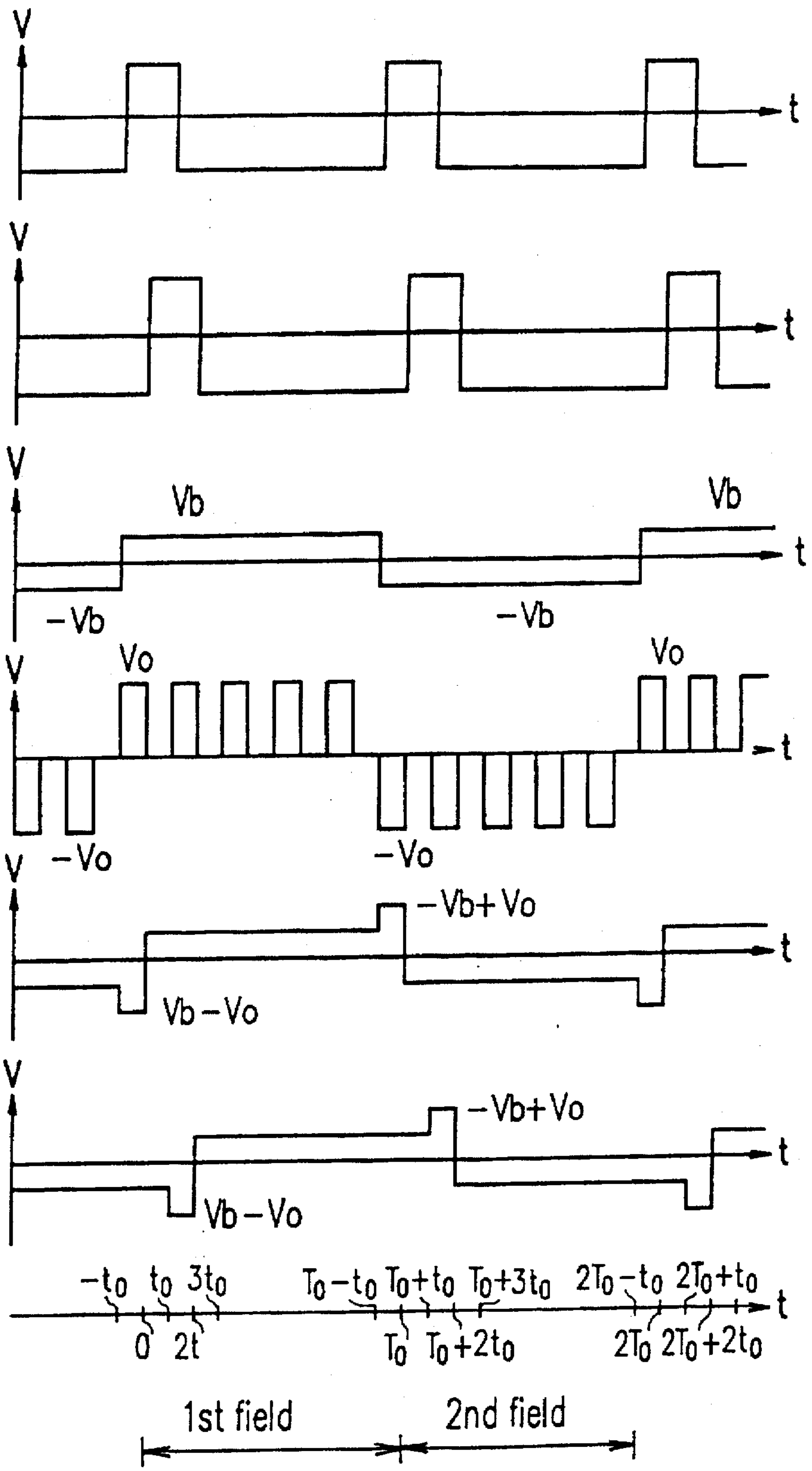
FIG. 29 is a waveform diagram illustrating voltage waveforms for driving an FLCD device in a method in accordance with a third example of the present invention.

Accordingly, the voltage $V_{ij}$ retained in the pixel $A_{ij}$ having a TFT which is in an OFF state does not change even if the voltage applied $V_0$ the counter electrode L is changed to, for example, $V_0$. Referring to FIG. 29, the FLCD device 300 is driven in the following manner in accordance with the third example.

FIG. 29 is a waveform diagram applied to the electrode lines and the pixels of the FLCD device 300 in accordance with the third example.

As is shown in waveform (a), in a period from time $-t_0$ to time $t_0$, an appropriate voltage is applied to the gate of the TFT $B_{00}$ connected to the gate electrode line $G_0$, thereby activating the TFT $B_{00}$. As is shown in waveform (D), in a period from time $-t_0$ to time 0, a positive voltage $V_0$ is applied to the counter electrode L. During time $-t_0$ to time $T_0-t_0$, a voltage $V_b$ is applied to the source electrode line $S_0$ (waveform (C)). As a result, as is shown in waveform (E), the pixel $A_{00}$ is supplied from time $-t_0$ to time with a voltage $-V_b-V_0$, which is equal to or lower than the negative threshold voltage $-Vth$ 0. Accordingly, the FLC molecules 101 in an area of the FLC layer 207 included in the pixel $A_{00}$ are put into one stable alignment state 104 shown in FIG. 4A.

In a period from time 0 to time $t_0$, a voltage $V_b$ is sent from the source electrode line $S_0$ to the pixel $A_{00}$, and then the TFT $B_{00}$ is turned off via the voltage applied to the gate thereof.

The potential of the pixel $A_{00}$ is then maintained until time $T_0-t_0$, during which time the FLC molecules 101 included in the pixel $A_{00}$ are stable at a position between the central line 103 and the tilting axis 106, the position corresponding to the voltage $V_b$.

Although a positive voltage $V_0$ is applied in a period from time $-t_0$ to time 0 (waveform (D)) in the above-described example, a voltage $V_b-V_0$ may be applied directly to the source electrode line $S_0$ while maintaining the potential of the counter electrode L at 0, i.e., while using the potential of the counter electrode L as a reference potential. Alternatively, a voltage $V_b-V_0$ may be applied directly to the counter electrode L while maintaining the potential of the pixel electrode $A_{00}$ at 0, namely, while using the potential of the pixel electrode $A_{00}$ as a reference potential.

Then, as is shown in waveform (A), in a period from time $T_0-t_0$ to time $T_{0,0}$, an appropriate voltage is applied to the gate electrode line $G_0$ to activate the TFT $B_{00}$ connected to the gate electrode line $G_0$. As is shown in waveform (D), in a period from time $T_0-t_0$ to time $T_0$, a negative voltage $-V_0$ is applied to the counter electrode L. During time $T_0-t_0$ to time $2T_0-t_0$, a voltage $-V_b$ is applied to the source electrode lane $S_0$ (waveform (C)). As a result, as is shown in waveform (E), the pixel $A_{00}$ is supplied with a voltage $-V_b+V_0$, which is equal to or higher than the positive threshold voltage Vth from time $T_0-t_0$ to time $T_0$. Accordingly, the FLC molecules 101 included in the pixel $A_{00}$ are put into the other stable alignment state 105 shown in FIG. 4A.

In a period from time $T_0$ to time $T_0+t_0$, a voltage $-V_b$ is sent from the source electrode line $S_0$ to the pixel $A_{00}$, and the TFT $B_{00}$ is turned off via the voltage provided to the gate thereof.

The potential of the pixel $A_{00}$ is maintained until time $2T_0-t_0$, during which time the FLC molecules 101 included in the pixel $A_{00}$ are stable at a position between the central line 103 and the tilting axis 107, the position corresponding to the voltage $-V_b$.

Although a negative voltage $-V_0$ is applied in a period from time until $T_0-t_0$ to tame $T_0$ (waveform (D)) in the above-described example, a voltage $-V_b+V_0$ may be applied directly to the source electrode line $S_0$ while maintaining the potential of the counter electrode L at 0.

The pixels $A_{1j}$ connected to the gate electrode line $G_1$ are driven in the following manner.

As is shown in waveform (B), in a period from time $t_0$ to time $3t_0$, an appropriate voltage is applied to the gate electrode line $G_1$ to activate the TFT $B_{10}$ connected to the gate electrode line $G_1$. As is shown in waveform (D), in a period from time $t_0$ to time $2t_0$, a positive voltage $V_0$ is applied to the counter electrode L. As a result, as is shown in waveform (F), the pixel $A_{10}$ is supplied with a voltage $V_b-V_0$, which is equal to or lower than the negative threshold voltage $-Vth$. Accordingly, the FLC molecules 101 included in the pixel $A_{10}$ are put into one stable alignment state 104.

In a period from time $2t_0$ to time $3t_0$, a voltage $V_b$ is sent from the source electrode line $S_0$ to the pixel $A_{10}$, and then the TFT $B_{10}$ is tuned off.

The potential of the pixel $A_{10}$ is maintained until $T_0+t_0$, during which time the FLC molecules 101 included in the pixel $A_{10}$ are stable at a position between the central line 103 and the tilting axis the position corresponding to the voltage $V_b$.

Although a positive voltage $V_0$ is applied a period from time $t_0$ to time $2t_0$ (waveform (D)) in the above-described example, a voltage $-V_b+V_0$ may be applied directly to the source electrode line $S_0$ while maintaining the potential of the counter electrode L at 0.

Then, as is shown in waveform (B), in a period from time $T_0+t_0$ to time $T_0+3t_0$, an appropriate voltage is applied to the gate electrode line $G_1$ to activate the TFT $B_{10}$ connected to the gate electrode line $G_1$. As is shown in waveform (D), in a period from time $T_0+t_0$ to time $T_0+2t_0$, a negative voltage $-V_0$ is applied to the counter electrode L. As a result, as is shown in waveform (F), the pixel $A_{10}$ is supplied with a voltage $-V_b+V_0$, which is equal to or higher than the positive threshold voltage Vth. Accordingly, the FLC molecules 101 included in the pixel $A_{10}$ are put into the other stable alignment state 105.

In a period from time $T_0+2t_0$ to time $T_0+3t_0$, a voltage $-V_b$ is sent from the source electrode line to the pixel $A_{10}$, and then the TFT $B_{10}$ is turned off.

The potential of the pixel $A_{10}$ is maintained until $2T_0+t_0$, during which time the FLC molecules 101 included in the pixel $A_{10}$ are stabilized at a position between the central line 103 and the tilting axis 107, the position corresponding to the voltage $-V_b$.

Although a negative voltage $-V_0$ is applied in a period from time $T_0+t_0$ to time $T_0+2t_0$ (waveform (D)) in the above-described example, a voltage $-V_b+V_0$ may be applied directly to the source electrode line $S_0$ while maintaining the potential of the counter electrode L at 0.

The other pixels $A_{ij}$ are driven in the same manner, and thus the intensity of the transmitted through an area of the FLC layer 207 included in each pixel changes frame by frame.

Example 4

In a fourth example according to the present invention, the FLCD device 300 is driven by a plane-scanning active matrix driving circuit for field-by-field sequential color display.

Figure 31:
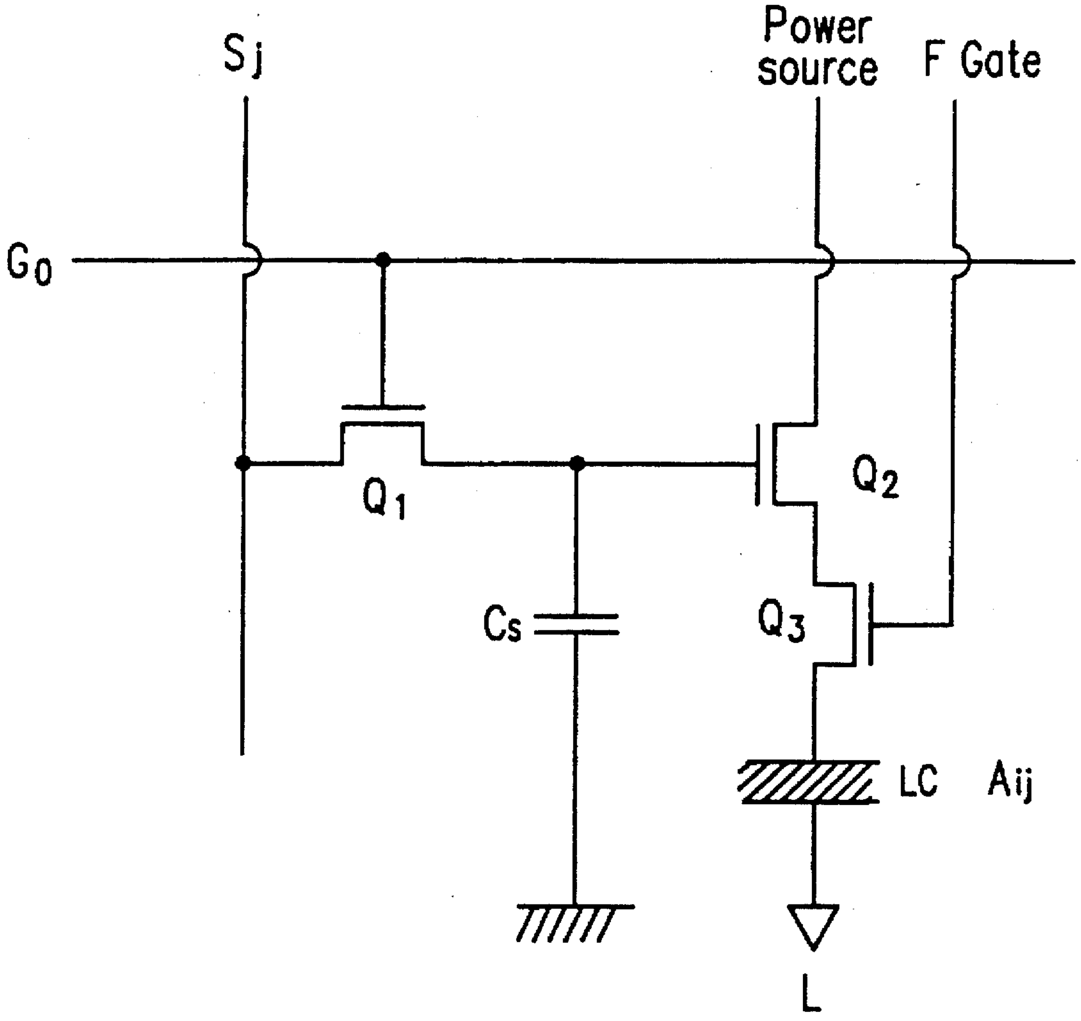
FIG. 31 is a circuit diagram of a circuit for driving an FLCD device in a fourth example according to the present invention.
Figures 32A, 32B, 32C, 32D, 32E, 32F, 32G:
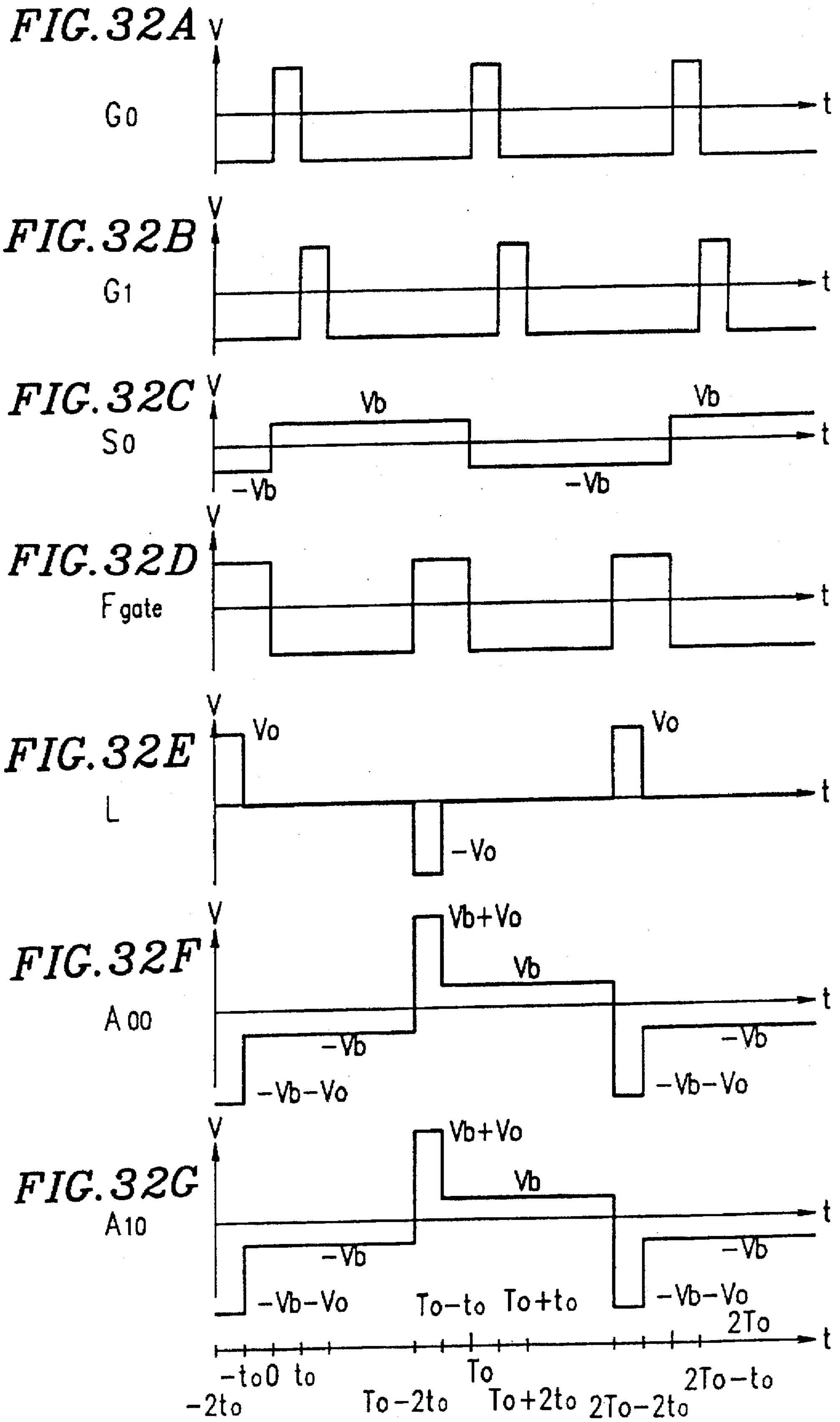
FIG. 32 is a waveform diagram illustrating voltage waveforms for driving the FLCD device in a method in accordance with the fourth example.

FIG. 31 is a circuit diagram of such an active driving circuit, which is provided for each of the pixels located at the intersections of the gate electrode lines $G_i$ and the source electrode lines $S_j$ shown in FIG. 25. A plane-scanning gate electrode F Gate is common to all the pixels $A_{ij}$ in the FLCD device 300. FIG. 32 As a waveform diagram of voltages applied to the electrode lines and the pixels in the FECD device 300 having the active driving circuit.

The FLCD device operates in the following manner in accordance with the fourth example.

In a period from time $-2t_0$ to time 0 in a previous field, as is shown in waveform (D) of FIG. 32, an appropriate voltage is applied to the plane-scanning gate electrode line F Gate, thereby turning on all TFTs $Q3_{ij}$ as active elements each connected to a corresponding pixel $A_{ij}$.

As is shown in waveform (E), in a period from time $-2t_0$ to time $-t_0$, a positive voltage $V_0$ is applied to the counter electrode L. As a result, as is shown in waveforms (F) and (G) for the pixels $A_{00}$ and $A_{10}$ as examples, all the pixels $A_{ij}$ are supplied with a voltage of $-V_0-V_b$, which is equal to or lower then the negative threshold voltage $-Vth$. The FLC molecules 101 included in all the pixels $A_{ij}$ are put into one stable alignment state 104 shown in FIG. 4A. As is shown in part (E) of FIG. 32, during the period from time $-t_0$ to 0, the potential of the counter electrode L is reduced to 0 V. A potential stored in capacitors $C_S$ each connected to a corresponding pixel $A_{ij}$, the potential corresponding to a blue image, is sent to the pixel $A_{ij}$ having a liquid crystal capacitance LC. Thus, the color of the light transmitted through the areas of the FLC layer 207 included in all the pixels $a_{ij}$ is made blue.

As is shown in waveform (E), the voltage applied to the counter electrode L is changed to 0 V at time $-t_0$. Thus, the potential of all the pixels $A_{ij}$ is maintained until an appropriate voltage is applied to the plane-scanning gate electrode line F Gate to activate all the TFTs $Q3_{ij}$. The FLC molecules 101 included in all the pixels $A_{ij}$ are stable at a position between the central line 103 and the tilting axis 106, the position corresponding to the voltage $-V_b$. The intensity of light corresponding to the voltage $-V_b$ on the solid line in FIG. 24 is transmitted through the areas of the FLC layer 207 included in all the pixels $A_{ij}$.

In a period from time 0 to time $t_0$, as is shown in waveform (A), an appropriate voltage is applied to a gate electrode line $G_0$ to activate a TFT $Q1_{0j}$ as an active element connected to the gate electrode line $G_0$. A voltage $V_b$ is sent from the source electrode line $S_j$ to the capacitor $C_S$ connected to a pixel $A_{0j}$, and then the TFT $Q1_{0j}$ is turned off. The voltage $V_b$ corresponds to a desired intensity of light transmitted through an area of the FLC layer 207 included in the pixel $A_{0j}$ on the dashed line in FIG. 24.

In a period from time $t_0$ to time $2t_0$, as is shown in waveform (B), an appropriate voltage is applied to a gate electrode line $G_1$ to activate a TFT $Q1_{1j}$ as an active element connected to the gate electrode line $G_1$. A voltage $V_b$ is sent from the source electrode $S_j$ to the capacitor $C_S$ connected to a pixel $A_{ij}$, and then the TFT $Q1_{1j}$ is turned off. The voltage $V_b$ corresponds to a desired intensity of light transmitted through an area of the FLC layer 207 included in the pixel $A_{ij}$ on the dashed line in FIG. 24.

In the same manner, capacitors $C_S$ connected to the other pixels $A_{ij}$ are supplied with voltages. Then, in a period from time $T_0-2t_0$ to time $T_0$, as is shown in waveform (D), an appropriate voltage is plied to the plane-scanning gate electrode line F Gate to activate all the TFTs $Q3_{ij}$.

As is shown in waveform (E), in a period from time $T_0-2t_0$ to time $T_0-t_0$, a negative voltage $-V_0$ is applied to the counter electrode L. As a result, as is shown in waveforms (F) and (C) for the pixels $A_{00}$ and $A_{10}$ as examples, all the pixels $A_{ij}$ are supplied with a voltage of $V_b+V_0$, which is equal to or higher than the positive threshold voltage Vth. The FLC molecules 101 included in all the pixels $A_{ij}$ are put into the other stable alignment state 105 shown in FIG. 4A. As is shown in part (E) of FIG. 32, during the period from time $T_0-t_0$ to $T_0$, the potential of the counter electrode L is increased to 0 V. A potential stored in the capacitors $C_S$ each connected to a corresponding pixel $A_{ij}$, the potential corresponding to a red image, is sent to the pixel $A_{ij}$ having liquid crystal capacitance LC. Thus, the color of the light transmitted through the areas of the FLC layer 207 included in all the pixels $A_{ij}$ is made red.

As is shown in waveform (E), the voltage applied to the counter electrode L is charged to 0 V at time $T_0-t_0$. Thus, the potential of all the pixels $A_{ij}$ is maintained until an appropriate voltage is applied to the plane-scanning gate electrode line F Gate to activate all the TFTs $Q3_{ij}$. The FLC molecules 101 included in all the pixels $A_{ij}$ are stable at a position between the central line 103 and the tilting axis 107, the position corresponding to the voltage $V_b$. The intensity $I_b$ of light corresponding to the voltage $V_b$ on the dashed line in FIG. 24 is transmitted through the areas of the FLC layer 207 included in all the pixels $A_{ij}$.

In a period from time $T_0$ to time $T_0+t_0$, as is shown in waveform (A), an appropriate voltage is applied to the gate electrode line $G_0$ to activate the TFT $Q1_{0j}$ connected to the gate electrode line $G_0$. A voltage $-V_b$ is sent from the source electrode line $S_j$ to the capacitor $C_S$ connected to the pixel $A_{0j}$, and then the TFT $Q1_{0j}$ is turned off. The voltage $-V_b$ corresponds to a desired intensity of light transmitted through an area of the FLC layer 207 included in the pixel $A_{ij}$ on the dashed line in FIG. 24.

In a period from time $T_0+t_0$ to time $T_0+2t_0$, as is shown in waveform (B), an appropriate voltage is applied to the gate electrode line $G_1$ to active the TFT $Q1_{1j}$ connected to the gate electrode line $G_1$. A voltage $-V_b$ is sent from the source electrode line $S_j$ to the capacitor $C_S$ connected to the pixel $A_{ij}$, and then the TFT $Q1_{1j}$ is turned off. The voltage $-V_b$ corresponds to a desired intensity of light transmitted through the area of the FLC layer 207 included in the pixel $A_{ij}$ on the solid line in FIG. 24.

In the same manner, capacitors $C_S$ connected to the other pixels $A_{ij}$ are supplied with voltages. Then, in a period from time $2T_0-2t_0$ to time $2T_0$, as is shown in waveform (D), an appropriate voltage is applied to the plane-scanning gate electrode line F Gate to activate all the TFTs $Q3_{ij}$.

As is shown in waveform (E), in a period from time $2T_0-2t_0$ to time $2T_0-t_0$, a positive voltage $V_0$ is applied to the counter electrode L. As a result, as is shown in waveforms (F) and (G) for the pixels $A_{00}$ and $A_{10}$ as examples, all the pixels $a_{ij}$ are supplied with a voltage of $-V_b-V_0$, which is equal to or lower than the negative threshold voltage $-Vth$. The FLC molecules 101 included in all the pixels $a_{ij}$ are put into one stable alignment state 104. As is shown in park (E) of FIG. 32, the potential of the counter electrode L is reduced to 0 V. A potential stored in the capacitors $C_S$ each connected to a corresponding pixel $a_{ij}$, the potential corresponding to a green image, is sent to the pixel $a_{ij}$ having the liquid crystal capacitance LC. Thus, the color of the light transmitted through the areas of the FLC layer 207 included in all the pixels $A_{ij}$ is made green.

As is shown in waveform (E), the voltage applied to the counter electrode L is changed to 0 V at time $2T_0-t_0$. Thus, the potential of all the pixels $A_{ij}$ is maintained until an appropriate voltage is applied to the plane-scanning gate electrode line F Gate to activate all the TFTs $Q3_{ij}$. The FLC molecules 101 included in all the pixels $A_{ij}$ are stable at a position between the central line 103 and the tilting axis 106, the position corresponding to the voltage $-V_b$. The intensity of light corresponding to the voltage $-V_b$ on the solid line in FIG. 24 is transmitted through the areas of the FLC layer 207 included in all the pixels $A_{ij}$.

The above-described scanning operation is repeated in the order of blue, red end green.

By such a structure of the circuit shown in FIG. 31, the potential of all the pixels $a_{ij}$ in the FLCD device 300 can be simultaneously updated. In the case when the FLCD device 300 having the circuit shown in FIG. 31 is used in combination with the light selection device 15 (FIG. 1), the potential for display can be transferred to all the pixels $A_{ij}$ during time period τ (FIG. 2) in which the light colors are changed. Accordingly, rays of each color of light is transmitted even while line-by-line sequential scanning is performed. Therefore, high speed field-by-field sequential color display system is realized.

In order to realize field-by-field sequential color display by switching the RGB colors to display all the RGB colors sequentially within 1/60 second, an LCD device having a response time of 1/180 second is required. As is apparent from FIG. 7, for example, an FLCD device according to the present invention allows sufficiently high speed operation to be used for such a field-by-field sequential color display system. Accordingly, by the FLCD device end the driving method in accordance with the fourth example, the intensity of transmitted light changes frame by frame, and field-by-field sequential color display is realized by displaying images corresponding to all the RGB colors within 1/60 second.

Figure 33:
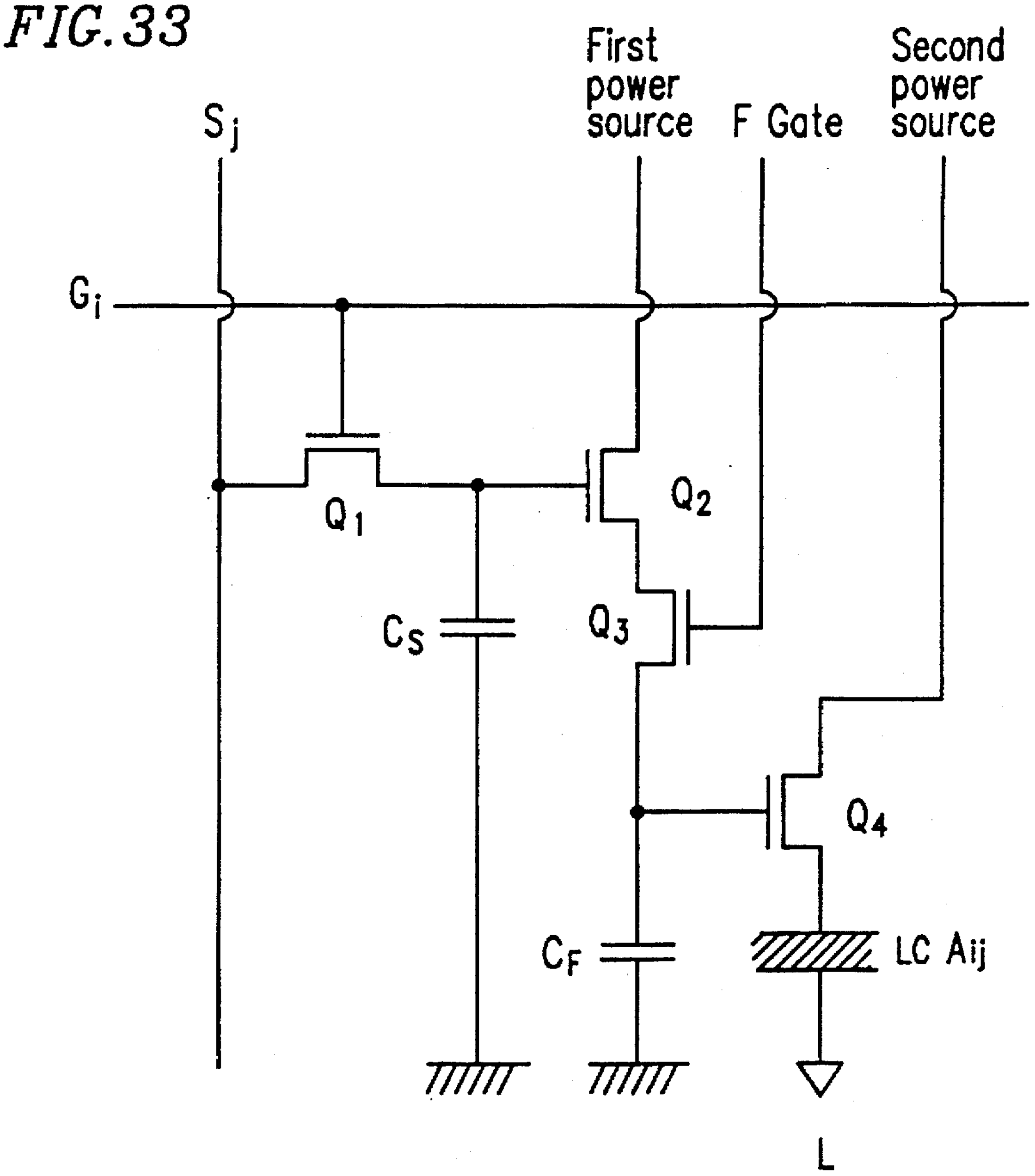
FIG. 33 is a circuit diagram of a circuit for driving an FLCD device in a modification of the fourth example according to the present invention.

FIG. 33 shows a circuit for driving the FECD device 300 which is further improved from the circuit shown in FIG. 31. The circuit in FIG. 33 includes another charge retaining capacitance $C_F$ connected to the third transistor Q3 and a fourth transistor Q4 for sending a charge from an additional power source to the pixel $A_{ij}$ having the liquid crystal capacitance LC in addition to the structure of the circuit shown in FIG. 31. The method for driving the circuit shown An FIG. 33 is the same as the method for driving the circuit shown in FIG. 31 until activating the TFT $Q_3$. In synchronization with activation of the TFT $Q_3$, a charge is sent to a capacitance $C_F$ from the power source, thereby activating a TFT $Q_4$. A charge from an additional (second) power source is sent to the pixel $A_{ij}$ having the liquid crystal capacitance LC to realize display.

Figure 16:
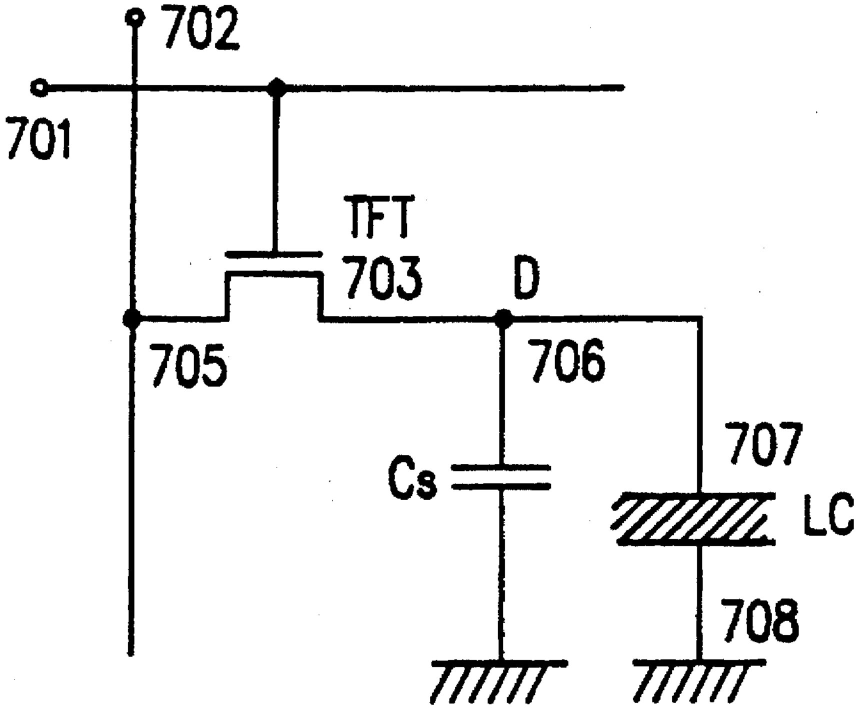
FIG. 16 is a circuit diagram of a conventional circuit for driving an LCD device.

By driving the FLCD device 300 using the circuit in FIG. 33, a constant voltage is applied to the pixel electrode even after the writing period. Thus, the problem described above with respect to the circuit in FIG. 16, namely, the problem that the signal cannot be maintained with high precision can be solved.

Figure 2:
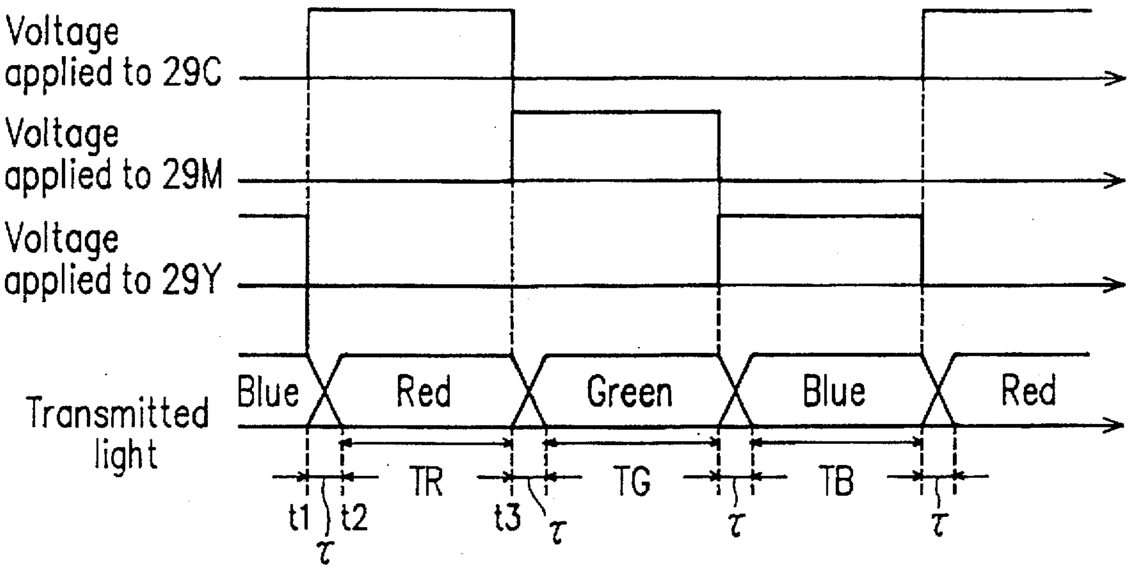
FIG. 2 is a timing diagram showing basic operation of the field-by-field sequential color display
Figure 3A:
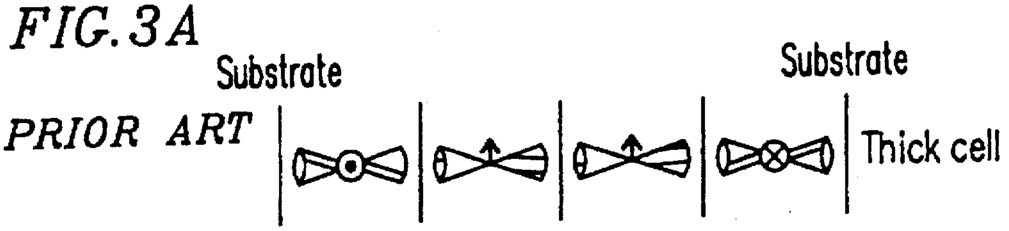
FIG. 3A PRIOR ART
FIGS. 3A through 3E are schematic views illustrating the spontaneous polarization of FLC molecules and the electrooptic effect.
Figure 3B:
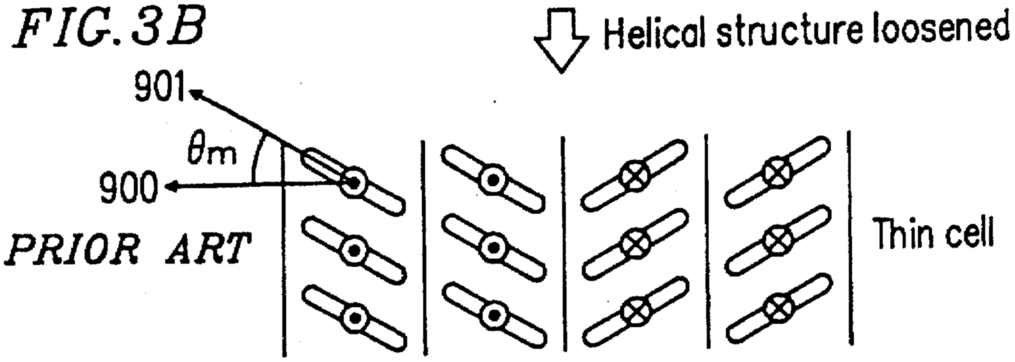
FIG. 3B PRIOR ART
Figure 3C:
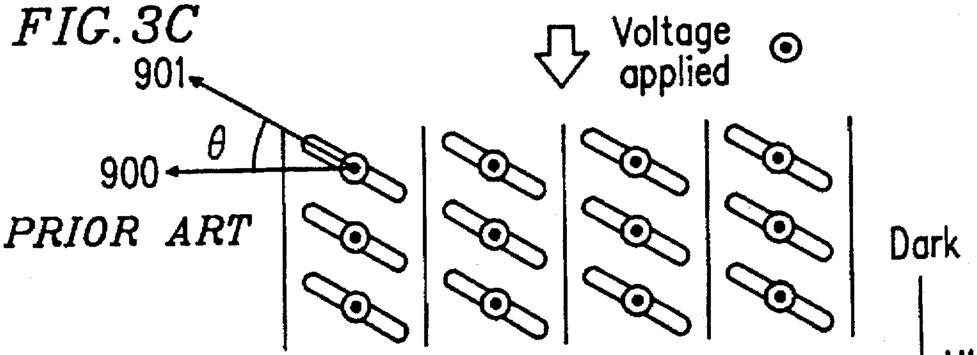
FIG. 3C PRIOR ART
Figure 3D:
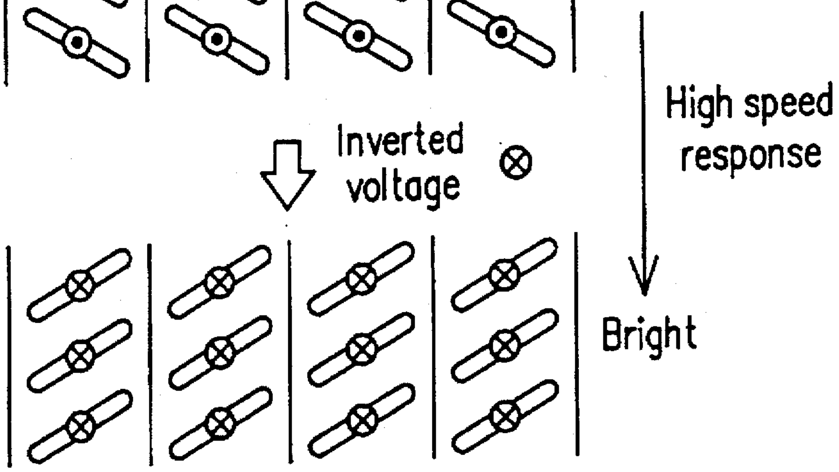
FIG. 3D PRIOR ART
Figure 3E:
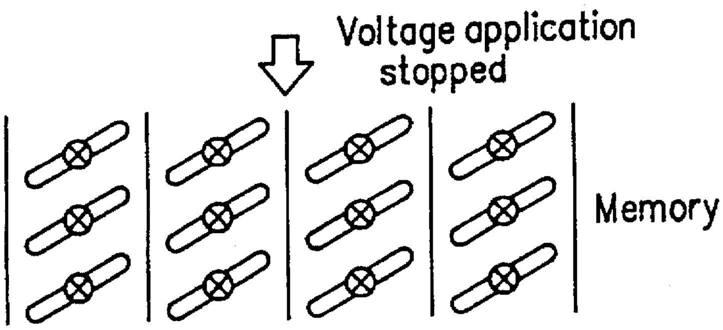
FIG. 3E PRIOR ART

In the case that such an FLCD device realizing high speed line-by-line sequential display is driven by the field-by-field sequential color display described with reference to FIGS. 1 and 2, writing for each scanning line is performed in allocated time. Thus, accurate display is realized.

In the FLCD device in each of the first through fourth examples, since the intensity of transmitted light changes frame by frame, a frequency conversion circuit is not necessary between the FLCD device and a signal source such as a computer. Thus, the production cost of a system including the FLCD device is reduced while reducing flicker.

Example 5

An amorphous silicon TFT and a polysilicon TFT which are in wide use for LCD devices are difficult to be improved in performance due to drawbacks of a low mobility and a small ON/OFF ratio of the electric current. Table 3 shows performance of transistors formed of different types of silicon.

TABLE 3

| | Single crystalline silicon | Polysilicon | Amorphous silicon |
|---|---|---|---|
| Mobility | | | |
| Electron | 1500 | 100 | 0.1–0.5 |
| Hole | 600 | 50 | |
| ON/OFF ratio | $>10^9$ | $>10^7$ | $>10^6$ |
| Operating frequency of transistor (CMOS shift register) | Several GHZ (1 μm rule) | 20 MHz (L = 10 μm) (W = 30 μm) | 5 MHz (L = 10 μm) (W = 30 μm) |

Due to a low mobility of an amorphous silicon TFT, LCD devices including the amorphous silicon TFT is not suitable for an apparatus requiring a large capacity display such as a high definition TV. Because of the high ON/OFF ratio of the current, it is difficult to use an amorphous silicon TFT for a complicated circuit such as a driving circuit formed on the same substrate with the display area using known IC production technologies.

A polysilicon TFT is sufficiently satisfactory in performance to be used in a complicated circuit such as driving circuit formed on the same substrate with the display area using known IC production technologies. Nonetheless, since the polysilicon TFT has a large current leakage, it is necessary that the TFT should be increased in size or a plurality of TFTs should be connected in series in order to raise the ON/OFF ratio of the current. Such increase in size contradicts the size reduction of the LCD device, which is demanded today.

For the above-described reasons, a TFT is formed in a substrate formed of single crystalline silicon. As is indicated in Table 3, such a TFT has a large driving capacity and a high ON/OFF ratio of the current without increasing the size of the TFT.

Accordingly, mounting density of elements can be high. A circuit having a plurality of active elements end capacitors can be configurated. An FLCD device including such a circuit can realize functions which cannot be achieved by use of conventional TFTs.

Utilizing such an advantage, an FLCD device in a fifth example according to the present invention includes two transistors and an auxiliary capacitance.

Figure 11:
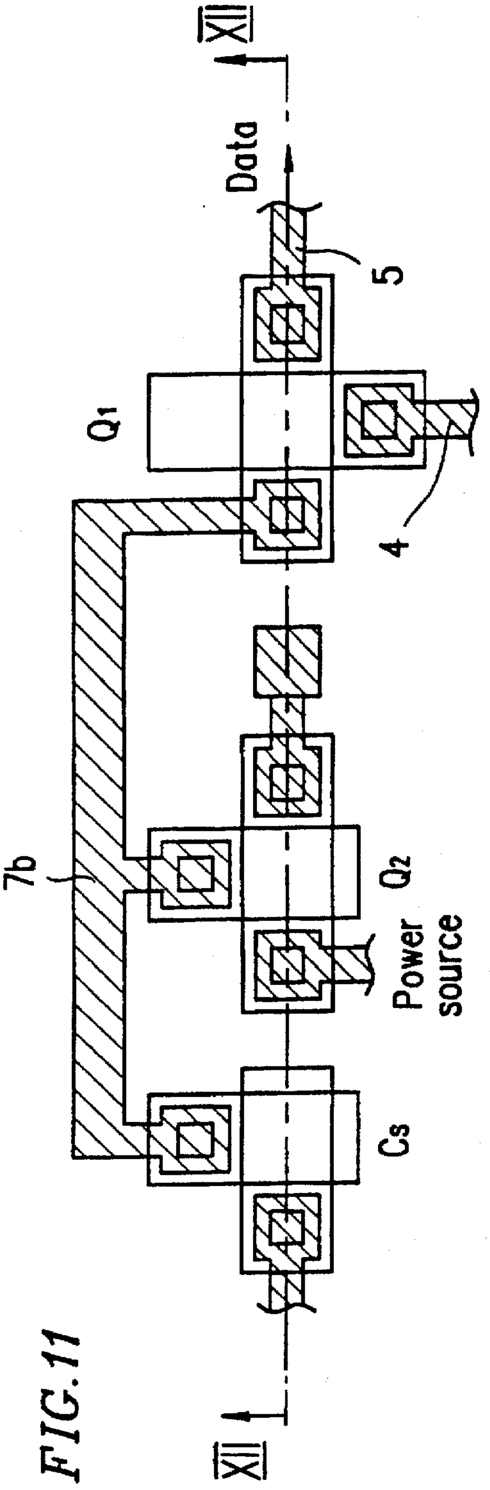
FIG. 11 is a top view of an FLCD device according to a fifth example of the present invention.
Figure 12:
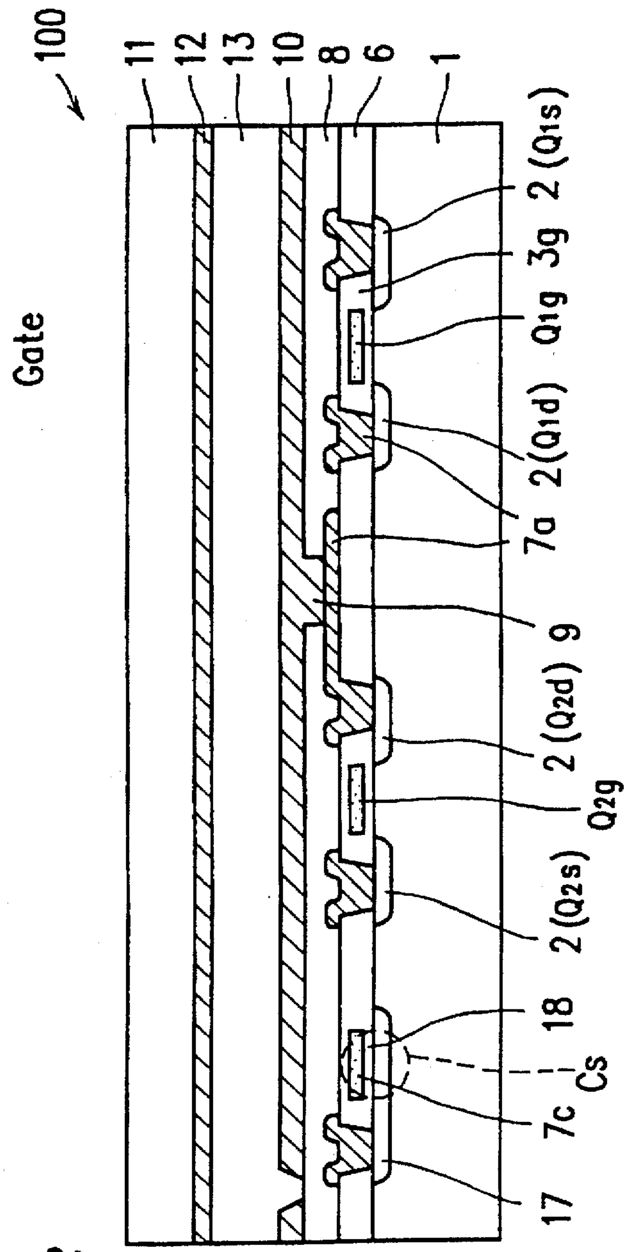
FIG. 12 is a cross sectional view of the FLCD device in FIG. 11 taken along line XII—XII of FIG. 11.

FIGS. 11 and 12 show a structure of a reflection-type FLCD device 100 in accordance with the fifth example. FIG. 11 is a schematic top view, and FIG. 12 is a schematic cross sectional view of the FLCD device 100 taken along lines XII—XII in FIG. 11. The structure shown in FIGS. 11 and 12 are provided for each pixel area including a pixel and an active element.

As is shown in FIG. 12, the FLCD device includes a base substrate 1 formed of p-type single crystalline silicon. On the base substrate 1, an NMOS switching circuit is mounted. In detail, the pixel area includes a first transistor Q1 and a second transistor Q2. A source region Q1*s* of the first transistor Q1 and a source region Q2*s* of the second transistor Q2 and a drain region Q1*d* of the first transistor Q1 and a drain region Q2*d* of the second transistor Q2 are each formed as an n-type diffusion layer 2 in the p-type base substrate 1. A gate electrode Q1*g* of the first transistor Q1 is provided above the base substrate 1 to be partially superposed on the source region Q1*s* and the drain region Q1*d* and is entirely covered with a gate insulation layer 3*g*. A gate electrode Q2*g* of the second transistor Q1 is provided above the base substrate 1 to be partially superposed on the source region Q2*s* and the drain region Q2*d* and is entirely covered with a gate insulation layer 3*g*. In the fifth example, the gate electrodes Q1*g* and Q2*g* are formed of polysilicon, and the gate insulation layer 3*g* is formed of silicon oxide. The gate electrodes Q1*g* and Q2*g* are isolated from each other by a silicon oxide film 6 and an aluminum electrode 7*a*. The pixel area further includes an auxiliary capacitance $C_S$ includes a polysilicon electrode 7*c* provided in the silicon oxide film 6, an n-type diffusion layer 17 provided in the base substrate 1 in positional correspondence with the polysilicon electrode 7*c*, and a gate oxide layer 18 sandwiched between the polysilicon electrode 7*c* and the n-type diffusion layer 17. The drain region Q1*d* of the first transistor Q1, the gate electrode Q2*g* of the second transistor Q2 end the polysilicon electrode 7*c* of the auxiliary capacitance $C_S$ are all connected to an aluminum wire 7*b* provided on the silicon oxide film 6 (FIG. 11).

A protective film 8 is provided on the base substrate 1, covering the gate oxide layer 18, the gate insulation layer 3*g*, the silicon oxide film 6, the aluminum electrode 7*a* and the aluminum wire 7*b*. The protective film 8 is provided for protecting the circuit on the base substrate 1.

The aluminum electrode 7*a* provided between the second transistor Q2 and the silicon oxide film 6 and partially extended onto the silicon oxide film 6. The protective film 8 has a through-hole 9 at a position corresponding to such an extended area of the aluminum electrode 7*a*. A pixel electrode 10 is provided on a certain area on the protective film 8. The pixel electrode 10 is connected to the aluminum electrode 7*a* via the through-hole 9, and is further connected to the drain region Q2*d* of the second transistor Q2 via the aluminum electrode 7*a*.

As is shown in FIG. 11, the gate electrode Q1*g* of the first transistor Q1 is connected to a scanning line 4, and the source region Q1*s* of the first transistor Q1 is connected to a signal line 5 which crosses the scanning line 4.

A glass substrate 11 is located to be opposed to the base substrate 1. A surface of the glass substrate 11 is entirely covered with a counter electrode 12. The counter electrode 12 and the pixel electrode 10 are both covered with an alignment film. An FLC layer 13 is sandwiched between the alignment films. Light is incident on the substrate 11.

The pixel electrode 10, which also acts as a reflection film, should be thermally treated in order to reduce the contact resistance between the pixel electrode 10 and the aluminum electrode 7*a* acting as a lower electrode. By the thermal treatment, a surface of the pixel electrode 10 becomes rugged, and as a result, the reflection ratio is lowered. In order to avoid such a problem, a surface of the protective film 8 is smoothed by polishing, and the surface of the pixel electrode 10 is smoothed by polishing after thermal treatment thereof. Such smoothing steps contribute to improvement in the alignment of the FLC molecules. Since the FLC molecules are especially difficult to be aligned and is liable to generate defects even due to microscopic ruggedness, the smoothing steps of the pixel electrode 10 is effective in realizing satisfactory alignment.

Since the base substrate 1 is formed of single crystalline silicon, technologies known in the field of ICs can be used for the FLCD device 100. In detail, advanced technologies in the fields of precision processing, high quality thin film formation, high precision impurity implantation, crystalline defect control, circuit designing and CAD are used in the designing and production of the FLCD device 100. Further, since such an FLCD device 100 can be produced together with ICs in clean rooms of IC plants, substantial investment for new facilities for the production of the LCD devices is not necessary, resulting in reduction of production cost.

In the FLCD device 100, as in the FLCD device 300 in accordance with the first through fourth examples, the FLC molecules can be stable in the two stable alignment states (FIG. 4A), and the polarizing axis of one of the polarizers is aligned with the central line 103. The FLCD device 100 realizes the same effects as those of the FLCD device 300 described in the first example.

Figure 13:
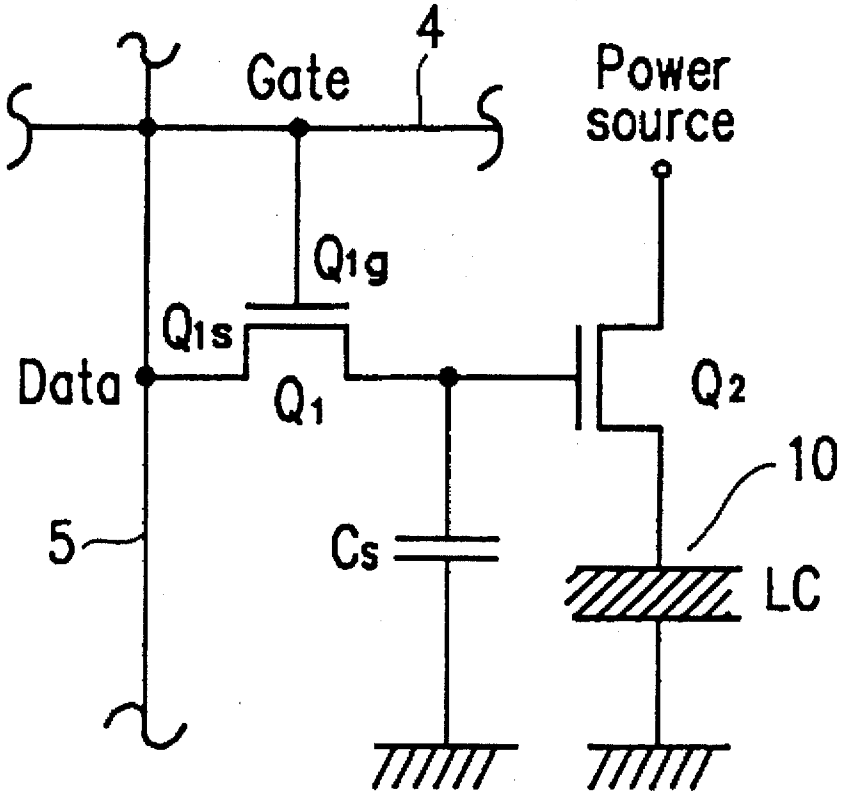
FIG. 13 is a circuit diagram of a circuit of the FLCD device in the fifth example.

FIG. 13 is a circuit diagram of a circuit for driving the FLCD device 100 shown in FIGS. 11 and 12. The circuit configuration shown in FIG. 13 is provided for each pixel area. The first transistor Q1 is connected to the scanning line 4 and to the signal line 5. The drain region Q1*d* of the first transistor Q1 is connected to an end of the auxiliary capacitance $C_S$, and the second transistor Q2 is connected to a power source and to the pixel electrode 10. The second transistor Q2 is provided for applying a voltage to the FLC layer 13. The potential of the gate electrode Q2*g* and the potential of the drain region Q2*d* preferably have substantially a linear relationship. The second transistors Q2 need to have a withstand voltage required for switching the states of the FLC molecules in the FLC layer 13 since the second transistor Q2 directly applies a voltage to the FLC layer 13. The first transistor Q1 is provided for sending a data signal to the second transistor Q2. The first transistor Q1 preferably has a low current leakage in an OFF state. The auxiliary capacitance $C_S$ is provided for retaining the data signal sent to the second transistor Q2.

When a data signal is sent to the signal line 5, end a voltage is applied to the scanning line 4 to turn the first transistor Q1 ON, the data signal is sent to the second transistor Q2. Simultaneously, the data signal is retained in the auxiliary capacitance $C_S$. The second transistor Q2 applies a voltage corresponding to the data signal to the FLC layer 13 to change the alignment of the FLC molecules.

The ON state of the second transistor Q2 is maintained even after the first transistor Q1 is turned OFF. Accordingly, when the switching circuit in the fifth example is used, high quality display is obtained even if the liquid crystal material has a high resistance and a large spontaneous polarization.

As is described above, In the FLCD device 100 in accordance with the fifth example, a data signal is retained in the auxiliary capacitance $C_S$, and the potential across the auxiliary capacitance $C_S$ is provided to the gate electrode Q2*g* of the second transistor Q2. The pixel electrode 10 is connected to the drain region Q2*d* of the second transistor Q2. In such a structure, the charge which is consumed by a change in the spontaneous polarization of the FLC molecules is supplied from the power source via the source region Q2*s*. The charge retained in the auxiliary capacitance $C_S$ connected to the gate electrode Q2*g* is not consumed almost at all. Therefore, the voltage applied to the FLC molecules is not changed.

The level of the charge retained in the auxiliary capacitance $C_S$ can be lower than that of the charge retained in the liquid crystal capacitance LC. Therefore, the level of the charge transferred via the source region Q2*s* is reduced, and thus the period of time in which the first TFT Q1 is ON can be shortened.

The circuit shown in FIG. 13 may further include an additional transistor or other devices for any specific need. Even if an FLCD device including an amorphous silicon TFT or a polysilicon TFT instead of using a base substrate formed of single crystalline silicon can realize high speed operation by reducing the level of the auxiliary capacitance $C_S$. Such an FLCD device is included in the scope of the present invention.

Figure 14:
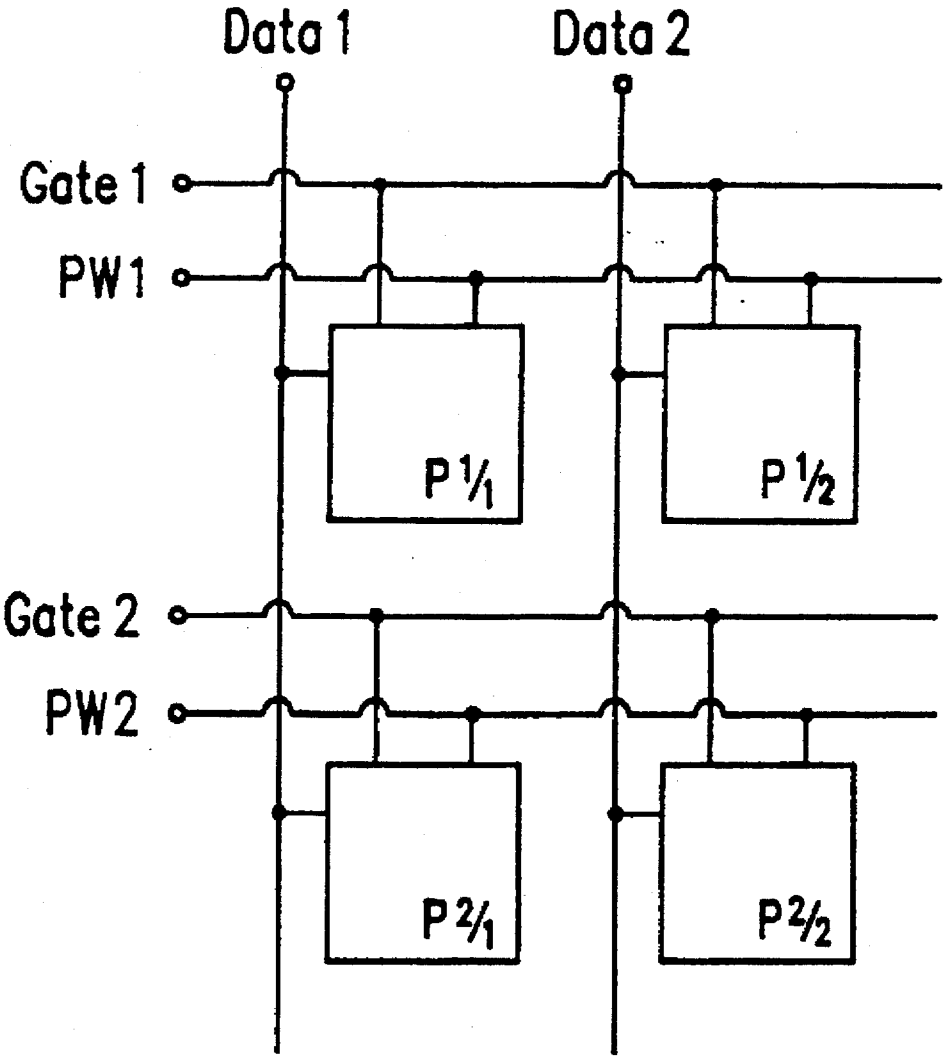
FIG. 14 is a block diagram of the circuit of the FLCD device in the fifth through eighth examples.
Figures 15A, 15B, 15C, 15D, 15E, 15F, 15G, 15H, 15I, 15J, 15K, 15L:
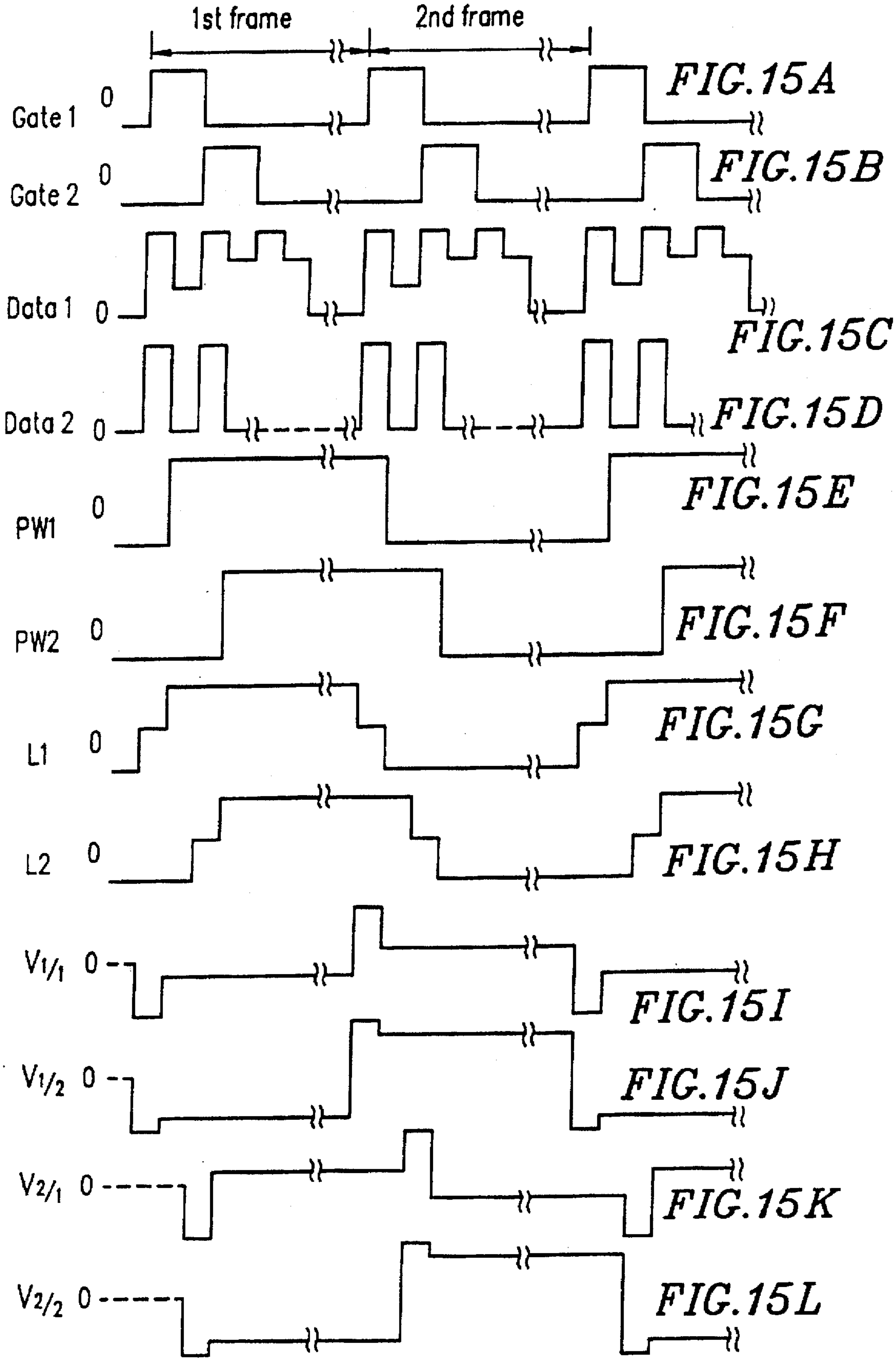
FIG. 15 is a waveform diagram illustrating voltage waveforms for driving the FLCD device in a method in accordance with the fifth example.

Operation of the FLCD device 100 will be described with reference to FIGS. 14 and 15. FIG. 14 is a block diagram of a circuit for driving the FLCD device 100. FIG. 15 is a waveform diagram of voltages applied to elements of the FLCD device 100.

$P_{1/1}$, $P_{1/2}$, $P_{2/1}$, and $P_{2/2}$ indicate pixels formed on the base substrate 1. Each pixel has a driving circuit. Although the operation will be described with reference to the pixels $P_{1/1}$, $P_{1/2}$, $P_{2/1}$, and $P_{2/2}$ for simplicity, the FLCD device 100 includes any required number of scanning lines and signal lines in actuality. In FIG. 14, a plurality of gate lines (only Gate 1 and Gate 2 are shown in FIG. 14; each corresponding to the scanning line 4 shown in FIG. 11) running in a row direction parallel to each other, and a plurality of data lines (only Data 1 and Data 2 are shown in FIG. 14; each corresponding to the signal line 5 shown in FIG. 11) running in a column direction parallel to each other. The gate lines are provided for supplying a gate signal, and the data lines are provided for supplying a data signal. A plurality of power source lines (only PW1 and PW2 are shown in FIG. 14 for simplicity) each for supplying a power are provided parallel to the gate lines. A plurality of counter voltage lines (only L1 and L2 are shown in FIG. 15 for simplicity) each for supplying a counter voltage are provided parallel to the data lines.

With reference to FIG. 15, a method for driving the FLCD device 100 will be described.

As is shown in waveform (A), in a first frame, a voltage of 6 V is applied to the gate line Gate 1. During the first half of the period in which the gate line Gate 1 is ON, a signal is applied to the data lines, for example, Data 1 and Data 2 (waveforms (C) and (D)) to activate the second transistor Q2 Synchronously, the power source line PW1 is supplied with a negative voltage (waveform (E), and the counter voltage line L1 is supplied with a voltage of 0 V (waveform (G)). During this period, the second transistor Q2 is fully activated to apply a sufficiently high negative voltage from the power source line PW1 to areas of the FLC layer 13 in correspondence the gate line Gate 1. Thus, the FLC molecules An the areas are put into one of two stable alignment states. During the second half of the period in which the gate line Gate 1 is ON, a data signal is sent to the data lines, for example, Data 1 and Data 2 (waveforms (C) and (D)) to supply a signal to the corresponding pixels. The data signal has a positive value. Thus, display data for the first row is written in the pixels (for example, the pixels $P_{1/2}$ and $P_{1/2}$). Synchronously, the power source line PW1 is supplied with a positive voltage (waveform (E)), and the counter voltage line is supplied with a positive voltage having a prescribed value (waveform (G)). As a result, the above-mentioned areas of FLC layer 13 are supplied with a voltage having a level corresponding to the difference between the voltage sent from the power source line PW1 through the second transistor Q2 and the voltage from the counter voltage line L1. Even after the gate line Gate 1 turns OFF, the data signal is maintained in the auxiliary capacitance $C_S$, and the power source line PW1 and the counter voltage line L1 are still supplied with a voltage (waveforms (E) and (G)). Thus, the above-mentioned areas of the FLC layer 13 are still supplied with a voltage having an identical level with that of the voltage supplied immediately before the gate line Gate 1 turns OFF. As a result, for example, the pixels $P_{1/1}$ and $P_{1/2}$ are respectively supplied with voltages $V_{1/1}$ and $V_{1/2}$ (waveforms (I) and (J)). Although a voltage of 6 V is applied to the gate lines in the above-mentioned example, a different level of voltage can be used depending on the polarity of the power source.

In synchronization with the turning-off of the gate line Gate 1, the gate line Gate 2 is turned ON by applying a voltage of 6 V (waveform (B)). During the first half of the period in which the gate line Gate 2 is ON, a signal is applied to the data lines, for example, Data 1 and Data 2 (waveforms (C) and (D)) to activate the second transistor Q2. Synchronously, a power source line PW2 is supplied with a negative voltage (waveform (F)), and a counter voltage line is supplied with a voltage of 0 V (waveform (H)). During this period, the second transistor Q2 is fully activated to apply a sufficiently high negative voltage from the power source line PW2 to areas of the FLC layer 13 in correspondence with the gate line Gate 2. Thus, the FLC molecules in the areas are put into the one of the two stable alignment states. During the second half of the period in which the gate line Gate 2 is ON, a data signal is sent to the data lines, for example, Data 1 and Data 2 (waveforms (C) and (D)) to supply a signal to the corresponding pixels. The data signal has a positive value. Thus, display data for the second row is written in the pixels (for example, the pixels $P_{2/1}$ and $P_{/2/2}$). Synchronously, the power source line PW2 is supplied with a positive voltage (waveform (F)), and the counter voltage line L2 is supplied with a positive voltage having a prescribed value (waveform (H)). As a result, the above-mentioned areas of the FLC layer 13 are supplied with a voltage having a level corresponding to the difference between the voltage sent from the power source line PW2 through the second transistor Q2 end the voltage from the counter voltage line L2. Even after the gate line Gate 2 turns OFF, the data signal is maintained in auxiliary capacitance $C_S$, and the power source line PW2 and the counter voltage line L2 are still supplied with a voltage (waveforms (F) and (H)). Thus, the above-mentioned areas of the FLC layer 13 are still supplied with a voltage having an identical level with that of the voltage supplied immediately before the gate line Gate 2 turns OFF. As a result, for example, the pixels $P_{2/1}$ and $P_{2/2}$ are respectively supplied with voltages $V_{2/1}$ and $V_{2/2}$ (waveforms (K) and (L)). Although a voltage of 6 V is applied to the gate lines in the above-mentioned example, a different level of voltage can be used depending on the polarity of the power source.

The above-described operation is repeated during the first frame to write data required for the first frame. In a second frame, the power source lines PW1 and PW2 and the counter voltage lines L1 and L2 are each supplied with a voltage having an opposite polarity to that of the voltage applied in the first frame. In this manner, the FLC layer 13 is supplied with positive and negative voltages by the same number.

As is described above, even after the first transistor Q1 turns OFF, the second transistor Q2 keeps on applying the voltage in accordance with the data signal retained in the auxiliary capacitance $C_S$ to the FLC layer 13 until the first transistor Q1 turns ON again. Such operation avoids the change in the voltage applied to the FLC layer 13 caused by the transient current. Thus, accurate display is realized.

Example 6

Figures 17A, 17B, 17C, 17D, 17E, 17F, 17G, 17H, 17I, 17J, 17K, 17L, 17M:
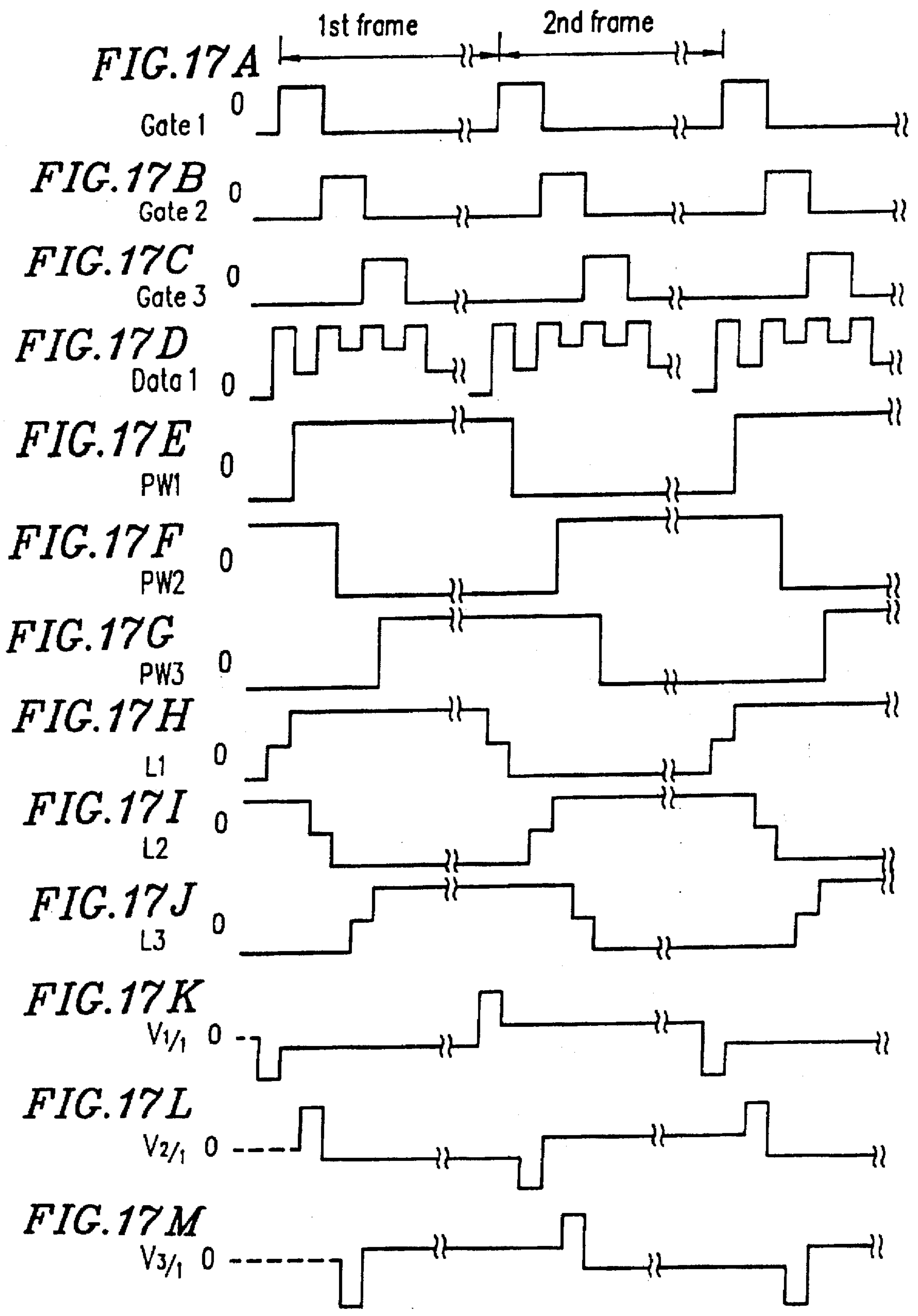
FIG. 17 is a waveform diagram illustrating voltage waveforms for driving the FLCD device in a method in accordance with a sixth example of the present invention.

In a sixth example according to the present invention, another method of driving the FLCD device 100 in FIGS. 11 and 12 will be described with reference to FIGS. 14 and 17.

In a first frame, a voltage of 6 V is applied to the gate line Gate 1 (waveform (A)). During first half of the period in which the gate line Gate 1 is ON, a signal is applied to the data line Data 1 (waveform (D)) to activate the second transistor Q2. Synchronously, the power source line PW1 is supplied with a negative voltage (waveform (E)), and a counter voltage line L1 is supplied with a voltage of 0 V (waveform (H)). During this period, the second transistor Q2 is fully activated to apply a sufficiently high negative voltage from the power source line PW1 to areas of the FLC layer 13 in correspondence the gate line Gate 1. Thus, the FLC molecules in the areas are put into one of two stable alignment states. During the second half of the period in which the gate line Gate 1 is ON, a data signal is sent to the data line Data 1 (waveform (D)) to supply a signal to a corresponding pixel. The data signal has a positive value. Thus, display data for the first row is written in the pixels (for example, the pixel $P_{1/1}$). Synchronously, the power source line PW1 is supplied with a positive voltage (waveform (E)), and the counter voltage line L1 is supplied with a positive voltage having a prescribed value (waveform (H)). As a result, the above-mentioned areas of FLC layer 13 are supplied with a voltage having a level corresponding to the difference between the voltage sent from the power source line PW1 through the second transistor Q2 and the voltage from the counter voltage line L1. Even after the gate line Gate 1 turns OFF, the data signal is maintained in the auxiliary capacitance $C_S$, and the power source line PW1 and the counter voltage line L1 are still supplied with a voltage (waveforms (E) and (H)). Thus, the above-mentioned areas of the FLC layer 13 are still supplied with a voltage having an identical level with that of the voltage supplied immediately before the gate line Gate 1 turns OFF. As a result, for example, the pixel $P_{1/1}$ is supplied with a voltage $V_{1/1}$ (waveform (K)). Although a voltage of 6 V is applied to the gate lines in the above-mentioned example, a different level of voltage can be used depending on the polarity of the power source.

In synchronization with the turning-off of the gate line Gate 1, the gate line Gate 2 is turned ON by applying a voltage of 6 V (waveform (B)). During the first half of the period in which the gate line Gate 2 is ON, a signal is applied to the data line Data 1 (waveform (D)) to activate the second transistor Q2. Synchronously, the power source line PW2 is supplied with a negative voltage (waveform (F)), and the counter voltage line L2 is supplied with a voltage of 0 V (waveform (I)). During this period, the second transistor Q2 is fully activated to apply a sufficiently high positive voltage sent from the power source line PW2 to areas of the FLC layer 13 in correspondence with the gate line Gate 2. Thus, the FLC molecules in the areas are put into the other of the two stable alignment states. During the second half of the period in which the gate line Gate 2 is ON, a data signal is sent to the data line Data 1 (waveform (D)) to supply a signal to a corresponding pixel. The data signal has a positive value. Thus, display data for the second row is written in the pixels (for example, the pixel $P_{2/1}$). Synchronously, the power source line PW2 is supplied with a negative voltage (waveform (F)), and the counter voltage line L2 is supplied with a negative voltage having a prescribed value (waveform (I)). As a result, the above-mentioned areas of the FLC layer 13 are supplied with a voltage having a level corresponding to the difference between the voltage sent from the power source line PW2 through the second transistor Q2 and the voltage from the counter voltage line L2. Even after the gate line Gate 2 turns OFF, the data signal is maintained in the auxiliary capacitance $C_S$, and the power source line PW2 and the counter voltage line L2 are still supplied with a voltage (waveforms (F) and (I)). Thus, the above-mentioned areas of the FLC layer 13 are still supplied with a voltage having an identical level with that of the voltage supplied immediately before the gate line Gate 2 turns OFF. As a result, for example, the pixel $P_{2/1}$ is supplied with a voltage $V_{2/1}$ (waveform (L)). Although a voltage of 6 V is applied to the gate lines in the above-mentioned example, a different level of voltage can be used depending on the polarity of the power source.

In synchronization with the turning-off of the gate line Gate 2, the gate line Gate 3 is turned ON by applying a voltage of 6 V (waveform (C)). During the first half of the period in which the gate line Gate 3 is ON, a signal is applied to the data line Data 1 (waveform (D)) to activate the second transistor Q2 Synchronously, a power source line PW3 is supplied with a negative voltage (waveform (G)), and a counter voltage line L3 is supplied with a voltage of 0 V (waveform (J)). During this period, the second transistor Q2 is fully activated to apply a sufficiently high negative voltage from the power source line PW3 to areas of the FLC layer 13 in correspondence with the gate line Gate 3. Thus, the FLC molecules in the areas are put into one of the two stable alignment states. This stable alignment state is the same as that obtained after the gate line Gate 3 is turned ON. During the second half of the period in the gate line Gate 3 is ON, a data signal is sent to the data line Data 1 (waveform (D)) to supply a signal To a corresponding pixel. The data signal has a positive value. Thus, display data for the third row is written in the pixels (for example, a pixel $P_{3/1}$ although not shown). Synchronously, the power source line PW3 is supplied with a positive voltage (waveform (G)), and the counter voltage line L3 is supplied with a positive voltage having a prescribed value (waveform (J)). As a result, the above-mentioned areas of the FLC layer 13 are supplied with a voltage having a level corresponding to the difference between the voltage sent from the power source line PW3 through the second transistor Q2 end the voltage from the counter voltage lane L3. Even after the gate line Gate 3 turns OFF, the data signal is maintained in the auxiliary capacitance $C_S$, and the power source line PW3 and the counter voltage line L3 are still supplied with a voltage (waveforms (G) and (J)). Thus, the above-mentioned areas of the FLC layer 13 are still supplied with a voltage having an identical level with that of the voltage supplied immediately before the gate line Gate 3 turns OFF. As a result, for example, the pixel $P_{3/1}$ is supplied with a voltage $V_{3/1}$ (waveform (M)). Although a voltage of 6 V is applied to the gate lines in the above-mentioned example, a different level of voltage can be used depending on the polarity of the power source.

The above-described operation is repeated during the first frame to write data required for first frame. In a second frame, the power source lines, for example, PW1, PW2 and PW3 and the counter voltage lines, for example, L1, L2 and L3 are each supplied with a voltage having an opposite polarity that of the voltage applied in the first frame. In this manner, the FLC layer 13 is supplied with positive and negative voltages by the same number. Adjacent areas of the FLC layer 13 are supplied with voltages having opposite polarities to each other to be put into one of the two stable alignment states.

Example 7

In a seventh example according to the present invention, another method of driving the FLCD device 100 in FIGS. 11 and 12 will be described with reference to FIGS. 14 and 18. By this method, a reset voltage is applied to all the pixels at the start or the end of a frame, thereby putting the FLC molecules in all the pixels into one of the two stable states.

In a period $T_1$ of a first frame, a voltage of 6 V is applied to all the gate lines, for example, Gate 1, Gate 2 and Gate 3 (waveforms (A), (B) and (C)). During the period $T_1$ in which the gate lines are ON, a signal is applied to all the data lines, for example, Data 1 (waveform (D)) to activate the second transistors Q2. Synchronously, all the power source lines, for example, PW1, PW2 and PW3 are supplied with a negative voltage (waveforms (E), (F) and (G)), and all the counter voltage lines, for example, L1, L2 and L3 are supplied with a voltage of 0 V (waveforms (H), (I) and (J)). During this period, the second transistor Q2 is fully activated to apply a sufficiently high negative voltage from all the power source lines to areas of the FLC layer 13 in correspondence all the gate lines. Thus, the FLC molecules in the areas are put into one of the two stable alignment states. After the period $T_1$, the gate line Gate 1 is kept ON by a voltage application of 6 V (waveform (A)). During the period in which the gate line Gate 1 is ON, a data signal is sent to the data line Data 1 (waveform (D)) to supply a signal to a corresponding pixel. The data signal has a positive value. Thus, display data for the first row is written in the pixels (for example, the pixel $P_{1/1}$). Synchronously, the power source line PW1 is supplied with a positive voltage (waveform (E)), and the counter voltage line L1 is supplied with a positive voltage having a prescribed value (waveform (H)). As a result, the areas of FLC layer 13 in correspondence with the gate line Gate 1 are supplied with a voltage having a level corresponding to the difference between the voltage sent from the power source line PW1 through the second transistor Q2 and the voltage from the counter voltage line L1. Even after the gate line Gate 1 turns OFF, the data signal is maintained in the auxiliary capacitance $C_S$, and the power source line PW1 and the counter voltage line L1 are still supplied with a voltage (waveforms (E) and (H)). Thus, the areas of the FLC layer 13 in correspondence with the gate line Gate 1 are still supplied with a voltage having an identical level with that of the voltage supplied immediately before the gate line Gate 1 turns OFF. As a result, for example, the pixel $P_{1/1}$ is supplied with a voltage $V_{1/1}$ (waveform (K)). Although a voltage of 6 V is applied to the gate lines in the above-mentioned example, a different level of voltage can be used depending on the polarity of the power source.

In synchronization with the turning-off of the gate line Gate 1, the gate line Gate 2 is turned ON by applying a voltage of 6 V (waveform (B)). During the period in which the gate line Gate 2 is ON, a data signal is applied to the data line Data 1 (waveform (D)) to supply a signal to a corresponding pixel. The data signal has a positive value. Thus, display data for the second row is written in the pixels (for example, the pixel $P_{2/1}$). Synchronously, the power source line PW2 is supplied with a positive voltage (waveform (F)), end the counter voltage line L2 is supplied with a positive voltage having a prescribed value (waveform (I)). As a result, the areas of the FLC layer 13 in correspondence with the gate line Gate 2 are supplied with a voltage having a level corresponding to the difference between the voltage sent from the power source line PW2 through the second transistor Q2 and the voltage from the counter voltage line L2. Even after the gate line Gate 2 turns OFF, the data signal is maintained in the auxiliary capacitance $C_S$, and the power source line PW2 and the counter voltage line L2 are still supplied with a voltage (waveforms (F) and (I)). Thus, the areas of the FLC layer 13 in correspondence with the gate line Gate 2 are still supplied with a voltage having an identical level with that of the voltage supplied immediately before the gate line Gate 2 turns OFF. As a result, for example, the pixel $P_{2/1}$ is supplied with a voltage $V_{2/1}$ (waveform (L)). Although a voltage of 6 V is applied to the gate lines in the above-mentioned example, a different level of voltage can be used depending on the polarity of the power source.

In synchronization with the turning-off of the gate line Gate 2, the gate line Gate 3 is turned ON by applying a voltage of 6 V (waveform (C)). During the period in which the gate line Gate 3 is ON, a data signal is applied to the data line Data 1 (waveform (D)) to supply a signal to a corresponding pixel. The data signal has a positive value. Thus, display data for the third row is written in the pixels (for example, the pixel $P_{3/1}$ although not shown). Synchronously, the power source line PW3 is supplied with a positive voltage (waveform (G)), and the counter voltage line L3 is supplied with a positive voltage having a prescribed value (waveform (J)). As a result, the areas of the FLC layer 13 in correspondence with the gate line Gate 3 are supplied with a voltage having a level corresponding to the difference between the voltage sent from the power source line PW3 through the second transistor Q2 and the voltage from the counter voltage line L3. Even after the gate line Gate 3 turns OFF, the data signal is maintained in the auxiliary capacitance $C_S$, and the power source line PW3 and the counter voltage line L3 are still supplied with a voltage (waveforms (G) and (J)). Thus, the areas of the FLC layer 13 in correspondence with the gate line Gate 3 are still supplied with a voltage having an identical level with that of the voltage supplied immediately before the gate line Gate 3 turns OFF. As a result, for example, the pixel $P_{3/1}$ is supplied with a voltage $V_{3/1}$ (waveform (M)). Although a voltage of 6 V is applied to the gate lines in the above-mentioned example, a different level of voltage can be used depending on the polarity of the power source.

The above-described operation is repeated during the first frame to write data required for the first frame. In a second frame, the power source lines, for example, PW1, PW2 and PW3 and the counter voltage lines, for example, L1, L2 and L3 are each supplied with a voltage having an opposite polarity to that of the voltage applied in the first frame. In this manner, the FLC layer 13 is supplied with positive and negative voltages by the same number.

Example 8

In an eighth example according to the present invention, another method of driving the FLCD device 100 in FIGS. 11 and 12 will be described with reference to FIGS. 14 and 19. By this method, a reset voltage is applied to all the pixels at the start or the end of a frame, thereby putting the FLC molecules in all the pixels into one of the two stable states.

In a period $T_1$ of a first frame, a voltage of 6 V is applied to all the gate lines, for example, Gate 1, Gate 2 and Gate 3 (waveforms (A), (B) and (C)). During the period $T_1$ in which the gate lines are ON, a signal is applied to all the data lines, for example, Data 1 (waveform (D)) to activate the second transistor Q2. Synchronously, odd-numbered power source lines, for example, PW1 and PW3 are supplied with a negative voltage (waveforms (E) and (G)), and even-numbered power source lines, for example PW2 and PW4 (not shown) are supplied with a positive voltage (waveform (F)). All the counter voltage lines, for example L1, L2 and L3 are supplied with a voltage of 0 V (waveforms (H), (I) and (J)). During this period, the second transistor Q2 is fully activated to apply a sufficiently high positive or negative voltage from all the power source lines to areas of the FLC layer 13 in correspondence with all the gate lines. Thus, the FLC molecules in the areas are put into either one of the two stable alignment states. After the period $T_1$, the gate line Gate 1 is kept ON by a voltage application of 6 V (waveform (A)). During the period in which the gate line Gate 1 is ON, a data signal is sent to the data line Data 1 (waveform (D)) to supply a signal to a corresponding pixel. The data signal has a positive value. Thus, display data for the first row is written in the pixels (for example, the pixel $P_{1/1}$). Synchronously, the power source line PW1 is supplied with a positive voltage (waveform (E)), and the counter voltage line L1 is supplied with a positive voltage having a prescribed value (waveform (H)). As a result, the areas of FLC layer 13 in correspondence with the gate line Gate 1 are supplied with a voltage having a level corresponding to the difference between the voltage sent from the power source line PW1 through the second transistor Q2 and the voltage from the counter voltage line L1. Even after the gate line Gate 1 turns OFF, the data signal is maintained in the auxiliary capacitance $C_S$, and the power source line PW1 and the counter voltage line L1 are still supplied with a voltage (waveforms (E) and (H)). Thus, the areas of the FLC layer 13 in correspondence with the gate line Gate 1 are still supplied with a voltage having an identical level with that of the voltage supplied immediately before the gate line Gate 1 turns OFF. As a result, for example, the pixel $P_{1/1}$ is supplied with a voltage $V_{1/1}$ (waveform (K)). Although a voltage of 6 V As applied to the gate lines in the above-mentioned example, a different level of voltage can be used depending on the polarity of the power source.

In synchronization with the turning-off of the gate line Gate 1, the gate line Gate 2 is turned ON by applying a voltage of 6 V (waveform (B)). During the period in which the gate line Gate 2 is ON, a data signal is applied to the data line Data 1 (waveform (D)) to supply a signal a corresponding pixel. The data signal has a positive value. Thus, display data for the second row is written in the pixels (for example, the pixel $P_{2/1}$). Synchronously, the power source line PW2 is supplied with a negative voltage (waveform (F)), and the counter voltage line L2 is supplied with a negative voltage having a prescribed value (waveform (I)). AS a result, the areas of the FLC layer 13 in correspondence with the gate line Gate 2 are supplied with a voltage having a level corresponding to the difference between the voltage sent from the power source line PW2 through the second transistor Q2 and the voltage from the counter voltage line L2. Even after the gate line Gate 2 turns OFF, the data signal is maintained in the auxiliary capacitance $C_S$, and the power source line PW2 and the counter voltage line L2 are still supplied with a voltage (waveforms (F) and (I)). Thus, the areas of the FLC layer 13 in correspondence with the gate line Gate 2 are still supplied with a voltage having an identical level with that of the voltage supplied immediately before the gate line Gate 2 turns OFF. As a result, for example, the pixel $P_{2/1}$ is supplied with a voltage $V_{2/1}$ (waveform (L)). Although a voltage of 6 V is applied to the gate lines in the above-mentioned example, a different level of voltage can be used depending on the polarity of the power source.

In synchronization with the turning-off of the gate line Gate 2, the gate line Gate 3 is tuned ON by applying a voltage of 6 V (waveform (C)). During the period in which the gate line Gate 3 is ON, a data signal is applied to the data line Data 1 (waveform (D)) to supply a signal to a corresponding pixel. The data signal has a positive value. Thus, display data for the third row is written in the pixels (for example, the pixel $P_{3/1}$ not shown). Synchronously, the power source line PW3 is supplied with a positive voltage (waveform (G)), and the counter voltage line L3 is supplied with a positive voltage having a prescribed value (waveform (A)). As a result, the areas of the FLC layer 13 in correspondence with the gate line Gate 3 are supplied with a voltage having a level corresponding to the difference between the voltage sent from the power source line PW3 through the second transistor Q2 and the voltage from the counter voltage line L3. Even after the gate line Gate 3 turns OFF, the data signal is maintained in the auxiliary capacitance $C_S$, and the power source line PW3 and the counter voltage line L3 are still supplied with a voltage (waveforms (G) and (J)). Thus, the areas of the FLC layer 13 in correspondence with the gate line Gate 3 are stall supplied with a voltage having an identical level with that of the voltage supplied immediately before the gate line Gate 3 turns OFF. As a result, for example, the pixel $P_{3/1}$ is supplied with a voltage $V_{3/1}$ (waveform (M)). Although a voltage of 6 V is applied to the gate lines in the above-mentioned example, a different level of voltage can be used depending on the polarity of the power source.

The above-described operation is repeated during the first frame to write data required for the first frame. In a second frame, the power source lines, for example, PW1, PW2 and PW3 and the counter voltage lanes, for example, L1, L2 and L3 are each supplied with a voltage having an opposite polarity to that of the voltage applied in the first frame. In this manner, the FLC layer 13 is supplied with positive and negative voltages by the same number. Adjacent areas of the FLC layer 13 are supplied with voltages having opposite polarities to each other to be put into one of the two stable alignment states.

Alternatively, the FLC layer may be supplied with a reset voltage for putting the FLC molecules in one of the two stable alignment states and a voltage for putting the FLC molecules at a desired position thereafter.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A ferroelectric liquid crystal display device, comprising:

a plurality of pixels, each including:

ferroelectric liquid crystal material having ferroelectric liquid crystal molecules therein, capable of being aligned in a first stable alignment state, whereby a principal axis of each of the molecules is aligned at an angle ω with respect to a central line, and of being aligned in a second stable alignment state, whereby the principal axis of each of the molecules is aligned at an angle −ω with respect to the central line; and a pair of polarizers on opposite sides of the ferroelectric liquid crystal material, a polarizing axis of one of the polarizers being substantially aligned with the central line, wherein the plurality of pixels are arranged in a matrix, and each of the plurality of pixels is connected to a driving circuit including:

a first switching device for controlling an output of a driving signal;

a charge-retaining capacitance for receiving an output from the first switching device; and a second switching device for receiving the output received by the charge-retaining capacitance from the first switching device as a switching control signal for controlling an output of a charge for display sent from a display power source and for sending the charge for display to establish an arbitrary field across the ferroelectric liquid crystal molecules in the corresponding pixel, and wherein the driving circuit comprises a third switching device, connected between the second switching device and the pixel, for controlling an output of the charge for display sent from the second switching device to the corresponding pixel, wherein the first switching devices are activated line by line to store a prescribed charge in each of the charge-retaining capacitances, and thereafter a plane-scanning switching control signal is supplied to each of the third switching devices to update the charges for display stored in the pixels substantially simultaneously.

2. A ferroelectric liquid crystal display device according to claim 1, further comprising two substrates sandwiching the ferroelectric liquid crystal material, and one of the two substrates is formed of single crystalline silicon and the other substrate is formed of a light-transmitting material.

3. A ferroelectric liquid crystal display device, comprising:

a plurality of pixels, each including:

ferroelectric liquid crystal material having ferroelectric liquid crystal molecules therein, capable of being aligned in a first stable alignment state, whereby a principal axis of each of the molecules is aligned at an angle ω with respect to a central line, and of being aligned in a second stable alignment state, whereby the principal axis of each of the molecules is aligned at an angle −ω with respect to the central line;

the ferroelectric liquid crystal molecules, in one of the two stable alignment states, are put at a position between the central line and a first tilting axis by application of a voltage in the range between a prescribed positive voltage and a prescribed negative voltage, and the ferroelectric liquid crystals, in the other stable alignment state, are put at a position between the central line and a second tilting axis by application of a voltage in the range between a prescribed negative voltage and a prescribed positive voltage; and a pair of polarizers on opposite sides of the ferroelectric liquid crystal material, a polarizing axis of one of the polarizers being substantially aligned with the central line, wherein the plurality of pixels are arranged in a matrix, and each of the plurality of pixels is connected to a driving circuit including:

a first switching device for controlling an output of a driving signal;

a charge-retaining capacitance for receiving an output from the first switching device; and a second switching device for receiving the output received by the charge-retaining capacitance from the first switching device as a switching control signal for controlling an output of a charge for display sent from a display power source and for sending the charge for display to establish an arbitrary field across the ferroelectric liquid crystal molecules in the corresponding pixel, and wherein the driving circuit comprises a third switching device, connected between the second switching device and the pixel, for controlling an output of the charge for display sent from the second switching device to the corresponding pixel, wherein the first switching devices are activated line by line to store a prescribed charge in each of the charge-retaining capacitances, and thereafter a plane-scanning switching control signal is supplied to each of the third switching devices to update the charges for display stored in the pixels substantially simultaneously.

4. A ferroelectric liquid crystal display device according to claim 3, further comprising two substrates sandwiching the ferroelectric liquid crystal material, and one of the two substrates is formed of single crystalline silicon and the other substrate is formed of a light-transmitting material.

* * * * *